(12) United States Patent
Mirhaji

(10) Patent No.: US 8,433,715 B1
(45) Date of Patent: Apr. 30, 2013

(54) METHOD AND SYSTEM FOR TEXT UNDERSTANDING IN AN ONTOLOGY DRIVEN PLATFORM

(75) Inventor: Parsa Mirhaji, Pearland, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 86 days.

(21) Appl. No.: 12/928,489

(22) Filed: Dec. 13, 2010

Related U.S. Application Data

(60) Provisional application No. 61/284,332, filed on Dec. 16, 2009, provisional application No. 61/284,331, filed on Dec. 16, 2009, provisional application No. 61/284,330, filed on Dec. 16, 2009.

(51) Int. Cl.
*G06F 7/00* (2006.01)
*G06F 17/30* (2006.01)

(52) U.S. Cl.
USPC .......................................................... 707/756

(58) Field of Classification Search ................... 707/739, 707/756
See application file for complete search history.

(56) References Cited

U.S. PATENT DOCUMENTS

2002/0052774 A1* 5/2002 Parker et al. ..................... 705/10
2006/0122876 A1* 6/2006 Von Schweber et al. ....... 705/10

OTHER PUBLICATIONS

Ghazvinian et al. "What Four Million Mappings Can Tell You about Two Hundred Ontologies", Oct. 2009, Springer-Verlag Berlin Heidelberg, ISWC 2009, LNCS 5823, pp. 229-242.*
Savarimuthu Arockiasamy, "Using the SKOS Model for Standardizing Semantic Similarity and Relatedness Measures for Ontological Terminologies", 2009, Miami University, pp. 1-155.*
Gomez et al., "Knowledge Organization and Distribution for Medical Diagnosis", Jan. 1981, IEEE Transactions on Systems, Man, and Cybernetics, vol. SMC-11, No. 1., pp. 34-42.*
Mirhaji, Parsa, et al., Ontology driven integration platform for clinical and translational research, The First Summit on Translational Bioinformatics, Mar. 10-12, 2008, San Francisco, CA, 8 pgs. (Published BMC Bioinformatics 2009, 10 (Suppl 2):S2, Feb. 5, 2009).

* cited by examiner

*Primary Examiner* — Rehana Perveen
*Assistant Examiner* — Hung Havan
(74) *Attorney, Agent, or Firm* — Sprinkle IP Law Group

(57) ABSTRACT

Embodiments of methods and systems for informatics systems are disclosed. Such informatics systems may utilize a unifying format to represent text to facilitate linking between data from the text and one or more ontologies, and the commensurate ability to mine such data.

30 Claims, 63 Drawing Sheets

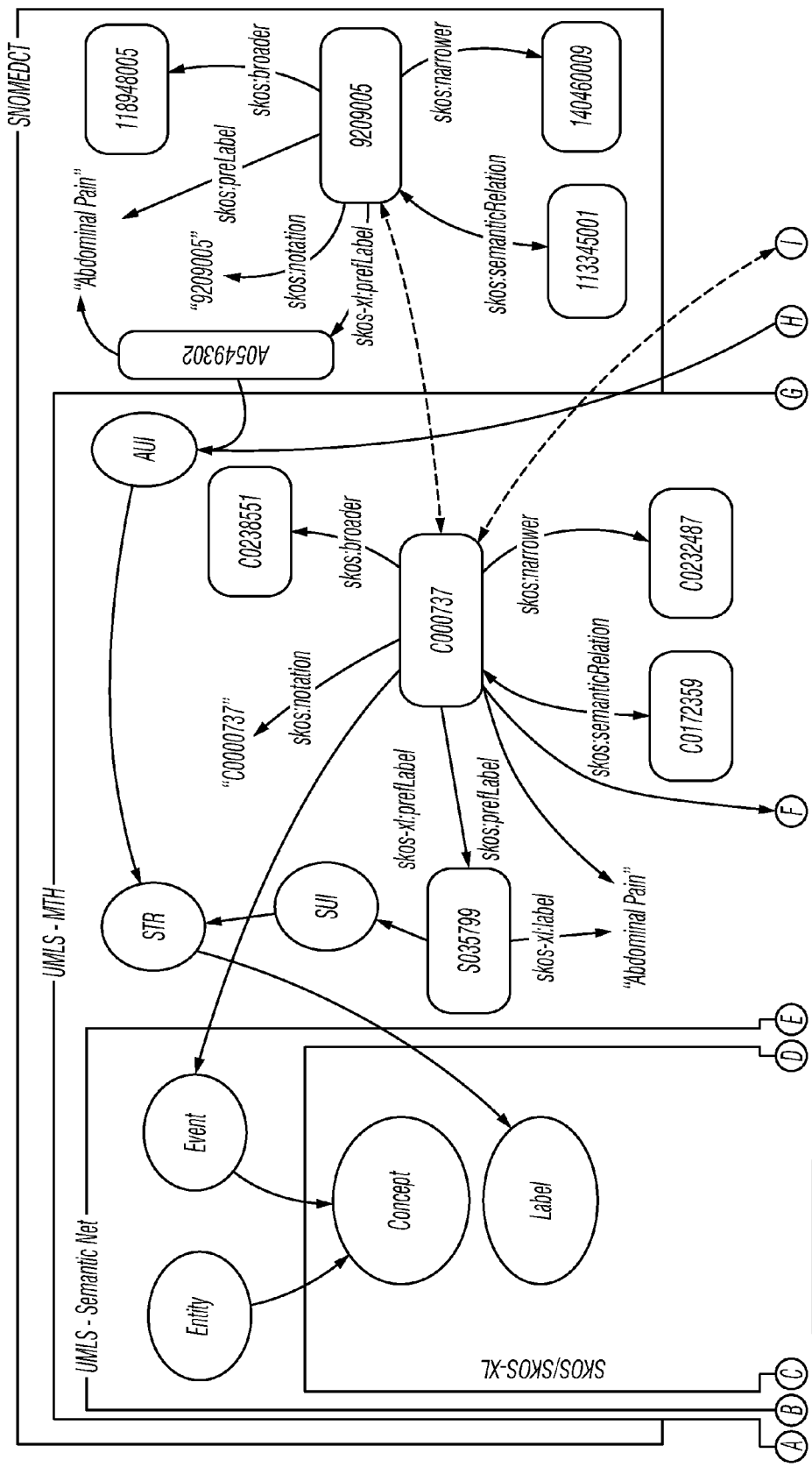

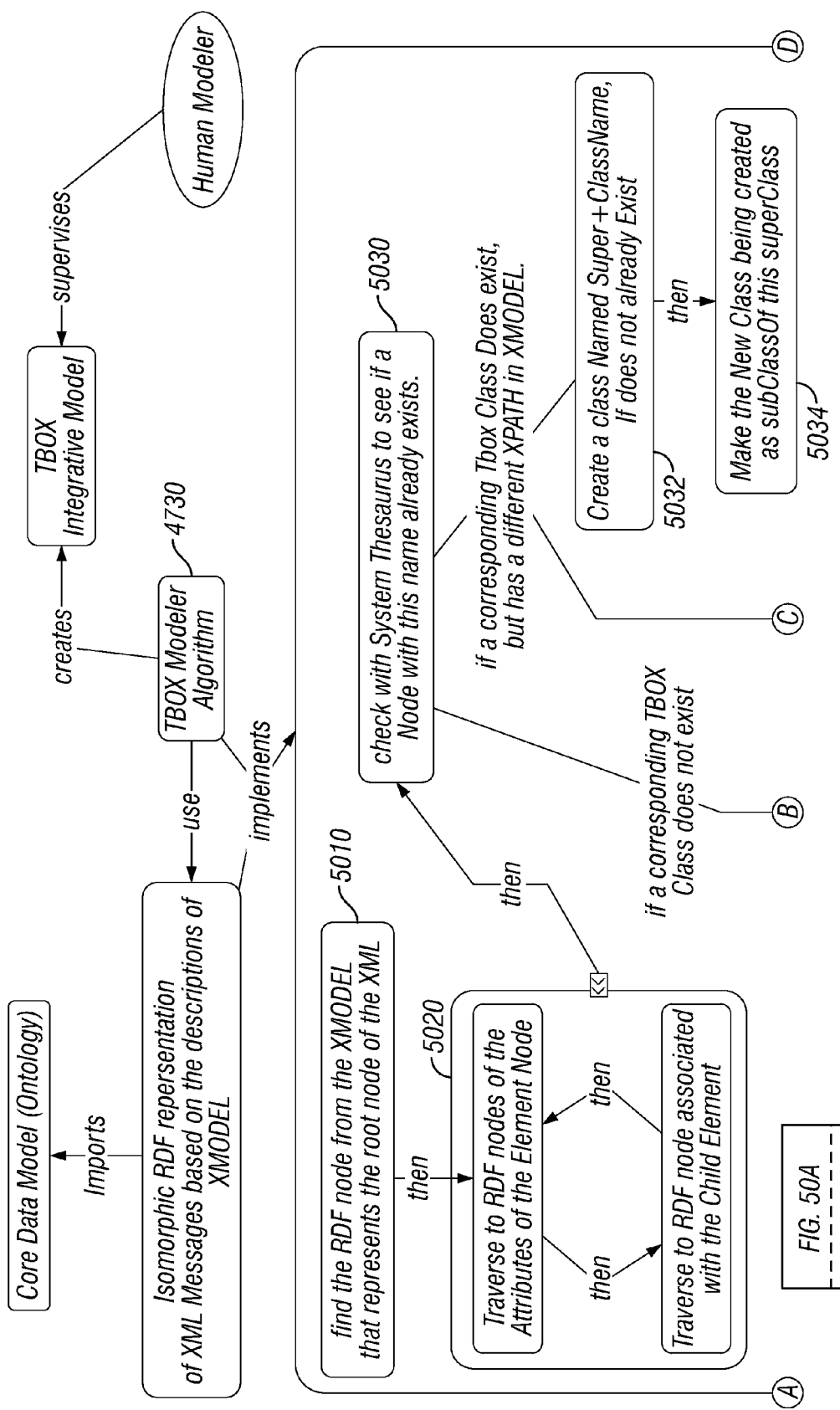

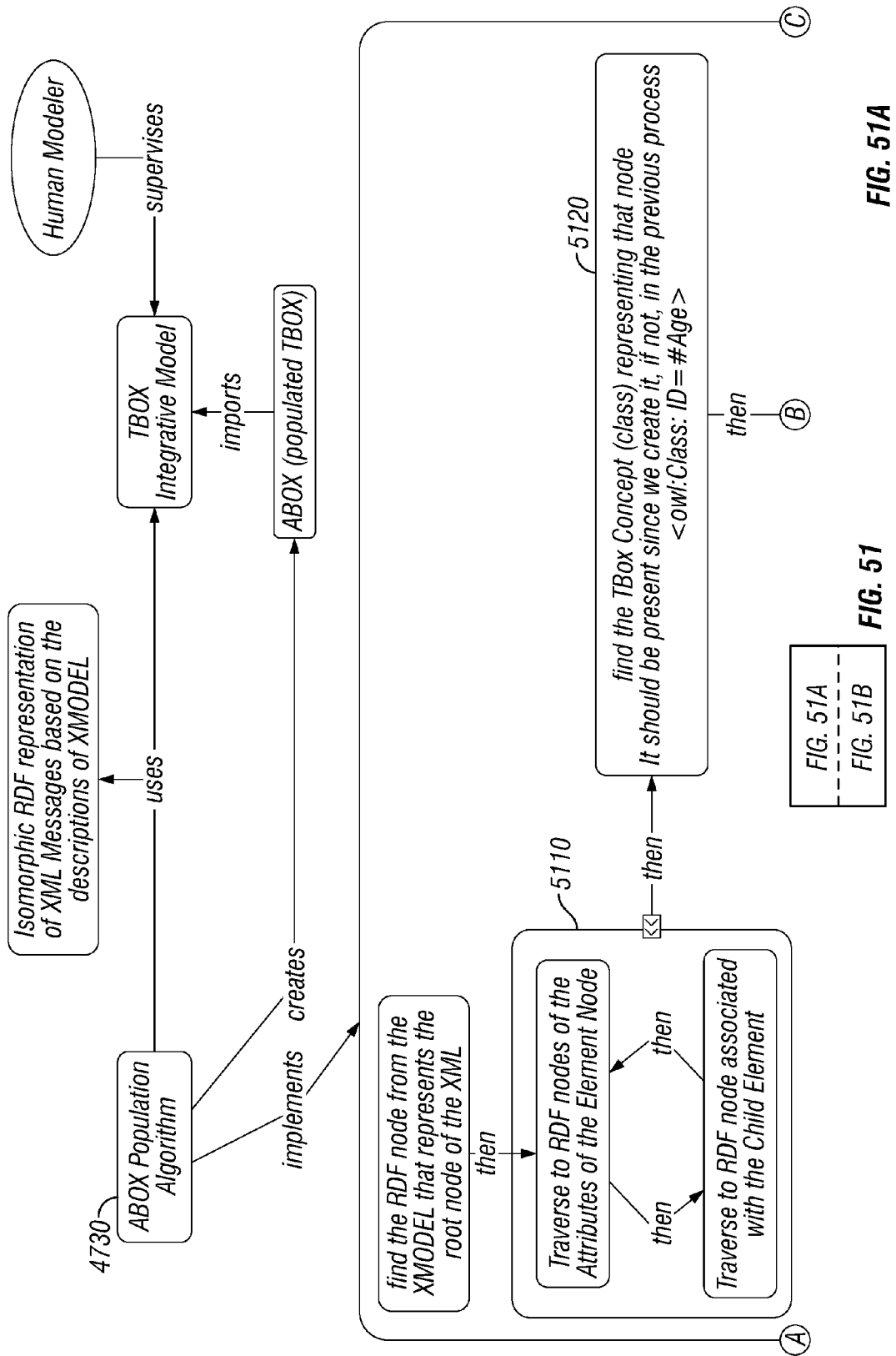

```xml
<?xml version- "1.0" encoding- "UTF-8"?>
<Patients EndDateTime- "1/7/2005 6:30:01 PM" StartDateTime- "1/7/2005 6:20:01 PM"
    XPath- "/Patients">
    <Hospital Id- "21" Name- "Memorial Hermann Hospital" XPath- "/Patients/Hospital" />
    <Patient Age- "25 years" Gender- "Male" PersonId- "123617890"
        Race- "Caucasian/White" VisitId- "316106" XPath- "/Patients/Patient">
        <Complaints XPath- "/Patients/Patient/Complaints">
            <Complaint Custom_Text- "Test" Value- "Laceration - Minor"
                XPath- "/Patients/Patient/Complaints/Complaint" />
        </Complaints>
        <Charts Xpath- "/Patients/Patient/Charts">
            <Chart Type- "Nurse" XPath- "/Patients/Patient/Charts/Chart">
                <Section Name- "Medication" XPath- "/Patients/Patient/Charts/Chart/Section">
                    <Choice1 CHOICE_DISPLAY_NAME-"Medication" CHOICE_NAME- "TEST"
                        MHTC_CHOICE_ID- "94040" OBSERVATION_TIME- "2005-01-07T18:22:17"
                        Plugin_Name- "Meds" Strikeout- "False"
                        XPath- "/Patients/Patient/Charts/Chart/Section/Choice1">
                        <Plugin Plugin_Detail_Name- "Medication"
                            Plugin_Detail_Value- "Tetanus Toxoid"
                            XPath- "/Patients/Patient/Charts/Chart/Section/Choice1/Plugin" />
                        <Plugin Plugin_Detail_Name- "Dose" Plugin_Detail_Value- "0.5 ml"
                            XPath- "/Patients/Patient/Charts/Chart/Section/Choice1/Plugin" />
                        <Plugin Plugin_Detail_Name- "Route" Plugin_Detail_Value- "IM"
                            XPath- "/Patients/Patient/Charts/Chart/Section/Choice1/Plugin" />
                        <Plugin Plugin_Detail_Name- "Site" Plugin_Detail_Value- "Left Deltoid"
                            XPath- "/Patients/Patient/Charts/Chart/Section/Choice1/Plugin" />
                    </Choice1>
                </Section>
            </Chart>
        </Charts>
        <InitTemperature XPath- "/Patients/Patient/InitTemperature">
            <Data Name- "Value" Value- "97.0"
                XPath- "/Patients/Patient/InitTemperature/Data" />
            <Data Name- "Units" Value- "F"
                XPath- "/Patients/Patient/InitTemperature/Data" />
            <Data Name- "Method" Value- "Oral"
                XPath- "/Patients/Patient/InitTemperature/Data" />
        </InitTemperature>
        <InitBloodPressure XPath- "/Patients/Patient/InitBloodPressure">
            <Data Name- "Systolic" Value- "124"
                XPath- "/Patients/Patient/InitBloodPressure/Data" />
            <Data Name- "Diastolic" Value- "77"
                XPath- "/Patients/Patient/InitBloodPressure/Data" />
        </InitBloodPressure>
        <InitPulse XPath- "/Patients/Patient/InitPulse">
            <Data Name- "BPM" Value- "74" XPath- "/Patients/Patient/InitPulse/Data" />
```

FIG. 58

METHOD AND SYSTEM FOR TEXT UNDERSTANDING IN AN ONTOLOGY DRIVEN PLATFORM

RELATED INFORMATION

This application claims a benefit of priority to the filing date of U.S. Provisional Patent Application Ser. No. 61/284,332 entitled "METHOD AND SYSTEM FOR TEXT UNDERSTANDING," filed on Dec. 16, 2009 by inventor Parsa Mirhaji; U.S. Provisional Patent Application Ser. No. 61/284,331 entitled "METHOD AND SYSTEM FOR A SEMANTIC REPRESENTATION OF UNIFIED MEDICAL LANGUAGE SYSTEM (UMLS) USING SIMPLE KNOWLEDGE ORGANIZATION SYSTEM (SKOS)," filed On Dec. 16, 2009 by inventor Parsa Mirhaji; U.S. Provisional Patent Application Ser. No. 61/284,330 entitled "METHOD AND SYSTEM FOR ONTOLOGY DRIVEN DATA COLLECTION," filed On Dec. 16, 2009 by inventor Parsa Mirhaji, the entire contents of which are hereby expressly incorporated by reference for all purposes.

GOVERNMENT LICENSE RIGHTS

This invention was made with government support under W81XWH-04-2-0035 awarded by The U.S. Army Medical Research Acquisition Activity. The government has certain rights in the invention.

TECHNICAL FIELD

This disclosure relates generally to the field of informatics systems. In particular, this disclosure relates to the collection, integration and contextualization of information. More specifically, this disclosure relates to the collection of data using natural language processing (NLP) and the parsing and processing of text to identify concepts and relationships according to ontologies.

BACKGROUND

With the increasing prevalence and use of computing systems the amount of data that can be obtained regarding various problem spaces has grown exponentially. While the amount of data that may be obtained with respect to a particular space may have increased significantly, the integration of heterogeneous data from multiple sources, the sharing of information in a distributed and collaborative environment and the mining of such data are challenging informatics problems. Nowhere are these types of challenges and problems more evident than in the case of a natural disaster or epidemic as the understanding, diagnoses, treatment and prevention of human diseases requires the collection, integration and understanding of information and knowledge from a wide variety of highly distributed sources which may present a unique challenge in such circumstances. This problem is exacerbated because most clinical research environments lack proper informatics resources and infrastructure to assist with preparation, implementation and maintenance of data collection and management platforms that can consistently and concurrently support collection, integration and contextualization of multiple research projects across many participating sites.

It is thus desired to provide advanced informatics platforms to enable complete, reliable and fast collection and validation of information throughout various research projects, and among different participating locations. Moreover, in conjunction with the collection of data for such systems it may be desired to process natural language (sometimes referred to as free text). This desire is particularly strong in the field of medicine, as free text entries in the form of discharge diagnosis, chief complaint, nurse and practitioner note, diagnostic reports and consultations, etc. are extremely important part of a patient electronic health record and frequently unavailable for decision support and research queries due to its unstructured and unconstrained format. While human experts can effortlessly understand the meaning of the text, its implications in multiple different contexts (decision support, research, quality of care, etc.), or answer questions regarding patient health status, current computational processes are not able to process such health related free text to produce structured data that allows data mining of such free text.

SUMMARY

Embodiments of methods and systems for informatics systems are disclosed. Such informatics systems may utilize a unifying format to represent data obtained or utilized by the system to facilitate linking between data from different sources and the commensurate ability to mine such data. In particular, embodiments of these types of informatics systems may represent data as graphs that comprise the concepts and relationships (also referred to as mapping or links) between those concepts.

Though embodiment of informatics systems may be useful in many contexts, certain embodiments may be particularly useful in the context of medical environments and generally in the field of medicine. This is because in the medical field free text entries in the form of discharge diagnosis, chief complaint, nurse and practitioner note, diagnostic reports and consultations, etc. are extremely important part of a patient electronic health record, are frequently unavailable for decision support and research queries due to its unstructured and unconstrained format. While human experts can effortlessly understand the meaning of the text, its implications in multiple different contexts (decision support, research, quality of care, etc.) or answer questions regarding patient health status, current computational processes are not able to process such health related free text to produce a structured data output from such free text to allow data mining of such free text such as question answering and information integration. Furthermore, in the case of a natural disaster or epidemic; understanding, diagnosing, treating and preventing human diseases requires the collection, integration and understanding of information and knowledge from a wide variety of highly distributed sources which may present a unique challenge in such circumstances. Accordingly in most medical environments it is desired to have effective informatics systems.

Clinical text understanding deals with the conversion of patient health data spoken or recorded as unconstrained text, into formal representations readily interpretable (understandable) by computer programs. This is of interest to health informatics because important information in electronic health records are frequently represented as unconstrained text, and are used extensively by human experts to guide clinical practice, decision making, and to document delivery of care and health status. Furthermore, recent initiatives such as the CTSA program advocating for translational and clinical research call for informatics infrastructure that support semantic integration of all data regardless of their structure and format (including unconstrained text) and enable contextualization and repurposing of the clinical information from electronic health records systems and research databases for multidisciplinary research in a collaborative and distributed environments.

Data may be obtained from text based sources. In a medical environment these sources may comprise, for example, an electronic medical records system (EMR), lab reports, medical charts, discharge diagnosis, chief complaint, nurse and practitioner notes, diagnostic reports and consultations, etc. This text may be input manually to the informatics system or received electronically. The text may be parsed according to a graph representation of an ontology representing syntactic knowledge (referred to a syntactic ontology), where the syntactic ontology utilized may be selected based upon the expected language, format, type of text, environment to which the text may pertain, etc. The result of the parsing may be a graph representation of the concepts and relationships of the text. The graph representing the text may thus form a unified graph with the syntax ontology.

This graph representation of the text may then be mapped to a domain ontology to form a unified graph comprising the graph representing the text, the syntax ontology and the domain ontology. Using the mappings between the graph representing the text and the domain ontology, and previously established mappings between the domain ontology and a semantic ontology, the graph representing the text may be mapped to a semantic knowledge base. In this manner, a unified graph comprising the graph representing the text, the domain ontology and the semantic ontology can be formed. Once data has been obtained, represented as a graph and a unified graph comprising the obtained data and at least one ontology is formed to contextualize the data, the unified graph may be data mined.

In one embodiment, an informatics system may receive a clinical text input from one or more of the plurality of data sources, create a graph representation of the input, obtain a graph representation of an ontology, wherein the ontology comprises a set of concepts and a set of relationships and map the graph representation of the input to the graph representation of the ontology to create a unified graph comprising the graph representation of the input and the graph of the ontology such that the unified graph may be searched based on the query to obtain data of the input associated with at least one concept or the at least one relationship.

In one embodiment, creating a graph representation of the input comprises parsing the input to create a parse graph, wherein parsing the input comprises creating a set of evidence spaces, each evidence space comprises a set of related concepts and the set of related concepts are within a distance of one another in the clinical text. This distance may, for example, be five or seven.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 19 depicts a listing of a relational database schema generated by one embodiment of the system.

FIG. 20 depicts one embodiment of an interface generated by the client application.

FIG. 23 depicts one embodiment of a survey response inside ontology and mapped to survey ontology and domain concepts.

FIG. 37 depicts one embodiment of an ontology representing UMLS Semantic Network.

FIG. 38 depicts one embodiment of an example SAB class

FIG. 58 depicts one embodiment of a converted XML message.

DETAILED DESCRIPTION

Figure 1:
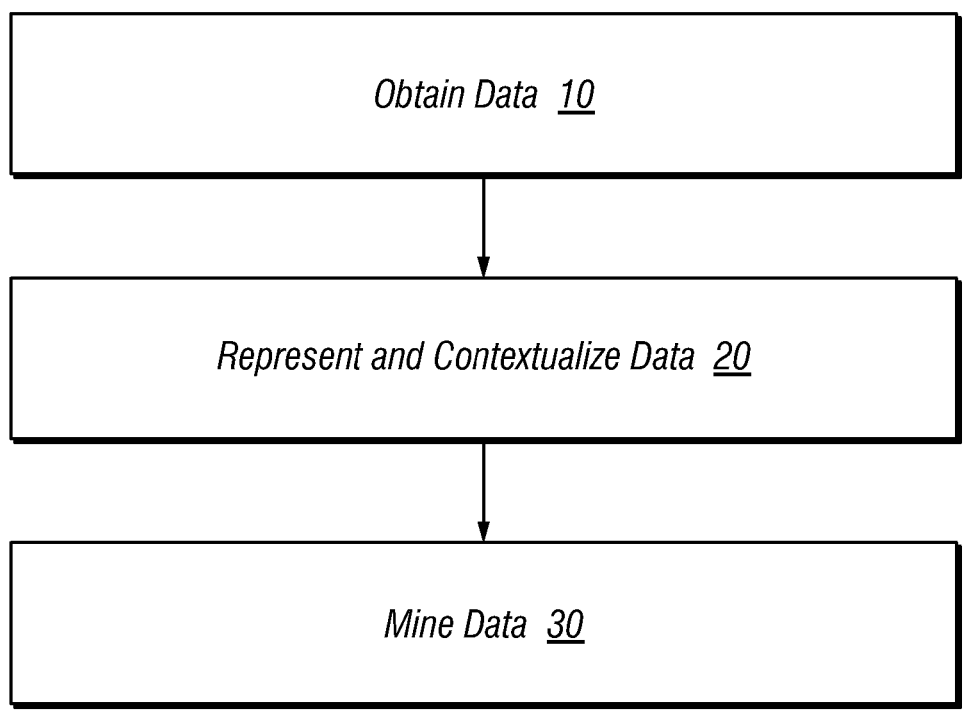
FIG. 1 depicts one embodiment of a method by which informatics systems may operate.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (for example, a HD), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only to those elements but may include other elements not expressly listed or inherent to such a process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment".

Before discussing specific embodiments, an embodiment of an architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, touchscreen, etc.), microphone, camera or the like. In various embodiments, the computer may have access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like. ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code. At least portions of the functionalities implemented herein may be implemented in one or more modules. Each module may comprise one or more computer readable instructions configured to implement the functionality of that module. Modules may be combined or further divided, reside or one or multiple computer readable mediums, and the modules depicted herein should not be taken as in any way limiting the configuration or implementation of embodiments of the systems and methods depicted herein.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

A brief discussion of context, particularly with respect to data gathering systems may now be helpful. Integrating heterogeneous data from multiple sources and sharing information in a distributed and collaborative environment are challenging informatics problems. These challenges are particularly evident in a medical setting or in the case of a natural disaster or epidemic as understanding, diagnosing, treating and preventing human diseases requires the collection, integration and understanding of information and knowledge from a wide variety of highly distributed sources which may present a unique challenge in such circumstances.

To aid in the processing and understanding of such data it may be desired to provide an informatics system to aid in the collection, representation and mining of such data. Accordingly, attention is now directed to embodiments of methods and systems for such informatics systems. Such informatics systems may utilize a unifying format to represent data obtained or utilized by the system to facilitate linking between data from different sources and the commensurate ability to mine such data. In particular, embodiments of these types of informatics systems may represent data as graphs that comprise the concepts and relationships (also referred to as mapping or links) between those concepts. These graphs may be formal (computer interpretable) graphs that can be stored in a data store in a variety formats. Graphs may be represented using the resource definition framework (RDF) from Semantic Web. The RDF is described in detail in the World Wide Web Consortium (W3C) recommendations and specifications, incorporated herein by reference in their entirety. In this manner, concepts in graphs that represent distinct groupings of data may be mapped and knowledge mining with respect to these graphs facilitated. By representing data in formal graphs, it may be possible to automate many process that are involved in the integration and interpretation of multiple heterogeneous data sources and the utilization of computer based algorithms to mine such data, even when such data does not conform to standardized representation.

Specifically, embodiments of such informatics system may utilize ontologies (also referred to as knowledge bases) to facilitate elements of their operation. Embodiments of these ontologies may be graphs represented in Web Ontology Language (OWL) (OWL is a family of knowledge representation languages for authoring ontologies). The language may be characterized by formal semantics and RDF/XML-based serializations for Semantic Web. OWL is endorsed and described by the World Wide Web Consortium (W3C). Semantic Web provides one language for creating ontologies that are computer understandable and available over a network, other ways will be possible.

Certain ontologies may be used to support the creation and distribution of data collection instruments and to contextualize the data returned according to the ontology. Ontologies may be also be utilized to analyze data in a textual format such that the data may be contextualized according to the ontology. Other ontologies may be used to describe the format of data that may be received from one or more data sources such that obtained data may be contextualized according to that ontology when it is received from the corresponding data source. In this manner, obtained data may be represented in a graph according to an ontology.

To further contextualize obtained data, ontologies that represent collections of knowledge may be utilized. More specifically, ontologies that represent knowledge associated with a certain domain may be represented as a graph. Concepts in the graph representing obtained data may be mapped to the concepts of one or more ontologies representing domain knowledge. This mapping may be accomplished by establishing a relationship (such as "same as" relationship between the two concepts). In this manner, obtained data may be placed in the context of a particular domain by unifying the graph representing obtained data and the graph representing the ontology for a particular domain. As used herein the term unified graph is intended to mean any graph formed by mapping (either directly by mapping one concept to another or indirectly by mapping a concept to another concept that is in turn mapped to a third concept such that the original concept and the third concept are mapped) at least one concept in one graph with at least one concept in another graph, or any graph resulting from the addition of a concept and relationship to an existing graph (for example, by instantiating a concept and linking the concept to another concept in an existing graph).

These unified graphs then may then be utilized to mine the obtained data. In particular, the unified graph may be queried or otherwise navigated based on the concepts or relationships in the domain ontology or one of the other ontologies to which the graph of the obtained data is mapped. This mapping enables rules based and logic reasoning engines to be used for classification and enables such graphs to be reused and repurposed depending on the domain ontology to which the graph representing the obtained data is mapped. This means the same graph can be contextualized for a wide variety of uses, including for example, decision support, billing, research, case recruitment, quality of care assessment, etc. without need to reprocess obtained data.

Accordingly, a cross-platform informatics system that provides distributed operation may be provided. Data may be obtained from a variety of source and represented in a extensible, context independent, format that supports multidisciplinary uses of the data using a representation framework that can be incrementally updated and extended to adapt to new specializations, and enable integration of new data. Such a format may provide data with an independent life cycle that is authenticated, and may be audited in a traceable and revertible fashion such that changes to the system objects or their associated values may be traceable, or revertible back to its original status in a systematic way. Obtained data may be contextualized according to any one of a number of ontologies. This contextualization allows a series of operations that can be automatically or interactively specialized and customized to meet specific requirements of individual projects related to a particular domain.

Reference is now made to FIG. 1, which presents one embodiment of a method by which such informatics systems may operate. Although embodiments as described herein will be presented throughout with reference to an informatics system that may be used in a medical environment, it should be noted that the systems and methods presented herein will be equally applicable in other environments and the context in which embodiments are described should in no way be taken as limitations on the applicability of such systems and methods.

At step 10 an informatics system that operates according to an embodiment of the present invention may obtain data from a variety of sources. At step 20 the obtained data may be represented as a graph and the graph representing the obtained data mapped to one or more ontologies to contextualize the data according to the ontology. One method of obtaining data for such an informatics system may involve the use of surveys. An ontology may describe the structure of a data collection instrument, including for example, projects, forms, surveys, order, group, attributes, etc. This type of ontology may be referred to herein as a survey ontology. Thus, a survey ontology may be a graph representation of an ontology configured for the implementation of surveys.

Using such a survey ontology a user of an informatics system may be presented with an interface which allows him to create one or more surveys. As the survey is constructed based on a survey ontology the survey may itself be represented as a graph such that the graph representing the survey and the survey ontology form a unified graph. In particular, a survey may be composed of a number of questions. These questions may reference certain concepts, where the concepts may not yet be represented in the graph representing the survey. In such cases a concept may be created and linked to the graph comprising the survey. In this manner, the graph representing the survey and the survey ontology can expand organically to encompass the concepts desired.

A user's device may communicate with the informatics system and obtain such a survey by obtaining the graph representation of the survey. Based on the graph representation of the survey a user interface may be rendered at the user's device to present the questions comprising the survey. The user may provide answers to these questions, where these answers are returned to the informatics system and represented as a graph such that the graph representing the user's answers to the survey forms a unified graph with both the graph representing the survey and the survey ontology.

Moreover, the concepts in the graph of the survey representing questions of the survey may have been mapped to concepts in one or more ontologies describing knowledge pertaining to a domain (referred to as a domain ontology or knowledge base). Thus, the mapping of the graph representing the user's answers to the survey to the graph representing the form may also serve to contextualize the answers by forming a unified graph between the graph representing the user's answers, the graph representation of the survey, the survey ontology and the domain ontology.

Data may also be obtained from text based sources. In a medical environment these sources may comprise, for example, an electronic medical records system (EMR), lab reports, medical charts, discharge diagnosis, chief complaint, nurse and practitioner notes, diagnostic reports and consultations, etc. This text may be input manually to the informatics system or received electronically. The text may be parsed according to a graph representation of an ontology representing syntactic knowledge (referred to a syntactic ontology), where the syntactic ontology utilized may be selected based upon the expected language, format, type of text, environment to which the text may pertain, etc. The result of the parsing may be a graph representation of the concepts and relationships of the text. The graph representing the text may thus form a unified graph with the syntax ontology.

This graph representation of the text may then be mapped to a domain ontology to form a unified graph comprising the graph representing the text, the syntax ontology and the domain ontology. Using the mappings between the graph representing the text and the domain ontology, and previously established mappings between the domain ontology and a semantic ontology, the graph representing the text may be mapped to a semantic knowledge base. In this manner, a unified graph comprising the graph representing the text, the domain ontology and the semantic ontology can be formed. The semantic ontology may be a generic and extensible ontology that represents the concepts that are likely to be found in text of the type being processed. A semantic ontology may serve as a high level schemata (information model) with minimal set of semantic constrains that sufficiently represent major patterns identifiable in typical text of the type being processed that enables extensions and mappings to more specialized ontologies to specialize it to meet particular requirements of a new use case or domain.

Data can also be obtained from a variety of data sources directly. Data may be received from these data sources, or an informatics system may obtain data from these data sources in another manner. The data may be obtained using a structured representation of the data such as an XML object. As data sources may have different structures for representing their data the informatics system may have a set of source ontologies, where each of the set of source ontologies corresponds to a particular data source or type of data source. When data is obtained from a data source the informatics system may utilize an ontology that corresponds to the data source from which the data was obtained. Using the ontology then, a graph of the obtained data may be created by processing the structured representation according to the corresponding ontology to represent the data from the source as a graph where this graph is unified with the ontology for source from which it was obtained. The graph of the obtained data can then be mapped to a domain ontology to create a unified graph comprising the graph of the obtained data and the domain ontology.

Once data has been obtained, represented as a graph and a unified graph comprising the obtained data and at least one ontology is formed to contextualize the data, the unified graph may be data mined at step 30. More specifically, an interface may be provided to a user to query the unified graph. This interface may present to the user a list of concepts or relationships utilized in the domain ontology or the semantic ontology comprising the unified graph. The user can thus construct a query utilizing the concepts or relationships of the ontology and obtained data searched and organized according to those concepts or relationships.

The unified graph may be searched according to the query constructed by the user utilizing SPARQL Protocol and RDF Query Language (SPARQL) which was standardized by the RDF Data Access Working Group of the W3C and is an official W3C recommendation. SPARQL allows for a query to comprise triple patterns, conjunctions, disjunctions, patterns, etc. SPARQL also allows federated queries where the query is distributed to multiple locations or computed distributed and results from the distributed query gathered.

Thus, the interface presented to the user may provide an open framework for the user to construct queries according to the context of a particular ontology. These queries can be translated into SPARQL and run against the unified graph comprising the ontology and data obtained from users to provide the user who initiated the query with data obtained from users that is relevant to the query. In this manner users are provided with a highly effective and contextual method for extracting meaning from obtained data. Specifically, the interface may present the users with the set of concepts or relationships utilized in the ontology to allow the user to forms queries based on these concepts and relationships. Searches can then be formed and conducted based on the ontology used to contextualize the data.

As can be seen then, embodiments of such an informatics system may provide methods of gathering data from various sources which allow the data to be contextualized according to a desired ontology and the data queried according to that ontology. By representing data in a graph form, the data may be recontextualized and queried according to substantially any desired ontology without either obtaining or reformatting such data again.

As has been noted above, embodiments of such informatics systems may be applied to almost any desired context, where the selection of certain ontologies to utilize in conjunction with any particular embodiment may be dependent, at least in part, on the desired context. Thus, for example, the syntactic ontology may be selected based on what type of text is expected, the semantic and domain ontology may be selected in order to contextualize obtained data according to a desired context such that the obtained data can be mined according to those ontologies.

Though embodiment of informatics systems may be useful in many contexts, certain embodiments may be particularly useful in the context of medical environments and generally in the field of medicine. This is because in the medical field free text entries in the form of discharge diagnosis, chief complaint, nurse and practitioner note, diagnostic reports and consultations, etc. are extremely important part of a patient electronic health record, are frequently unavailable for decision support and research queries due to its unstructured and unconstrained format. While human experts can effortlessly understand the meaning of the text, its implications in multiple different contexts (decision support, research, quality of care, etc.) or answer questions regarding patient health status, current computational processes are not able to process such health related free text to produce a structured data output from such free text to allow data mining of such free text such as question answering and information integration. Furthermore, in the case of a natural disaster or epidemic; understanding, diagnosing, treating and preventing human diseases requires the collection, integration and understanding of information and knowledge from a wide variety of highly distributed sources which may present a unique challenge in such circumstances. Accordingly in most medical environments it is desired to have effective informatics systems.

Figure 2:
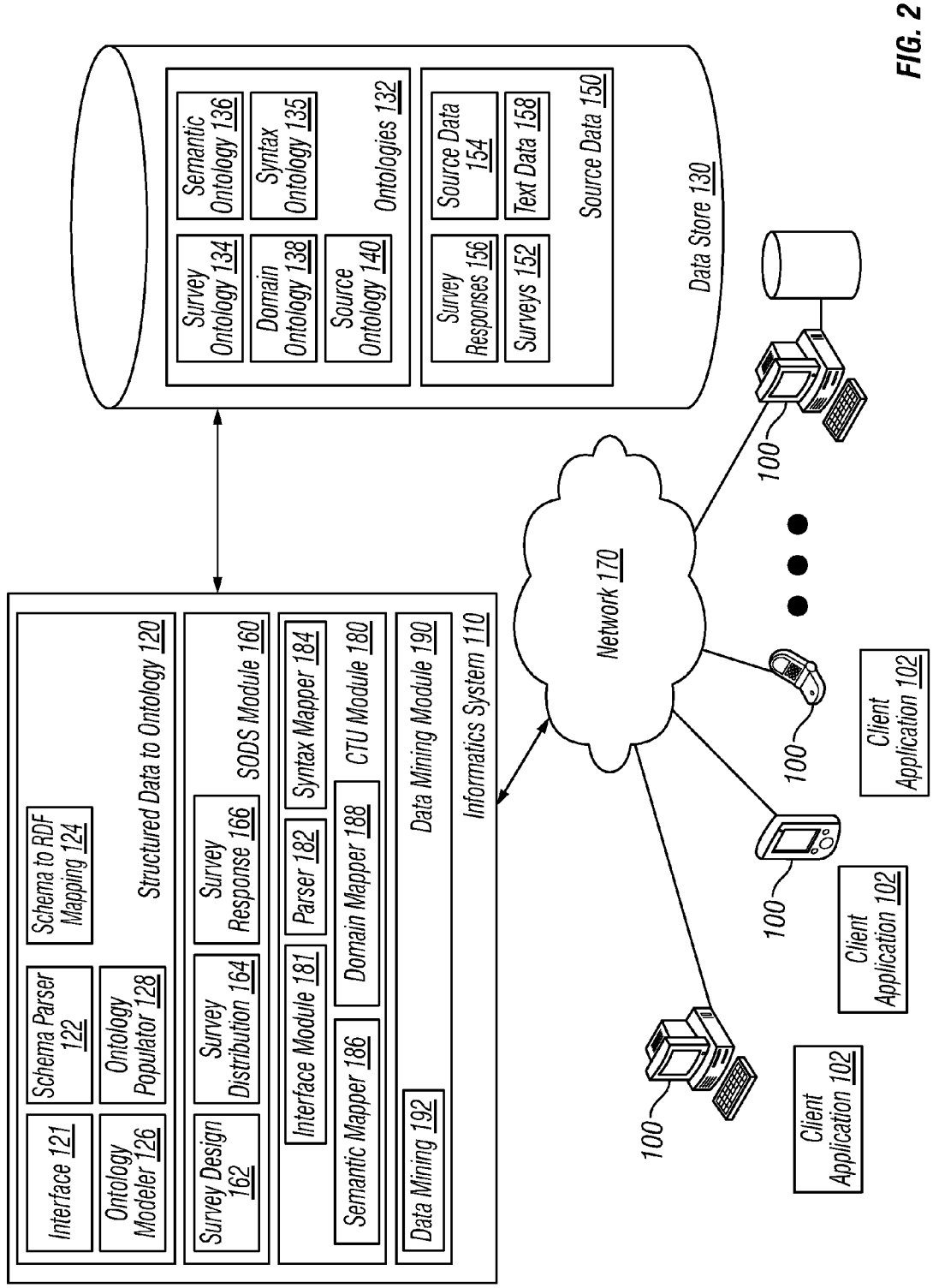
FIG. 2 depicts one embodiment of an informatics system integrated into a topology of a medical environment.

Moving now to FIG. 2, one embodiment of an informatics system integrated into a topology of a medical environment is depicted. Informatics system 110 allows for obtaining data from various data sources 100, representing the obtained data as a graph, mapping the graph to one or more ontologies, and the mining of the obtained data based on the ontology to which it is mapped. These data sources 100 may comprise almost any type of computing device from which it is desired to obtain data, included database systems; user devices such as computers, mobile phones, personal data assistants; an electronic medical records (EMR) systems; etc. where the data sources 100 may be coupled to informatics system 110 through network 170. Network 170 may be almost any type of wired or wireless communication medium, including for example, a LAN a WAN, an intranet, the Internet, etc. Informatics system 110 may communicate with data sources 100 over the network 170 utilizing a service oriented architecture, for example, Web Services or the like. Such an architecture may create modularized and asynchronous connectivity that allows any number of disparate data sources 100 to communicate with the informatics system 110 in a uniform, asynchronous and consistent way.

Informatics system 110 may comprise a data store 130, where the data store is configured to store graph representations of both ontologies 132 and source data 150. As mentioned above, a graph may be a formal graph which is a computer interpretable graph representation (an example which can be the resource definition framework (RDF) from the Semantic Web framework of technologies). Thus, such graphs may be stored in the data store 130 according to almost any format desired, as long as the graph can be derived. Data store 130 may therefore be, for example a native triple store or a non-native triple store that may be utilized with a converter between a relational database and a graph representation such as an Oracle Database 10g. Data store may also represent the graphs according to other knowledge representation schemes, including relational databases, XML objects, serializable objects, flat files, etc.

Ontologies 132 include at least one survey ontology 134, syntax ontology 135, semantic ontology 136, domain ontology 138 and source ontology 140, while source data 150 may comprise data generated by users directly through the informatics system 110 or users at data sources 100, data input to the informatics system 110 by a user directly or indirectly, or data otherwise obtained from one or more of data sources 100. Thus, source data 150 may include graph representations of: surveys 152, source data 154, survey responses 156 and text 158.

Survey ontology 134 may be an ontology configured for the ad-hoc collection and mapping of data in a distributed and collaborative environment. Survey ontology 132 may enable clinical researchers, practitioners, epidemiologists, public health researchers, responders etc. to interactively design and deploy dynamic data collection instruments (such as clinical research forms, surveys, questionnaires, data abstraction forms) on an array of hardware, software, and network platforms (web, PDA, tablet PC based) that can seamlessly operate in a collaborative, multi-organizational environment regardless of the continuous availability of a reliable communication network.

Survey ontology 134 may be a unified graph comprised of multiple sub-graphs, where each sub-graph is configured to enable a competency by representing the concepts and relationships associated with a competency. Examples of such competencies are Project Management (comprising, for example, concepts such as users, groups of users, sites, authentication rights and roles), Vocabulary Services (comprising, for example, concepts for managing local vocabularies, mapping to Standard Vocabularies or other Meta-Thesauri), Survey Management (comprising, for example, concepts for managing data collection instruments such as forms and questions, question options, question context, and their relationships with sites, groups and projects), Human-Computer Interface (comprising, for example, concepts for managing and describing the behavior of the UI objects to interact between instrument components and human users in different hardware and software platforms), Survey Templates (comprising, for example, concepts such as questions, form templates and Containers to manage an individual or a set of questions within their containers such that both questions and form templates could be reused, reconfigured and combined to construct new data collection instruments), Validation and Quality control (comprising, for example, concepts for single value validation, multi-value associative validation, multi-form associative validation, multi-project associative validation, etc.). It will be noted these competencies are examples only and that more or fewer competencies may be implemented.

In one embodiment, the survey ontology 134 may be represented using RDF/OWL. That is, the survey ontology 134 may be maintained as an OWL ontology. The graph representation of all models and meta-data along with modular design and separation of the objects through assignment of an independent and globally unique, unique resource identifier (URI) to all concepts may enable a complete view of all data and meta-data at any given time in a way that they can sustain functionalities in the informatics system. All objects and concepts within survey ontology 134 (for example, users, groups, sites, clients, vocabulary sets, questions, answers, options, GUI elements and styles, etc.) may be given, and identified by, a single globally unique URI that can be used to further characterize, classify, identify, retrieve or communicate the object with any and all systems and services.

Syntax ontology 135 is a graph representation of the potential content of string based data received by the informatics system 110, including for example a token dictionary, terminological knowledge or a lexicon. Such an ontology may represent the basic syntactic constructs that may be used by a parser to identify a sentence, and its pieces in order to parse it to a minimum number of legitimate tokens. As a parser may be language independent and have no grammatical commitment to a certain language, this syntax ontology 135 may establish a basis for identifying certain linguistic expressions that can be used by the parser to identify differences in data types (for example, Date, Time, Number, negation, etc.), and some syntactic cues that may be reliably used for segmentation of a sentence (for example, delimiters such as ",", or ".").

Specifically, in the setting of processing clinical text embodiments of the syntax ontology comprises minimal knowledge of English language in terms of its basic syntactic elements (for example, Negation marks, delimiters (for example, space, -, /), punctuations (for example, ".", ",", ";"), Acronyms (for example, MI=Myocardial Infarction), Numbers (for example, xsd:float, xsd:integer), Date (for example, xsd:DateTime) etc.) to define the existence of such concepts and their relationships in clinical text.

Syntax ontology 135 may also include a lexicon that allows a parser to identify surface expressions from clinical text that have non-biomedical semantics. For example, all categories of negation expression, uncertainty, names (of known real world objects, individuals, organizations, places), units of measurement, chemical elements and particles, etc. The syntactic ontology 135 may also include a lexicon for the generic and mainly non-clinical aspects of clinical content. Here, each lexeme may be represented in terms of a unique resource identifier (URI) that can be referred to by many morphologically different symbols. Each lexeme is modeled as an instance of at least one semantic class in the Lexicon (for example, "ctm:Reject models [reject, rejecting, rejected, rejects, . . . ]). Each class may have further semantics as inferred by its definition within the syntactic ontology 135 or mapping to any other set of ontologies.

Semantic ontology 136 may provide a generic and extensible ontology for prototypical clinical content. This ontology is conceptualized to serve as a high level schemata (a clinical upper level ontology) with a substantially minimal set of semantic constrains that sufficiently represent major patterns identifiable in typical clinical text, and enables extensions and mappings to more specialized ontologies to meet particular requirements of a new use case or domain. The semantic ontology 136 may also provide mapping points for importing new semantic or syntactic concepts, or dynamic extension to meet requirements of a new type of document or domain (for example to add concepts pertaining to medications and prescriptions, in a model originally intended to capture vital signs and physical exam data).

A semantic ontology 136 may include concepts such as clinical text and its different types such as chief complaint, relationships with presenter (for example, patient, nurse, EMS personnel, etc.), clinical observation (for example, sign, syndrome, disease, procedure, etc.), and their locus (for example, body site or region, body part, etc.), modifiers (for example, QualitativeModifier and QuantitativeModifer), clinical contexts (for example, Temporal_Context, Allergy, Causation_Context, Process_Context, Allergy_Context, History_Context, etc.), or a wide variety of other concepts.

Domain ontology 138 may be an ontology that represents domain or task specific knowledge about a particular domain that may have a variety of concepts, where the concepts may be referred to by a number of different labels. In one embodiment, domain ontology 138 may be an ontology representing the Unified Medical Language System (UMLS). UMLS is a compendium of many controlled vocabularies in the biomedical sciences. It provides a mapping structure among these vocabularies and thus allows one to translate among the various terminology systems; it may also be viewed as a comprehensive thesaurus and ontology of biomedical concepts. It is intended to be used mainly by developers of systems in medical informatics. UMLS includes the following components: Metathesaurus (UMLS-MTH) (instances of types) the core database of the UMLS, a collection of concepts and terms abstracted from the various controlled vocabularies, and their relationships and Semantic Network (UMLS-SN) (concept/types—events, entities, etc.) and a set of concepts and relationships that are being used to classify and relate the entries in the Metathesaurus. In the current version of the UMLS Semantic Network (SN) there are 135 Semantic Types (nodes) that are networked through 54 Semantic Relationships (links).

Domain ontology 138 may have been created based on a simple knowledge organization system (SKOS) model (UMLS-SKOS) developed to represent the UMLS-MTH schemata and the UMLS Semantic Network (UMLS-SN) and all relationships extractable from the combination. The UMLS-SKOS may thus be an OWL ontology that partially but consistently adopts the UMLS-SN for Semantic Web applications. This ontology may thus enable the informatics system 110 to classify, infer or retrieve concepts in the domain ontology 138 based on UMLS-SN. The UMLS-SN may be extended inside the UMLS-SKOS ontology with properties to assert correspondence of concepts from any ontology or SKOS concepts from other non UMLS source vocabularies with UMLS-SKOS.

The contribution of UMLS-SKOS ontology to the informatics system is to convert UMLS knowledge sources into a formal graph representation that can be mapped easily and readily to any other formal graph for contextualization and mining.

Specifically, in one embodiment, UMLS-MTH concepts are assigned at least one Semantic Type with the most specific semantic in the UMLS-SN hierarchy. Semantic Types contextualize UMLS-MTH concepts with textual annotations that define their types, and place them in an 'isa' hierarchy. The ontology maps each Semantic Type into a corresponding owl:Class and each UMLS-Semantic Relationship into an owl:ObjectProperty. Concepts and properties in this model have rdfs:subClassOf and rdfs:subPropertyOf relationships when there is an 'isa' relationship in UMLS.

In the domain ontology 138 each UMLS-MTH concept represents a resource with a unique resource identifier (URI) constructed using a NameSpace:CUI schema, where NameSpace can represent any unique URL such as 'umls=http://nih.nlm.gov/umls/'. All UMLS-MTH concepts may be conceptualized to be instances of (rdf:type) the concept representing its associated Semantic Type. The semantics of each UMLS-SKOS resource (each UMLS-MTH concept) is defined by its source and through variety of means: by a textual definition or annotation; by its Semantic Type and its place in the hierarchy; by source defined relationships between concepts, by terminological relationships between terms (hyponymy, hypernymy, synonymy, etc.) defined by the UMLS-MTH. There are, for example, major groupings of Semantic Types incorporated in the UMLS-SN and therefore in the domain ontology 138, for organisms, anatomical structures, biologic functions, chemicals, events, physical objects, and concepts or ideas. The creation of UMLS-SKOS for use as a domain ontology 138 will be discussed in more detail later herein.

Each UMLS-MTH concept is provided with a unique concept identifier (CUI) that is used as a mapping point between concepts from multiple source vocabularies. Any textual representation or 'atomic term' used by a source vocabulary to refer to a biomedical concept also has its own unique identifier (AUI). A CUI may be linked to multiple AUIs from the same or different source vocabularies (SABs). The UMLS-MTH also contains all relationships that a source vocabulary may have defined or describe between concepts or between terms. This qualifies the UMLS-MTH as a rich and expressive source of terminology for biomedical and clinical concepts.

However the UMLS-KS as is cannot be readily used or queried by a semantic application, as the semantics of the relational schemata used to construct the UMLS-KS are implicit and not available for mapping or real time inferences for information retrieval and querying by semantic applications.

In another, the informatics system may use GALEN ontology from openGALEN project as the domain ontology and formal clinical model or any other domain ontology that formally and properly defines clinical concepts and their labels and relationships with each other within that domain. The domain ontology once mapped to the semantic model is used by informatics platform to provide context for interpretation of obtained data and parse graphs that are mapped to the semantic and syntactic ontology.

A source ontology 140 may comprise a representation of the structure of data received from a data source or the like and the type of data comprised by that data source. As will be discussed in more detail later, this ontology may be created and updated automatically by the informatics system based on received structured data using a core schema ontology (CXM) and a datatype ontology. In one embodiment, concepts in a source ontology 140 may be mapped to concepts in a domain ontology 138.

Surveys 152 may be graph representations of a data collection instrument created by a user. Surveys 152 may serve to expand the survey ontology 134 (for example, by forming a unified graph with the survey ontology) by representing specific instances of concepts defined in the survey ontology 134 or representing new concepts which it is desired to create. Thus, a survey may specify specific instances, or types, of concepts defined in the survey ontology 134. For example, survey ontology 134 may define a "Question" concept. A survey 152 will define an individual object of type "Question" which asks "Has a Blood Transfusion been performed?". It will then create if not already present and map the question object to the Concept of "Blood Transfusion" which will provide meaning to the individual object, and enable its mapping to other concepts. Hence the question "Has a Blood Transfusion been performed?" will be mapped to the concept of "Question" in the survey ontology 134 that enable the system to serve it to client application.

A survey 152 may also represent new concepts, that were previously not defined in an ontology, such as, for example if the concept of a "Blood Transfusion" or a value of an answer (for example "Yes" or "No,"). Such concepts may be mapped to one or more concepts in the domain ontology 138. Specifically, in one embodiment, when a user defines a concept the domain ontology 138 may be searched (for example, using the MetaMap or MetaMap Transfer (MMtx) algorithm) to determine if any concepts in the domain ontology are associated (for example, over a certain score) with this newly defined concept. If any such concepts are found in the domain ontology the user may be given the option to map the newly defined concept to one or more of the found concepts.

It will be apparent that a survey 152 is extensible. Also it will be apparent that concepts in the survey may be mapped to other concepts in other ontologies. For example the concept of the question "Has a Blood Transfusion been performed?" may be mapped to the concept of "Infusion" in the some other ontology. As can be seen then, a unified graph may exist between for example, survey ontology 134, domain ontology 138, etc. Examples of such surveys and this type of mapping will be discussed in more detail later in this disclosure.

Source data 154 may comprise graph representations of data received as structured data from a data source. This data may be instances of a concept defined in the source ontology 140 corresponding to the data source from which the structured data was received (and that may have been constructed automatically by the informatics system based on the same structured data). Thus, a unified graph may exist between source data 154 and the source ontology 140. Furthermore, if as discussed above, the source ontology 140 is mapped to a domain ontology 138 a unified graph may exists between the source ontology 140, the source data and the domain ontology 138. Examples of such source ontologies 140, source data 154 and this mapping will be discussed in more detail later in the disclosure.

Survey responses 156 are graph representations of the responses to surveys 152 obtained from users at data sources 100. These responses may be instances of a concept defined in the survey ontology (for example, a question response concept) and may be associated with the question to which the response corresponds. For example, a "Yes" response to the question "Has a Blood Transfusion been performed?" may be represented as an object that is an instance of the question response concept mapped to the concept representing the question "Has a Blood Transfusion been performed?" ("Blood Transfusion" in this case) and the object representing the value "Yes". As can be seen then, a unified graph may exist between survey responses 156, survey 152, survey otology 134, domain ontology 138, etc. Examples of such survey responses 156 and this mapping will be discussed in more detail later in the disclosure.

Text data 158 may comprise a graph representing text obtained by the informatics system 110. A graph representing text data may be mapped to domain ontology 138 or semantic ontology such that a unified graph exists between these graphs. Such a graph representation may be produced as a result of the parsing of clinical text based on syntax ontology 135.

Informatics system 110 may utilize ontologies 132 and source data 150 in a variety of functions. These functions may include the implementation of a survey on demand system (SODS) module 160, a clinical text understanding (CTU) module 180, a structured data to ontology module 140 and a data mining module 190. SODS module 160 allows for data collection from users at various client devices 100 executing a client application 102.

SODS module 160 may include a survey design module 162, a survey distribution module 164 and a survey response module 166. Survey design module 162 may allow a survey to be constructed based on one or more ontologies 132, including the creation of new concepts in conjunction with the creation of the survey and value sets representing the values of potential answers to questions. More specifically, the survey design module may utilize survey ontology 134 to allow a user to create a survey based on one or more concepts in the survey ontology 134 (for example, by creating specific instances of concepts in the survey ontology 134) or to add concepts in conjunction with the creation of the survey, including concepts pertaining to the question and concepts pertaining to a value set comprising the values of potential answers to a question. The survey design module 134 may also allow concepts associated with the survey, such as values of a value set to be mapped to concepts in another ontology, for example domain ontology 138. Thus, the survey created by the user (including any new concepts defined by the user) is a graph which represents the survey and concepts created by the user. The survey is mapped to the survey ontology 134 and thus a unified is graph is formed between any survey 152 created by the user, the survey ontology 134 and the domain ontology 138. In this way, not only can surveys be created by the user, but the concepts defined by the user may be used to extend the survey ontology 134 (through the mapping between the graph representing the survey created by the user and the survey ontology 134).

A survey 152 can then be distributed to users on client devices 100 which are executing a client application 102 associated with SODS module 160 using survey distribution module 164, which may employ a network service such a web service or the like to distribute the survey to a client application 102. Client application 102 may be web based (for example, executed on a browser at the client and downloaded via a request to informatics system 110), a resident application, etc., that communicates through a architecture provided by the informatics system 110 (for example, a services architecture or the like). Client application 102 may access survey distribution module 164 and provide some form of user credentials. These credentials may serve to identify the user of the device 100 utilizing the client application 102. The client application 102 may also identify any surveys which have been previously received and stored on the device 100.

In response, the survey distribution module 164 may identify any surveys 152 to be delivered to the client application 102. These surveys 152 may be surveys 152 identified based on the user credentials, demographic data, or other types of data associated with a user that may be determined based on the user credentials received or otherwise determined by the ontology. The surveys identified may be new surveys (not previously provided to the client application 102) or may be updated versions of surveys previously provided to the client application 102. The survey distribution module 164 may then deliver one or more of these surveys to the client application 102. The client application 102 may also cache interactions internally and securely when an online service from informatics system 110 is not available, and when connectivity is established again, resume communication.

The client application 102 can render an interface at the client device 100 to present the questions of the survey to the user based on the survey and send the user's responses to these questions to survey response module 166. Survey response module 166 may be configured to validate and store responses received from client application 102 as a survey response graph 156. More specifically, the response module 166 may receive the responses from the client application 102, create instances of a concept for a question response for each response and map the question response to a value of the value set associated with the question. The question response may also be mapped to a variety of other concepts, such as for example, a concept representing the change history of the value, time a value has changed, etc. By mapping the question responses to the questions themselves, or other concepts, a unified graph is created between the survey 152 itself, the survey responses 156, the survey ontology 134 and the domain ontology 138. Such a unified graph enables the response data to be retrieved based on the survey design (questions and their answers) or based on the concepts and their relationships from the ontology(s) (for example, people and their diseases).

Moving now to the clinical text and understanding (CTU) module 180, CTU module may comprise an interface module 181, a parser 182, a syntactic mapper 184, a semantic mapper module 186 and a domain mapper module 188. The CTU module 180 may receive clinical text though the interface module 181. This clinical text may take a variety of forms, including text transcribed from a doctor's or nurse's notes or charts, text from an EMR or other type of medical record, notes from a clinical trial, or text from almost any other source desired.

Parser module 182 is configured to utilize syntax ontology 135 to parse the received text and may be configured to accomplish such parsing regardless of whether such clinical text has a well formed syntax or grammatical representation. Such a parser may not be dependent on the syntax of language, as the use of chunks (tokens) and a moving window may account for cognitive aspect of human reading text as will be discussed in more detail later. Accordingly, such a parser may be utilized effectively, even with grammatically incorrect or structurally aberrant text (often produced by doctors).

Parser module 182 may create text data 158 that may include a parse graph for the received text. A parse graph is a graph representing the received clinical text that comprises concepts representing the tokens in the clinical text and their relationships to one another, including the order of the tokens their string representation. In other words, an instance of a concept in the syntax domain 135 may be created and associated with the value for a token. Thus, the concepts representing the tokens of the clinical text may be associated with corresponding concepts of the syntax ontology 135 as the parse graph generated by the parser module 181 may be mapped to the syntax ontology 135. By mapping the parse graph to the syntax ontology a unified graph is created between the parse graph and the syntax ontology 135.

Domain knowledge mapper module 188 may determine a corresponding concept in the domain ontology 138 for each token in the parse graph. This can be done using any search algorithm such as but not limited to MetaMap mapping algorithm to locate a concept in the domain ontology 138 (for example, URI then type of that URI) associated with each token of the parse graph. The concept in the parse graph representing that token can then be mapped to the associated concept located in the domain ontology 138. By mapping the concepts of the parse graph to an associated concept located in the domain ontology a unified graph is created between the parse graph for the clinical text and the domain ontology 138.

Semantic mapper module 186 may then use the unified graph of the parse graph and the domain ontology 138 to map concepts in the parse graph to concepts in the semantic ontology 136. More specifically, for each of the tokens in the parse graph the semantic mapper module 186 may determine an associated concept in the domain knowledge base. The semantic mapper module 186 can then determine if a mapping exists between the concept in the domain ontology 138 and the semantic ontology 136. If such a mapping exists the semantic mapper module 186 may map the concept in the parse graph to the concept in the semantic ontology. In this manner, a unified graph is created between the parse graph for the clinical text, the domain ontology 138 and the semantic ontology 136.

Referring now to structured data to ontology module 120, this module may comprise an schema parser module 122, an structured data to RDF mapping module 124, an ontology modeler module 126, an ontology populator module 128 and an interface module 121. The structured data to ontology module 120 may receive structured data (for example, data in an XML document or data formed according to a database schema of a data source) through the interface module 121. The structured ontology module 120 may process this structured data to create a source ontology 140 to represent the structure and type of the data received. Using this source ontology 140 a graph representing the actual data received may be constructed (for example, a source data 154 graph). Thus, a unified graph between the source ontology 140 and the graph representing the received data is formed. In some embodiments, the concepts of the constructed source ontology 140 may be mapped to concepts in domain ontology 138 using automated algorithms like the MMtx algorithm or manually. Thus, the unified graph formed may comprise not only the source ontology 140 and the source data graph 154 constructed based on the received data but the domain ontology 138 as well. In this manner, the received data may be mined by querying the unified graph according to the concepts and relationships of the domain ontology 138.

In one embodiment of the system, once the mapping between source ontology and domain ontology concepts established (automatically or manually) the system would replace the source ontology concepts with the domain ontology and populate the domain ontology using data from structured data instead of populating the source ontologies. This may improve the mapping and facilitate the mining of the resulting unified graph according to an existing domain ontology.

More particularly, once structured data is received at the interface 121, the Schema parser module 122 may use a core schema ontology to parse received structured data from a data source to create a source specific schema model (XMODEL) corresponding to the data source from which the structured data was received. In one embodiment, XMODEL basically translates the schema of the structured data into a formal and explicit graph that a computer system can query, and interpret. It does not contain the actual data contained by the structured data (only a formal representation of the data model that can be extracted from the structured data). In some embodiments of the system it may be updated by human experts to make configurations and add mapping information for use by future processes. Structured data to RDF mapping module 124 may utilize the XMODEL to automatically create a graph representation of the received structured data. This graph representation may be an RDF representation of the structured data based on the descriptions in the XMODEL. Ontology modeler module 126 may use this graph representation to create a source ontology 140 corresponding to the data source from which the structured data was received. Ontology populator 128 may utilize the source ontology and the graph representation of the structured data received from the data source to construct a graph representation of the actual data received from the data source, where the graph representation of the actual data received from the data source is mapped to the created source ontology 140.

It may be useful here to go into more detail with respect to the various methods implemented by the modules of the informatics system. Addressing first the SODS module 160, the functionality of such a SODS module may be better explained first with reference to the ontologies which it may utilize. Survey ontology 134 may be an ontology configured for the ad-hoc collection and mapping of data in distributed and collaborative (teamwork) environment. Survey ontology 132 may enable clinical researchers, practitioners, epidemiologists, public health researchers, responders etc. to interactively design and deploy dynamic data collection instruments (such as clinical research forms, surveys, questionnaires, data abstraction forms) on an array of hardware, software, and network platforms (web, PDA, tablet PC based) that can seamlessly operate in a collaborative, multi-organizational environment regardless of the continuous availability of a reliable communication network.

Figure 3:
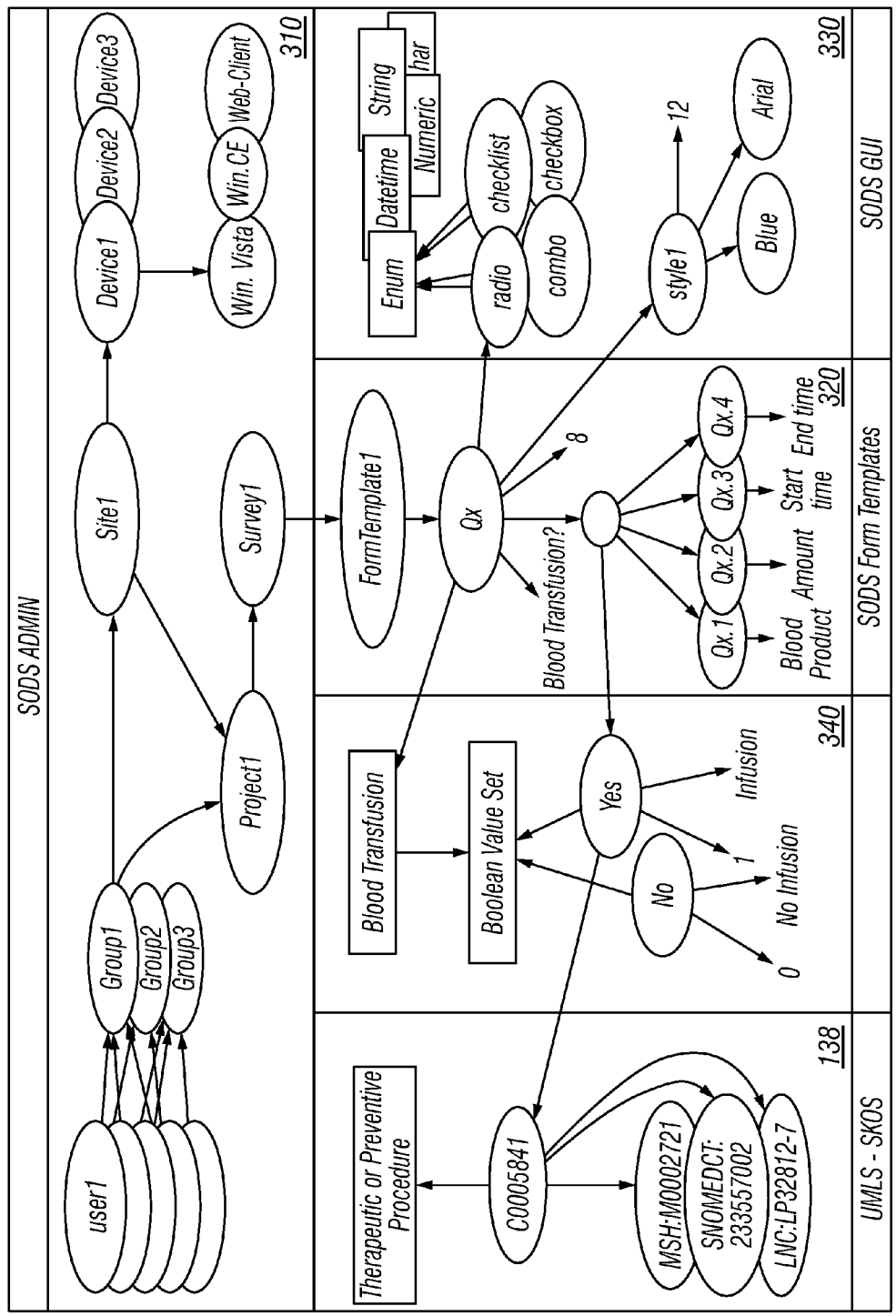
FIG. 3 depicts a portion of a survey ontology.

Survey ontology 134 may be a unified graph comprised of multiple sub-graphs, where each sub-graph is configured to enable a competency by representing the concepts and relationships associated with a competency. A graphical depiction of a portion of such a survey ontology is depicted in FIG. 3. It should be noted here that the sub-graphs, competencies, concepts, relationships, ontologies, etc. depicted herein are to serve as examples only and that other ontologies, sub-graphs, competencies, concepts, relationships, etc. may be imagined and implemented based upon the context in which embodiments of the informatics system 110 is implemented and the desired functionality of the informatics system in these embodiments.

Here, survey ontology may comprise a sub-graph 310 for the project management competency (for example, comprising concepts such as users, groups of users, sites, surveys, etc.). Here, for example, the concepts of users, groups, projects, sites, devices, operating systems are depicted along with the relationships between these various concepts. Sub-graph 320 represents a form template, and comprises concepts such as a form, a question, a value set for an answer, etc. Notice that the form template concept is related to the survey concept of the project management sub-graph 310. Sub-graph 330 comprises the concepts for the graphical rendering of the concepts in the form template, including for example, concepts related to the appearance of a question in a survey (for example, radio, checklist, checkbox, combo, etc.) and the concepts of the type of input values that the interface will present (for example, an enumerated value, a string, a numeric value, etc.), the concept of the style that the question is to be presented in (including for example, the concepts of color and font). Notice that the question concepts in the form template sub-graph 320 are related to concepts in the sub-graph 330. Thus a question may be related to the concepts that describe how to render that question for presentation.

The survey ontology 134 may also be expanded by a user of the informatics system 110, for example during the creation of a survey. When defining a question for a survey the user may define a concept associated with the question if the concept does not already exist in the survey ontology 134. The concept defines the value set of answers to the question based on the newly defined concepts. In the example depicted, the question in the sub-graph 320 is related to concept of "Blood Transfusion" (for example, a context) in the sub-graph 340 which is related to the concept of a Boolean value set and the concepts of the values "Yes" and "No." In this manner, a user may create new-sub-graphs of concepts, value set and values and these sub-graphs may be unified with the survey ontology 134 to extend the survey ontology 134.

The concepts representing related to questions and the concepts representing the potential answers may be linked to one or more concepts in a domain (or other) ontology, to unify the survey ontology 134 with a domain ontology 138. As depicted in FIG. 3, the concept of "Yes" for the concept "Blood Transfusion" is mapped to a concept unique identifier (CUI) or URI in the domain ontology 138 (in this example, UMLS-SKOS) associated with the label "Therapeutic or Preventative Procedure" and the associated concepts in each of the various sources (for example SNOMED, LNC, etc.). Specifically, in one embodiment, when a user defines a concept the domain ontology 138 may be searched (for example, using the MetaMap algorithm) to determine if any concepts in the domain ontology are associated (for example, over a certain score) with this newly defined concept. If any such concepts are found in the domain ontology 138 the user may be given the option to map the newly defined concept to one or more of the found concepts.

Figure 4:
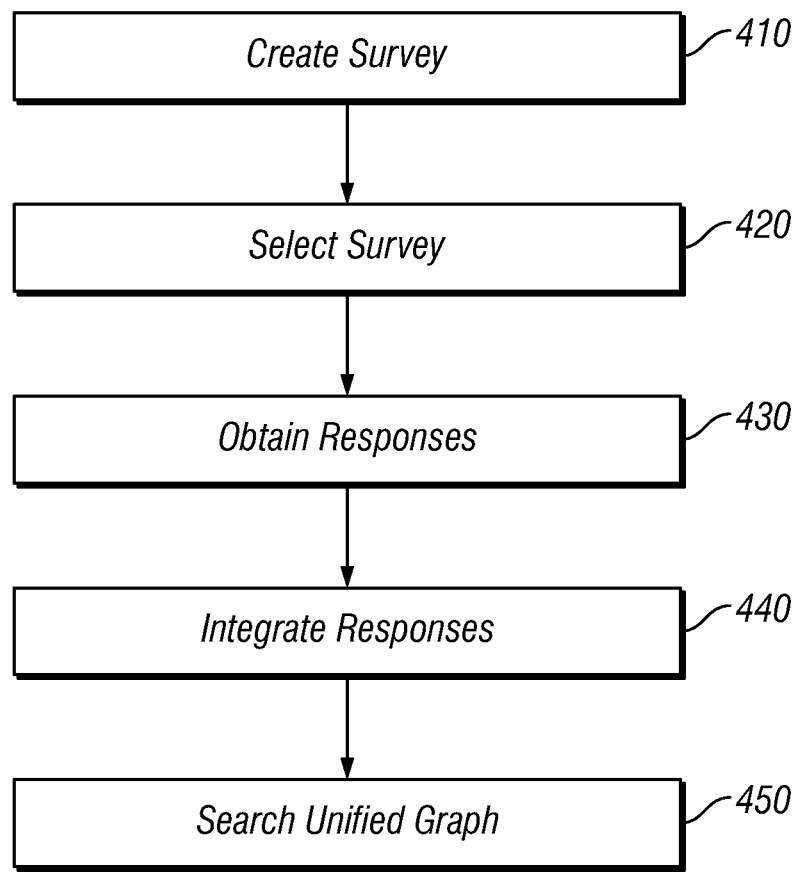
FIG. 4 depicts one embodiment of a method to gather and mine data based on a survey ontology.

FIG. 4 depicts one embodiment of a method employed by SODS module to gather and mine data based on such a survey ontology. At step 410 a user may create a survey based on a survey ontology. More specifically, an interface may be presented to a user to allow a user to create a survey. A survey may be a data collection form based on the concept of a form template, each form template is in turn a reusable collection of questions (mapped to a question concepts) that can be shared or used by several surveys, each question may be mapped to a context concept and concepts related to a set of values that define answers for that question. Questions may also be mapped to other questions such that if a particular value for the set of values that define answers for that question is provided by a user a set of associated questions may be presented to the user. The set of new questions related to each value may be predetermined and mapped at the design time or inferred and at the run time based on the constrains entered in the survey ontology. Furthermore, the user may be given the opportunity to define new concepts to expand the survey ontology and to map these newly defined concepts to concepts of the domain ontology.

Figure 5:
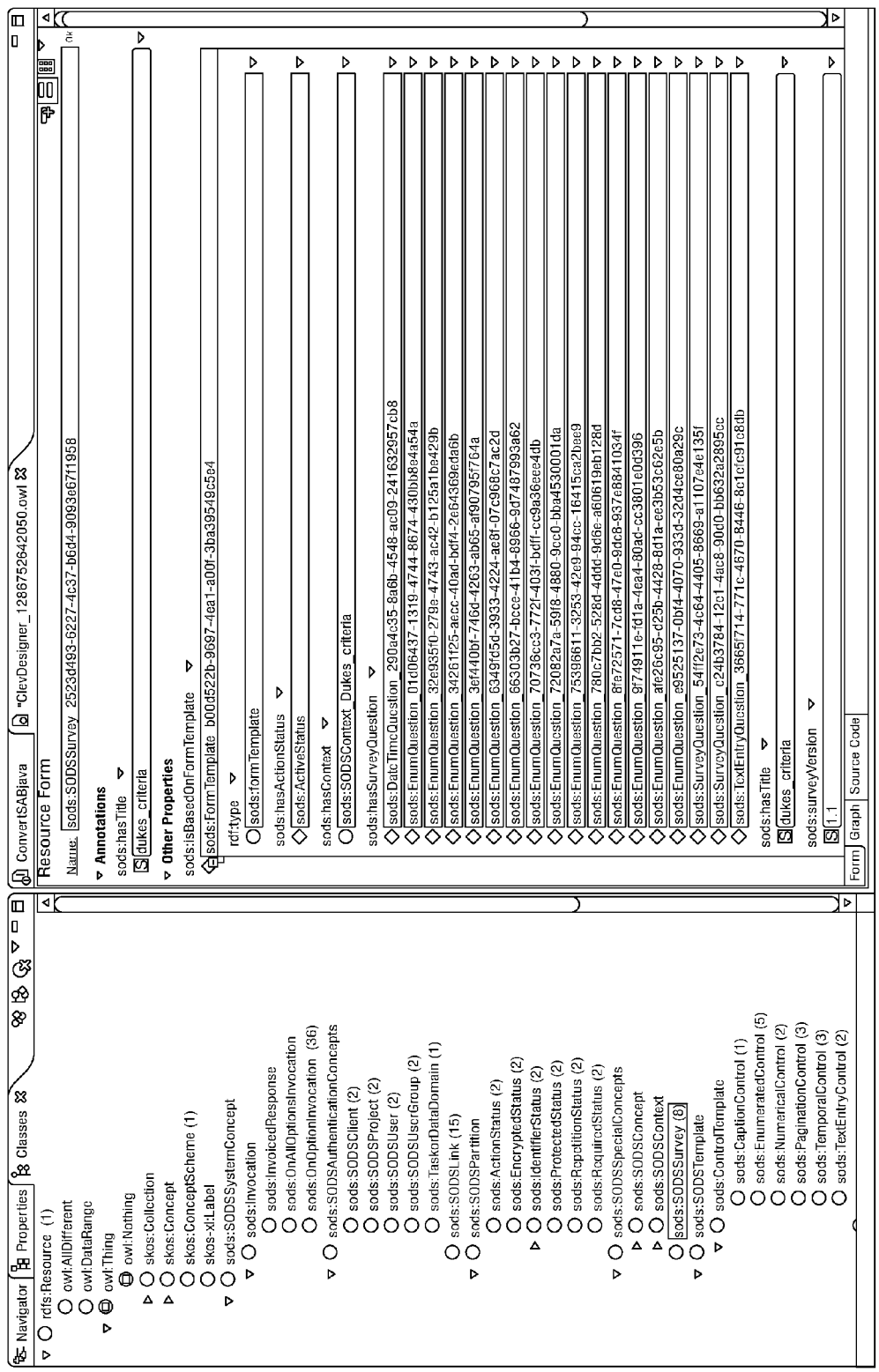
FIG. 5 depicts one embodiment of the composition of a form as a graph representation in the ontology.

It may be helpful here to discuss the creation of such surveys and the ontologies involved in the creation of such surveys. As mentioned a survey may comprise a form for the collection of data. A survey may be a form based on a "form template" concept, where each form template may comprise a collection of questions. FIG. 5 depicts an embodiment of an interface that shows the composition of a form. Notice that the form depicted in FIG. 5, is based on the concept "sods: FormTemplate," and is comprised of a number of questions including an instance of "sods:DateTimeQuestion".

Figure 6:
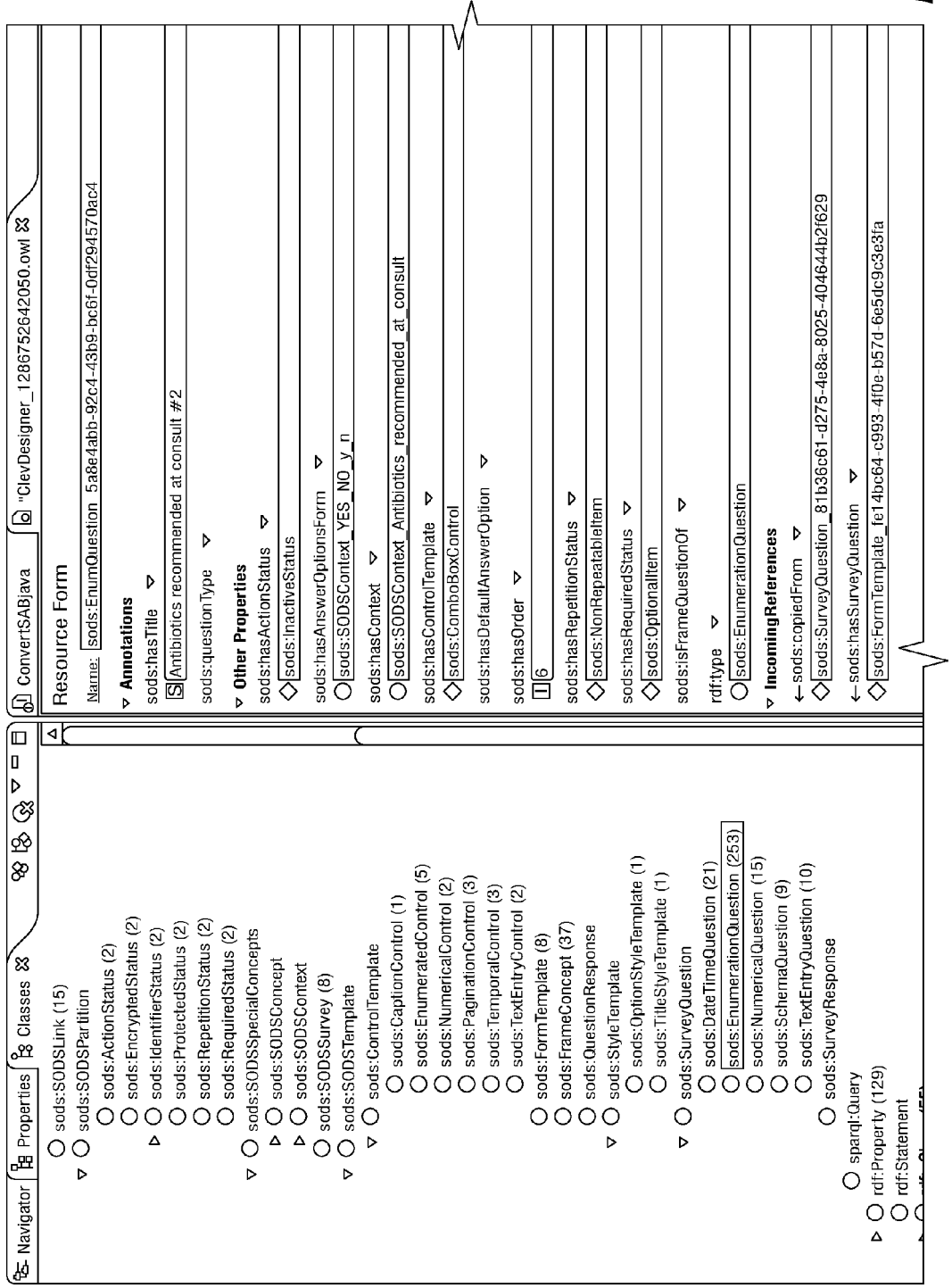
FIG. 6 depicts one embodiment of the definition of an enumerated question in conjunction with a survey in the ontology.

FIG. 6 depicts one embodiment of an interface which shows the definition of a single enumerated question in conjunction with a survey. An enumerated question may be an instance of the question concept. An enumerated question can be mapped to concepts that define the set of values that can be provided as answer, concepts that define its semantics (context), concepts that define how the question is to be presented in a user interface layout, etc. Question may also be mapped to the form templates to which it belongs or for templates where the question was copied from.

Figure 7:
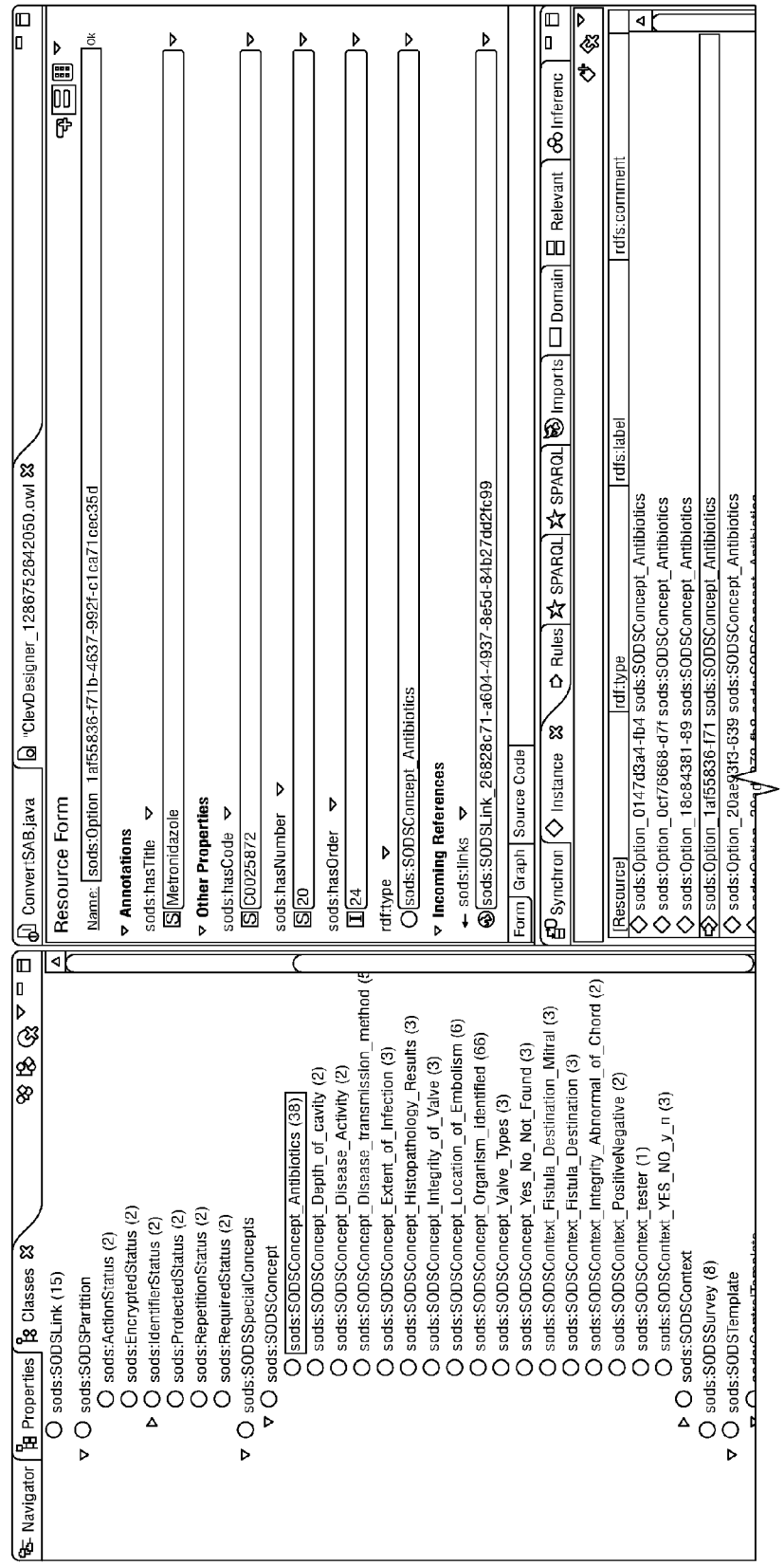
FIG. 7 depicts one embodiment of the linking of an enumerated question to concepts that define valid value sets (response options) for the question according to the ontology.

FIG. 7 depicts one embodiment of an interface which shows the linking of an enumerated question to concepts that define valid value sets for the question. Enumerated Questions are linked to a concept in the survey ontology that define their valid value sets. That is, the response ranges that are valid for that question. In this example the concept of antibiotics incorporates 38 different valid responses for any question that asks about Antibiotics. Each value in the value set (each option for an answer to the question) may be further defined and mapped by an individual URI in the survey ontology such that a mapping (for example, using the concept sods:links) can be established with another ontology (for example, a domain ontology) to further specify its semantics. For example in this case, the option Metronidazole is mapped to a URI that maps it to a UMLS-CUI (for example, a CUI in the UMLS-SKOS ontology) that is associated with the National Institute of Health (NIH) definition of Metronidazole.

Figure 8:
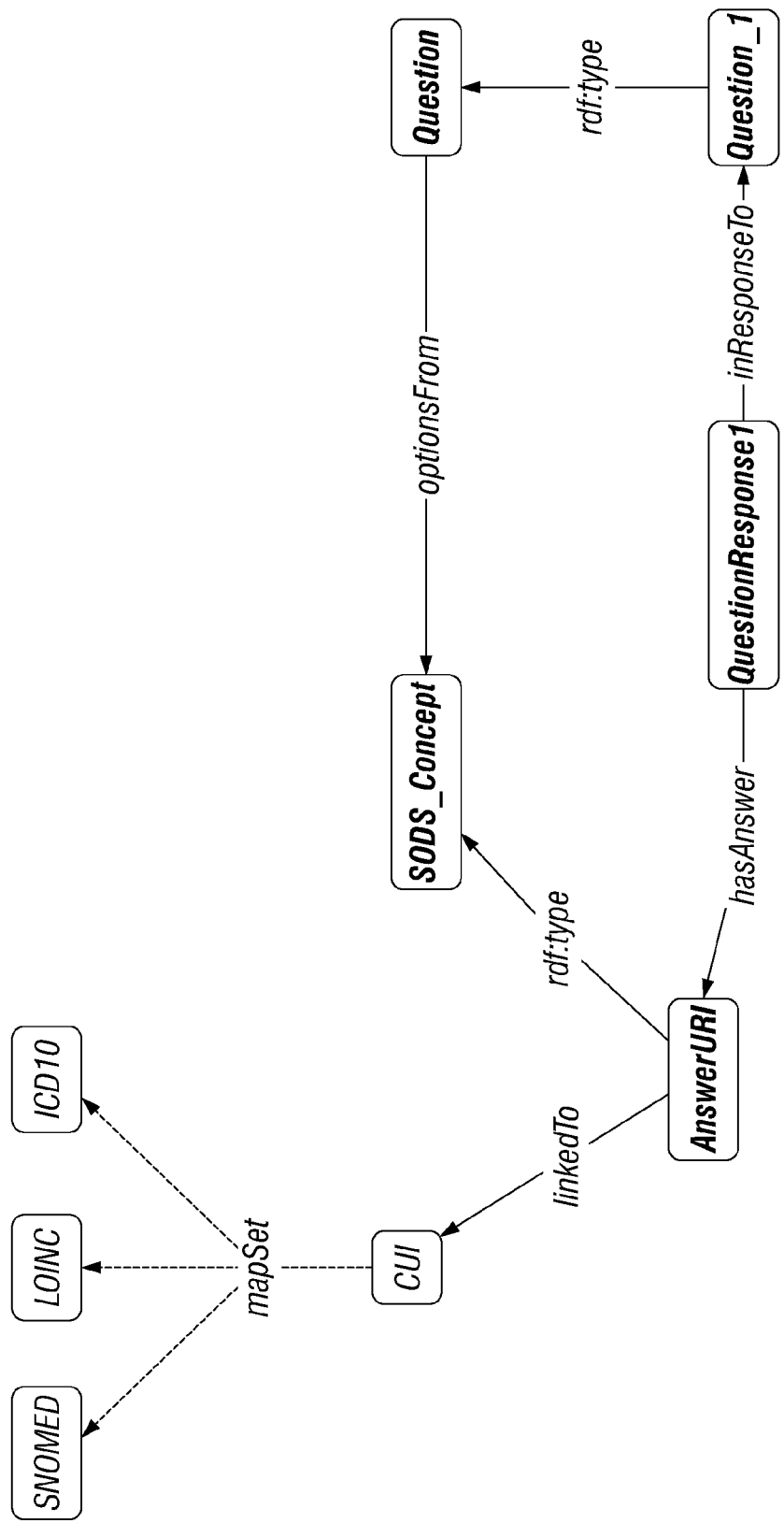
FIG. 8 depicts one embodiment of the mapping between value sets and an ontology to enable contextualization of the responses according to an external source of knowledge. Each value can be mapped to a set of concepts from a set of ontologies ad-hoc, for further contextualization.

A depiction of one embodiment of the mapping between value sets and an ontology is depicted in FIG. 8. In this example, the URI of an answer in the survey ontology is mapped to a CUI of the UMLS-SKOS domain ontology which is, in turn, mapped to definitions in a set of source vocabularies.

Figure 9:
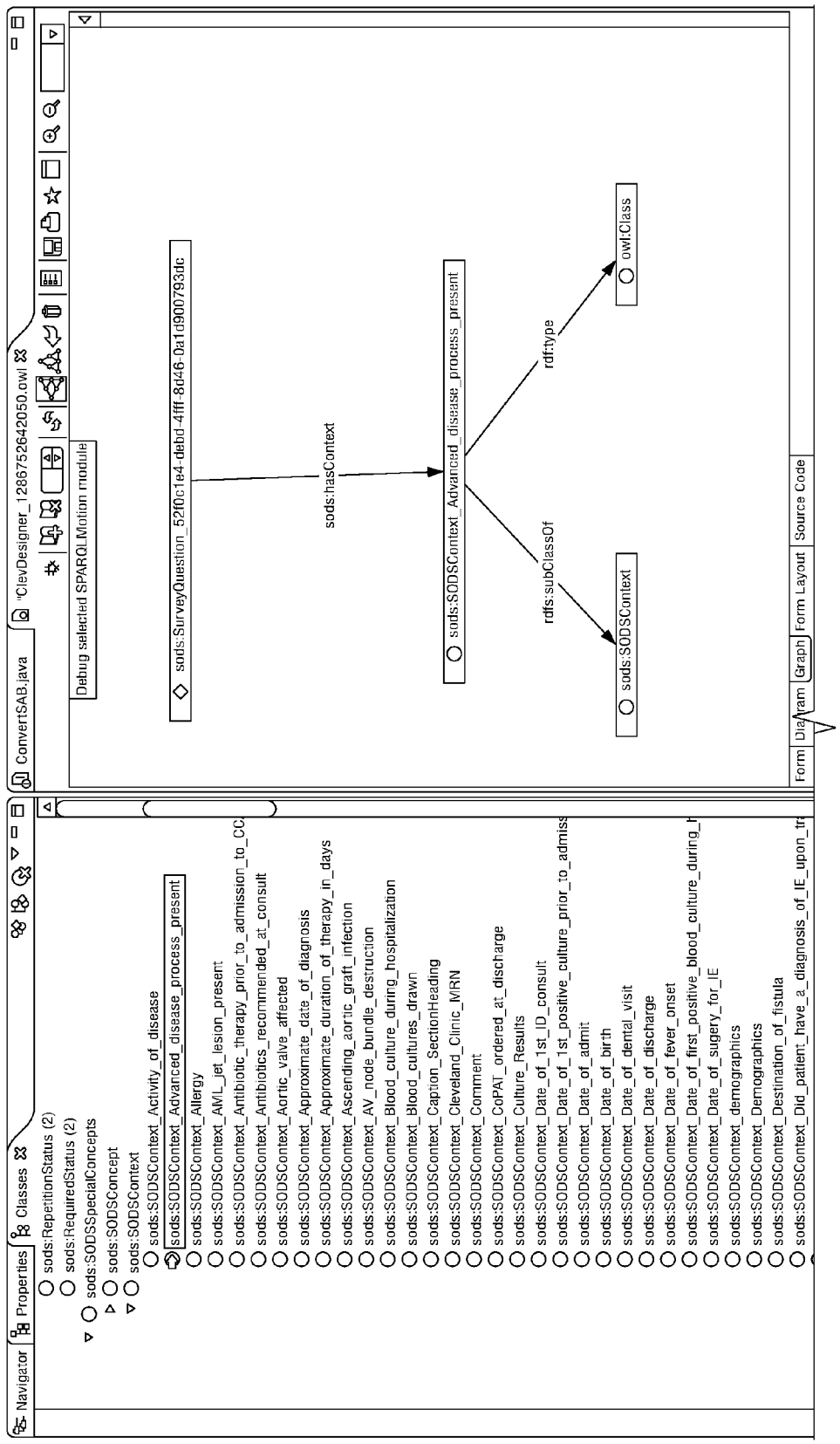
FIG. 9 depicts one embodiment of a concept assigned to an enumerated question that can mapped to a set of domain ontologies for further contextualization.

FIG. 9 depicts one embodiment of an interface which shows the concept assigned to an enumerated question, where the concept defines the context of the answers. Once an answer is provided for a question, it may become an instance of this context concept. In this manner if the context concept is mapped to another ontology or defined formally, all responses to that question will inherit that mapping. Furthermore, several different questions that are mapped to the same context, may be treated as the same question, even if they have different titles or are mapped to different interface concepts. Responses to several questions across different projects and different forms can thus be integrated with each other by mapping them to the same context.

Figure 10:
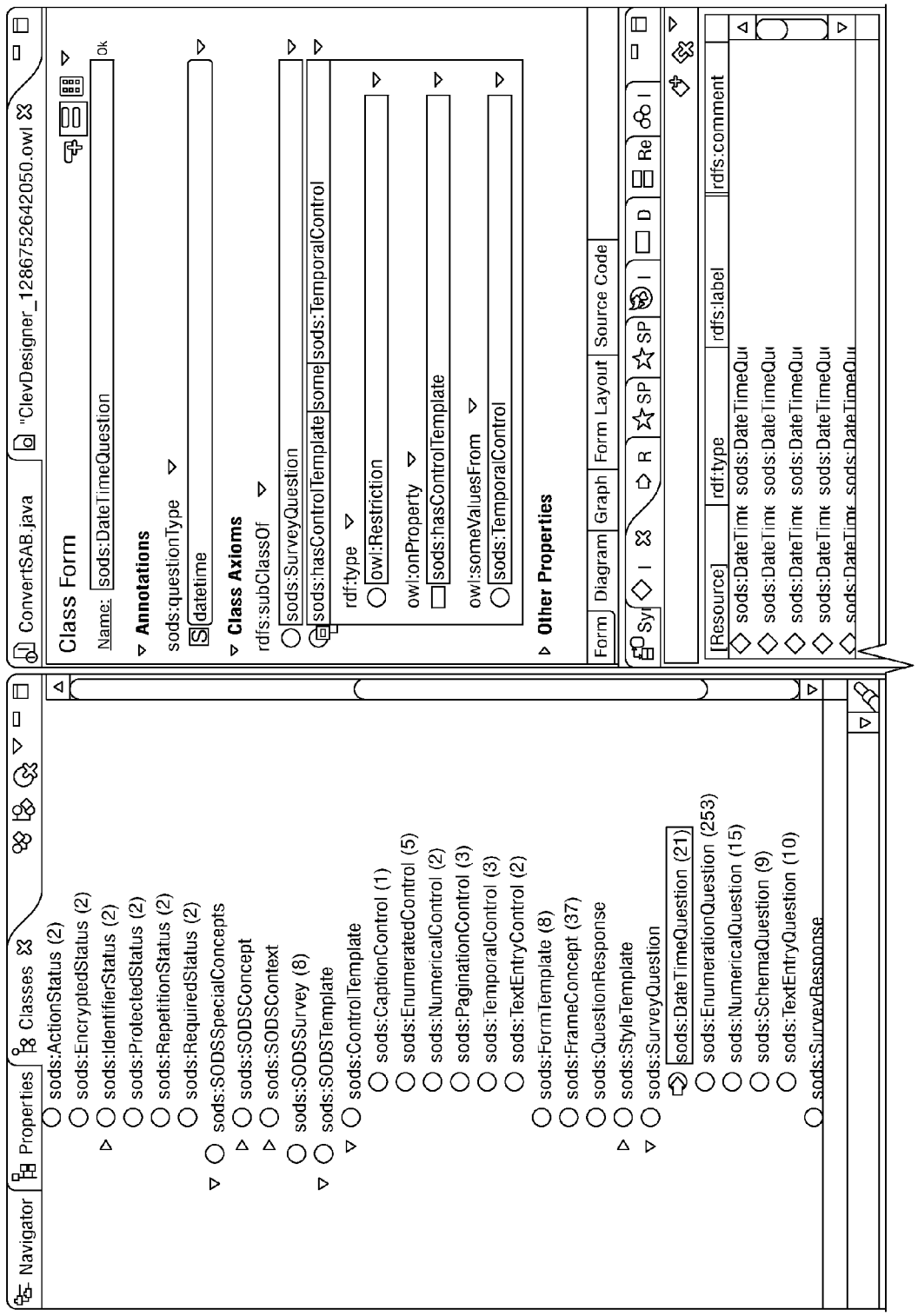
FIG. 10 depicts one embodiment of the definition of a question as a graph representation in an ontology.

Turning now to FIG. 10, one embodiment of an interface which shows the definition of the "sods:DateTimeQuestion" as illustrated with respect to FIG. 5 is depicted. The Datetime question may be defined using a user interface that allows a user to expand the survey ontology. Here the Datetime question is logically defined as a generic surveyQuestion (for example, the concept of the Datetime question will be mapped to the concept of surveyQuestion) where its control templates (for example, validation and user interface characteristics) are defined by the concept of TemporalControls in the survey ontology (for example, the concept of the Datetime question will be mapped to the concept of TemporalControls) such that when the user accesses a survey that includes the Datetime question it will be presented according to the concept TemporalControls and any answer the user provides to the TemporalControls may be validated according to the concept TemporalControls.

Figure 11:
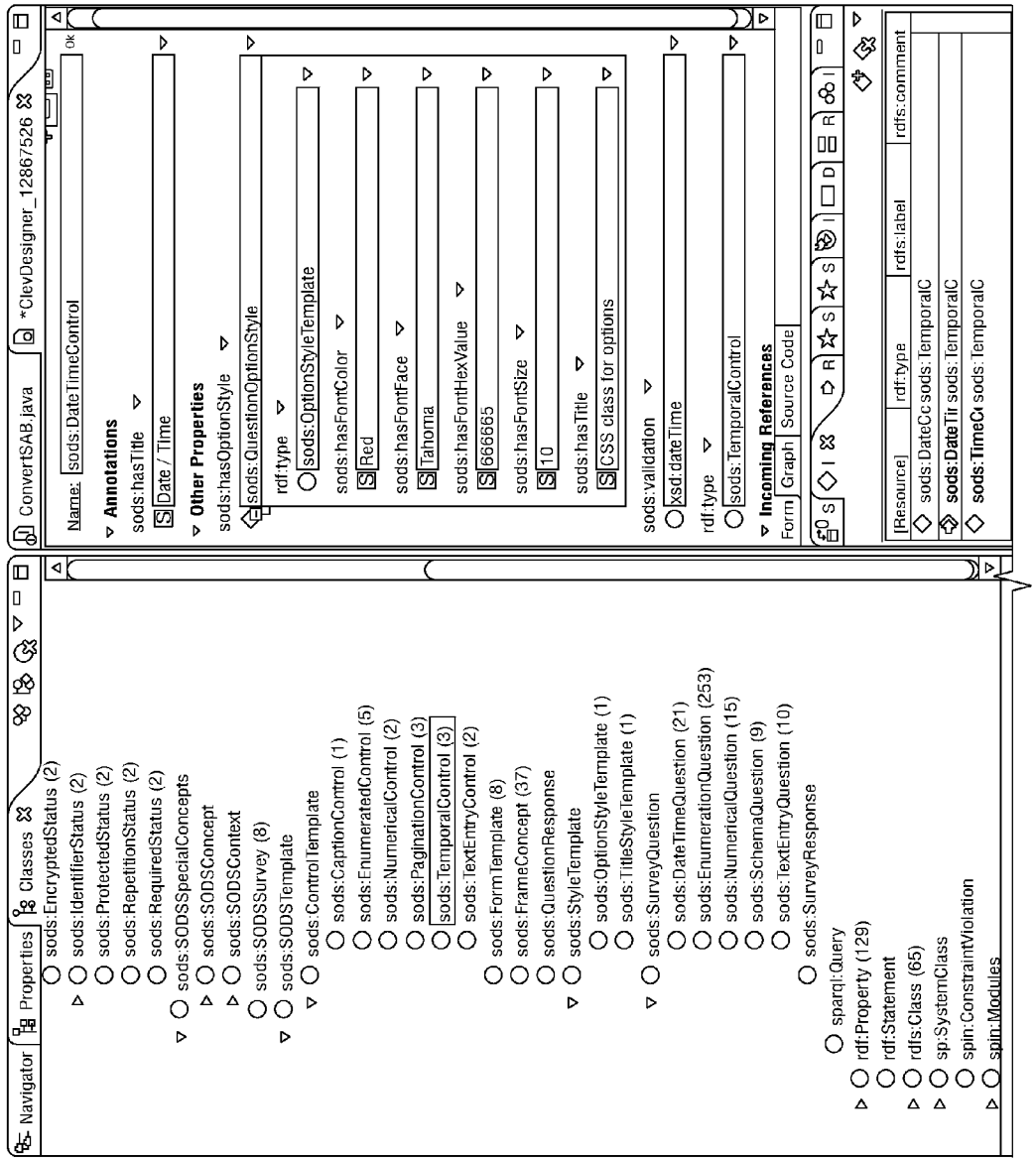
FIG. 11 depicts one embodiment of the mapping of a question to a concept that controls the graphical user interface representation of that concept in the client application.

FIG. 11 depicts one embodiment of an interface displaying a configuration of a TemporalControls concept (sods:DateTimeControl) mapped to the Datetime question concept. This TemporalControls concept provides a data type validation scheme and user interface object to capture the data associated with the Datetime question. In this example, the sods:DateTimeControl concept is also linked to an specific style concept in the survey ontology that controls its layout on a GUI (for example, sodsQuestionOptionStyle).

Figure 12:
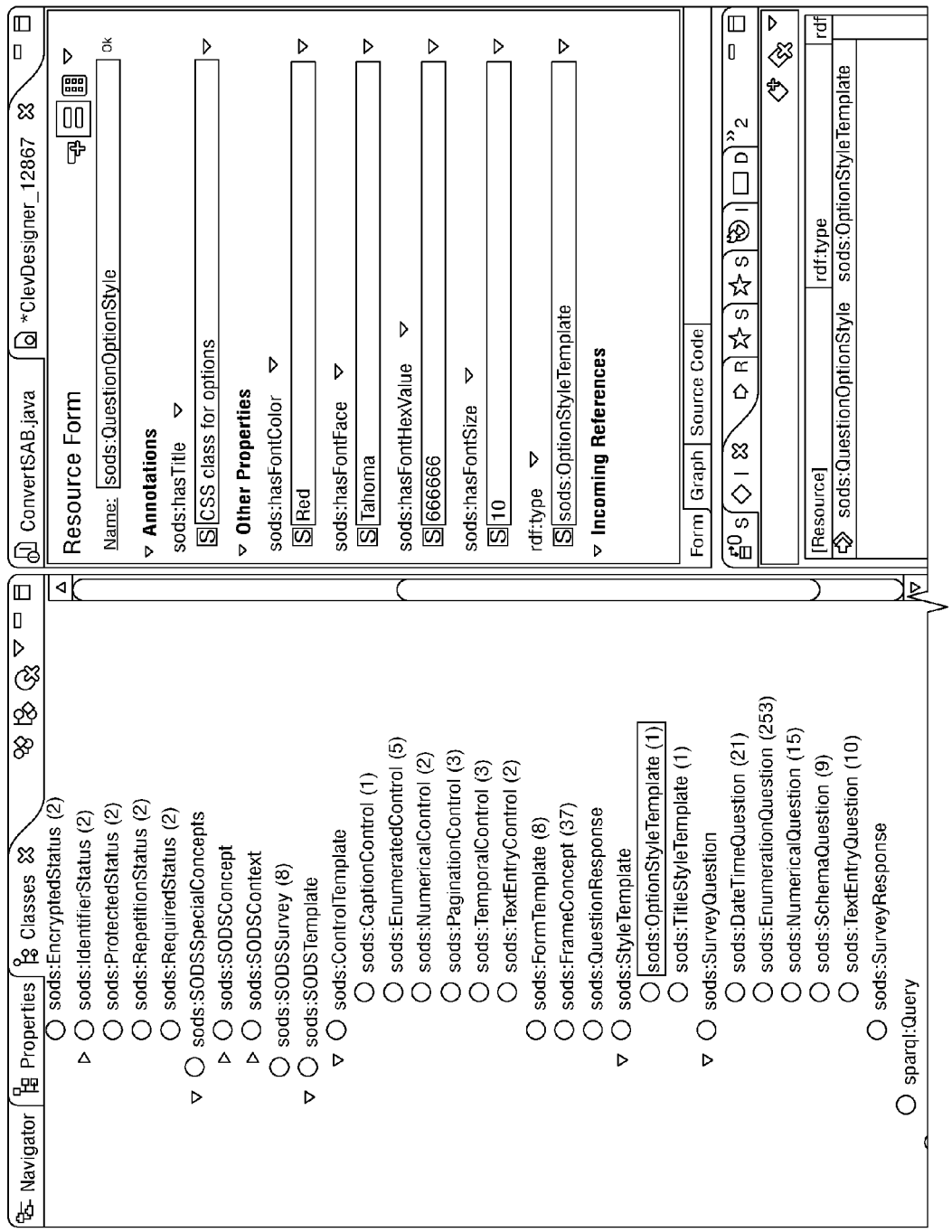
FIG. 12 depicts one embodiment of the configuration of a user interface style concept within the ontology.

FIG. 12 depicts one embodiment of an interface displaying a configuration of the style concept sodsQuestionOptionStyle. This style concept may serve to define an interface style to a user interface object such that any concepts mapped to the style concept may be displayed according to that style (for example, Red, 10 point, Tahoma font).

Figure 13:
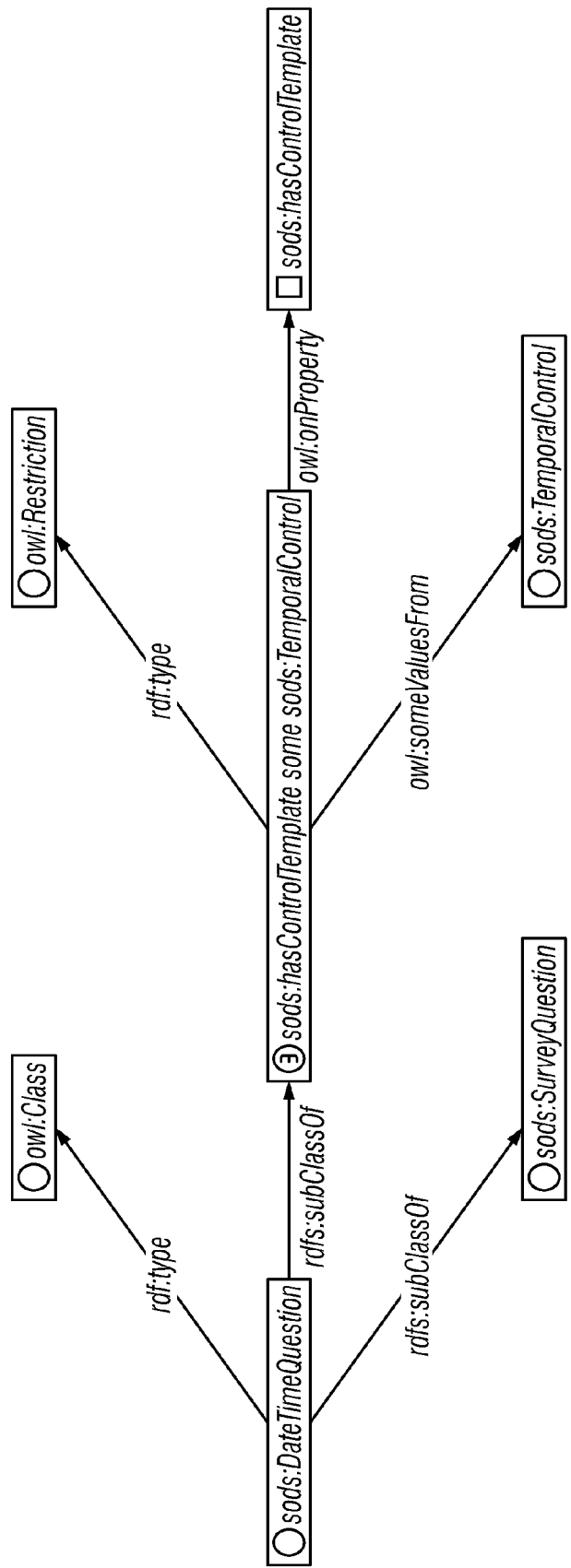
FIG. 13 depicts a portion of a survey ontology represented as graph.

FIG. 13 is a representation of a portion of the survey ontology that includes the "sods:DateTimeQuestion" concept. More specifically, the graph in FIG. 13 represents the DateTimeQuestion as logical definition of a generic surveyQuestion where its ControlTemplates (validation and user interface characteristics) are defined by the concept of TemporalControls as discussed above.

Any question can be linked to a frame concept (referred to as FrameConcepts) to invoke a new set of questions based on the response provided to the question, such that when a user provided a particular response to a survey question the set of questions associated with the frame concept will be presented to the user in the survey. FrameConcepts are collections of one or more other questions. For example one can say that on Option Yes for a pregnancy question, ask the following 3 questions: Last monoposal date, number of previous pregnancies, and if any risk factor exists. These frame concepts may be nested, such that a response to a question presented based on a frame concept may prompt a set of questions in a nested frame concept to be presented.

In one embodiment, questions may be the atomic units of data collection. Each question may be responsible for collecting a single, unambiguous, well-formed and valid value. A URI may be associated with, and thus utilized to identify, a particular question. The use of such a URI may enable the identifying, reusing, moving, merging, cloning, copying, activating, versioning, tracing and logging and mapping of questions (and their responses) across surveys. It also enables the comparing and typing of questions to each other to identify sameness or similarities of questions. Thus, this URI may be utilized to establish continuity of the data collection and establishing a basis for integration of similar data from past or future data collection or an import process.

Additionally, each question may be associated with a context representing at least one 'context of use'. A context concept represents the 'meaning' of a question. A context may be a concept created, or imported into SODS from existing ontologies. Binding a question to a context concept and thus an unambiguous, formal and unique concept makes a question unambiguous, traceable and uniquely identifiable, although it may be reused in many different ways, and presented in different ways on different user interfaces. By associating a context with a question it is possible to unambiguously distinguish between questions (and their associated responses) at the time of querying or integration with existing data. Forms (referred to also as form template) are containers that organize a set of questions into a single unit for data collection interaction, with the result being a survey. In other word, a survey is based on a form template concept.

Figure 14:
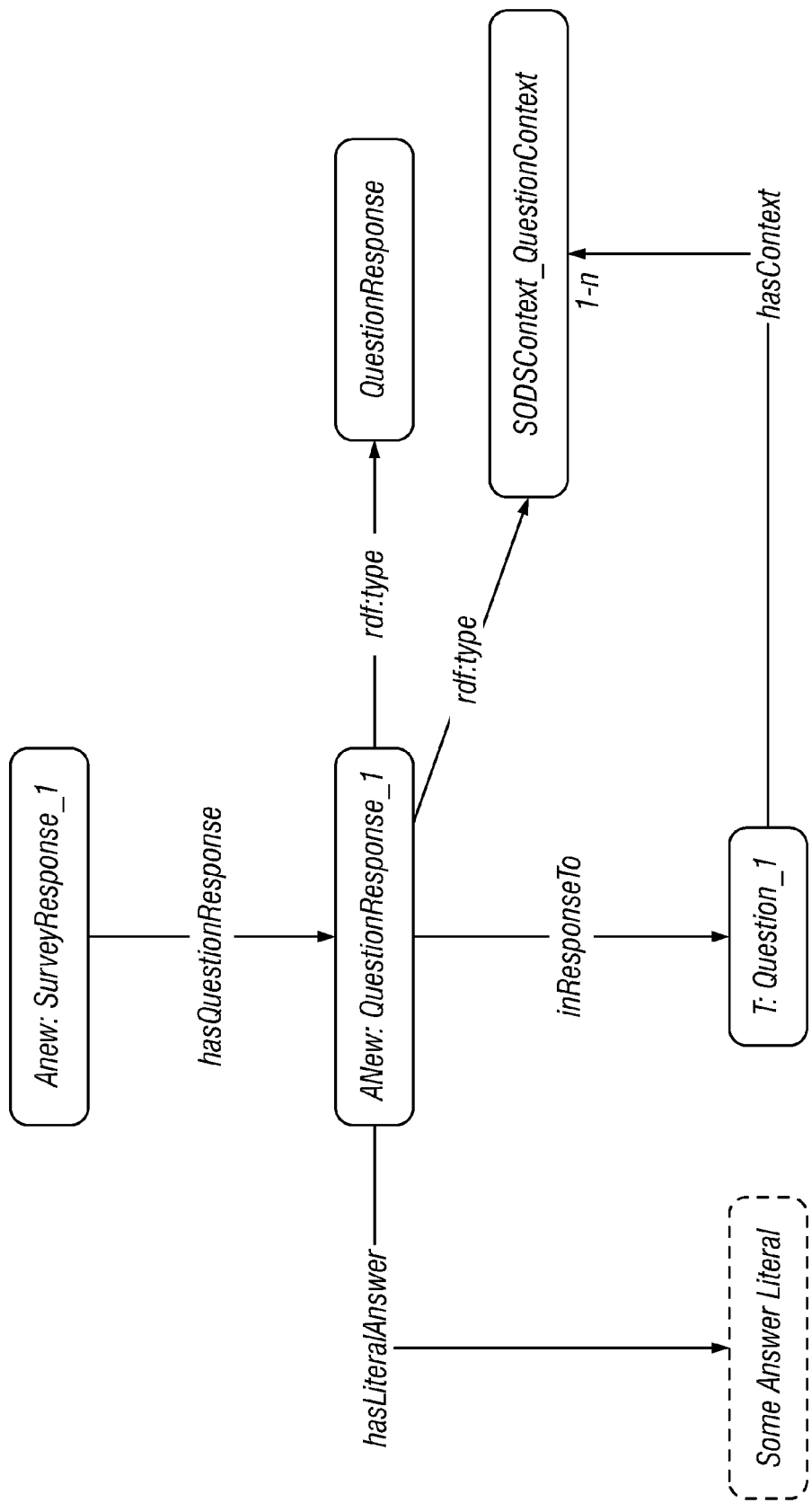
FIG. 14 depicts one embodiment of a portion of a survey ontology represented as graph.
Figure 15:
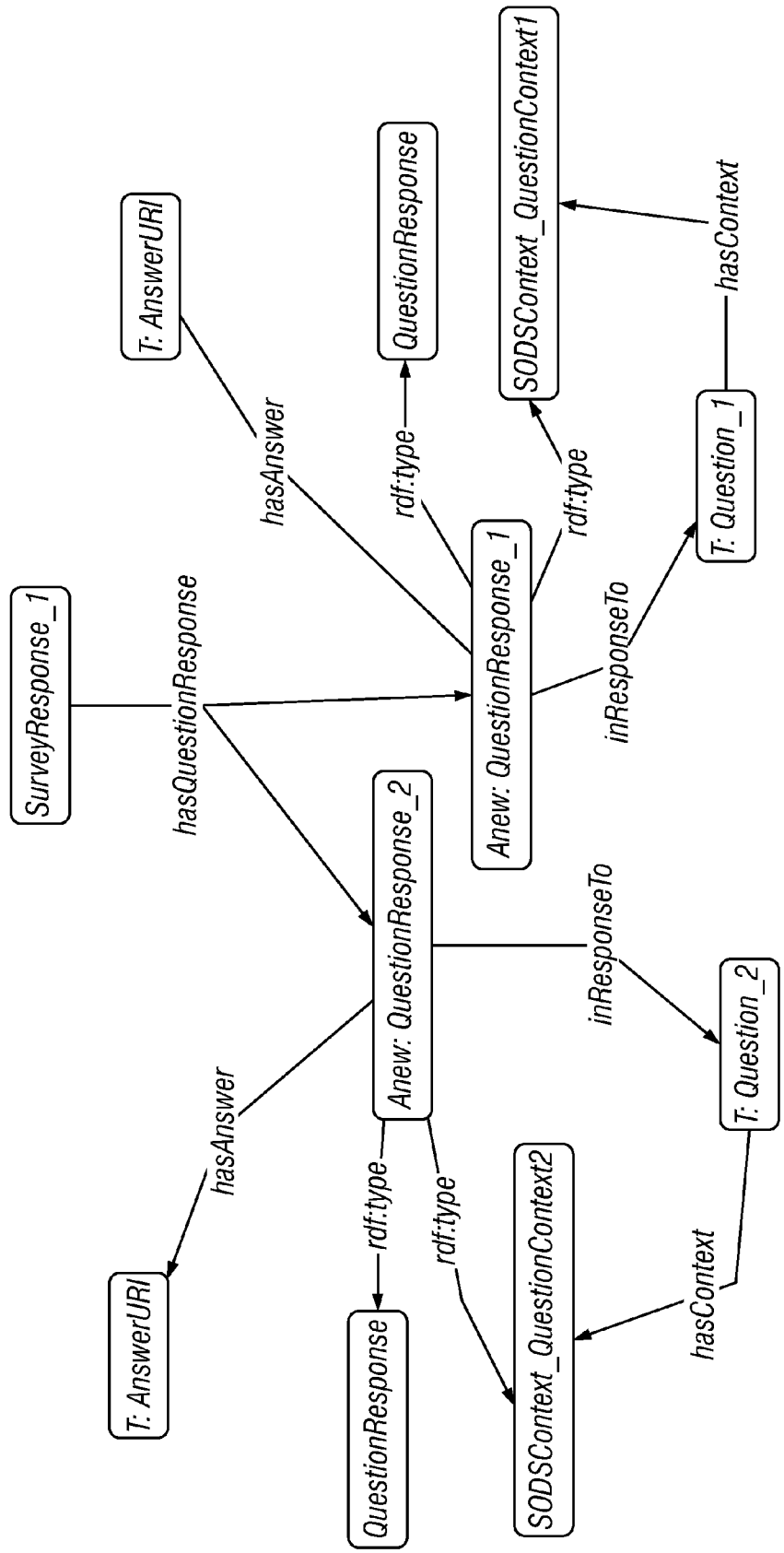
FIG. 15 depicts one embodiment of graph that represents the response concepts.
Figures 16, 16A:
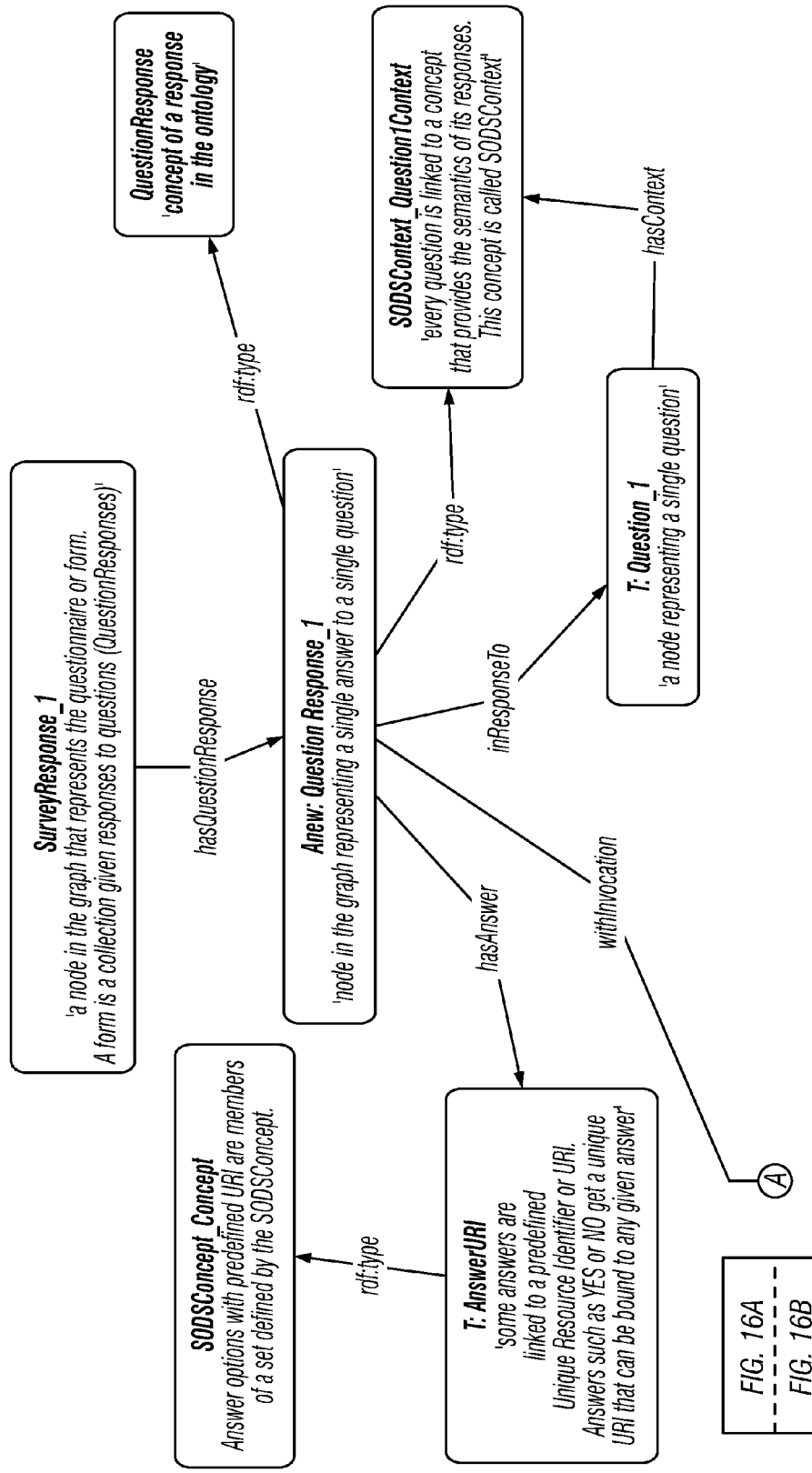
FIG. 16 depicts one embodiment of graph that represents the response concepts when new questions and responses are needed to be recorded in based on one of the previous responses.
Figure 16B:
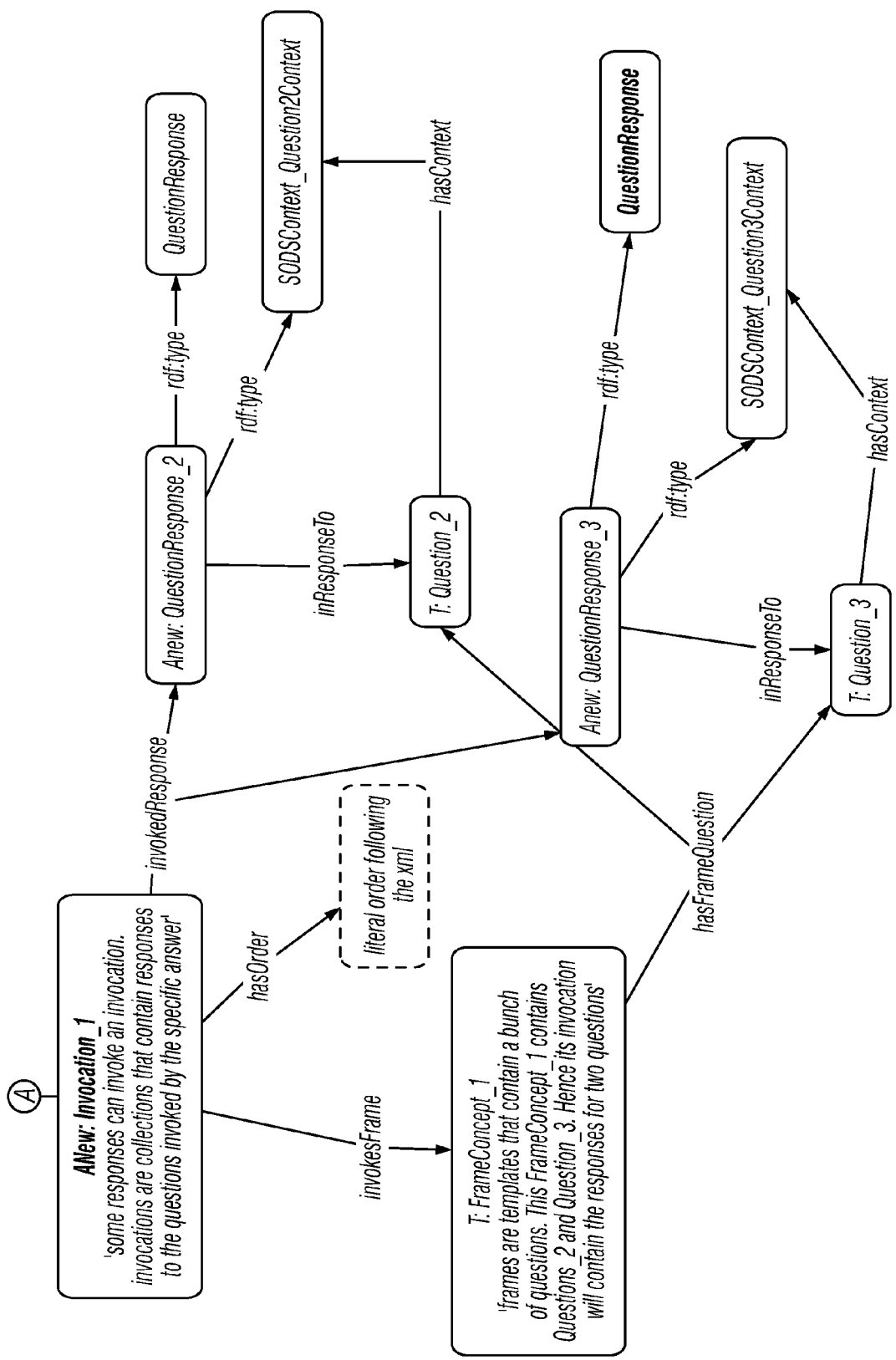

In conjunction with the ability to define questions for a survey, the survey ontology may also provide a question response concept, where the question response concept may be mapped to the concept of the question and the context of the questions. FIG. 14 depicts one embodiment of a portion of a survey ontology that comprises a question response concept, which will be mapped to an answer when such an answer is provided in response to the question. FIG. 15 depicts one embodiment of a graph with response concepts for a survey with two questions, where none of the questions has any invocations but both questions may have answers from a range of predetermined URI(s) associated with concepts in an existing graph. FIG. 16 depicts one embodiment of a graph comprising response concepts for a question that has invoked two other questions.

Figure 17:
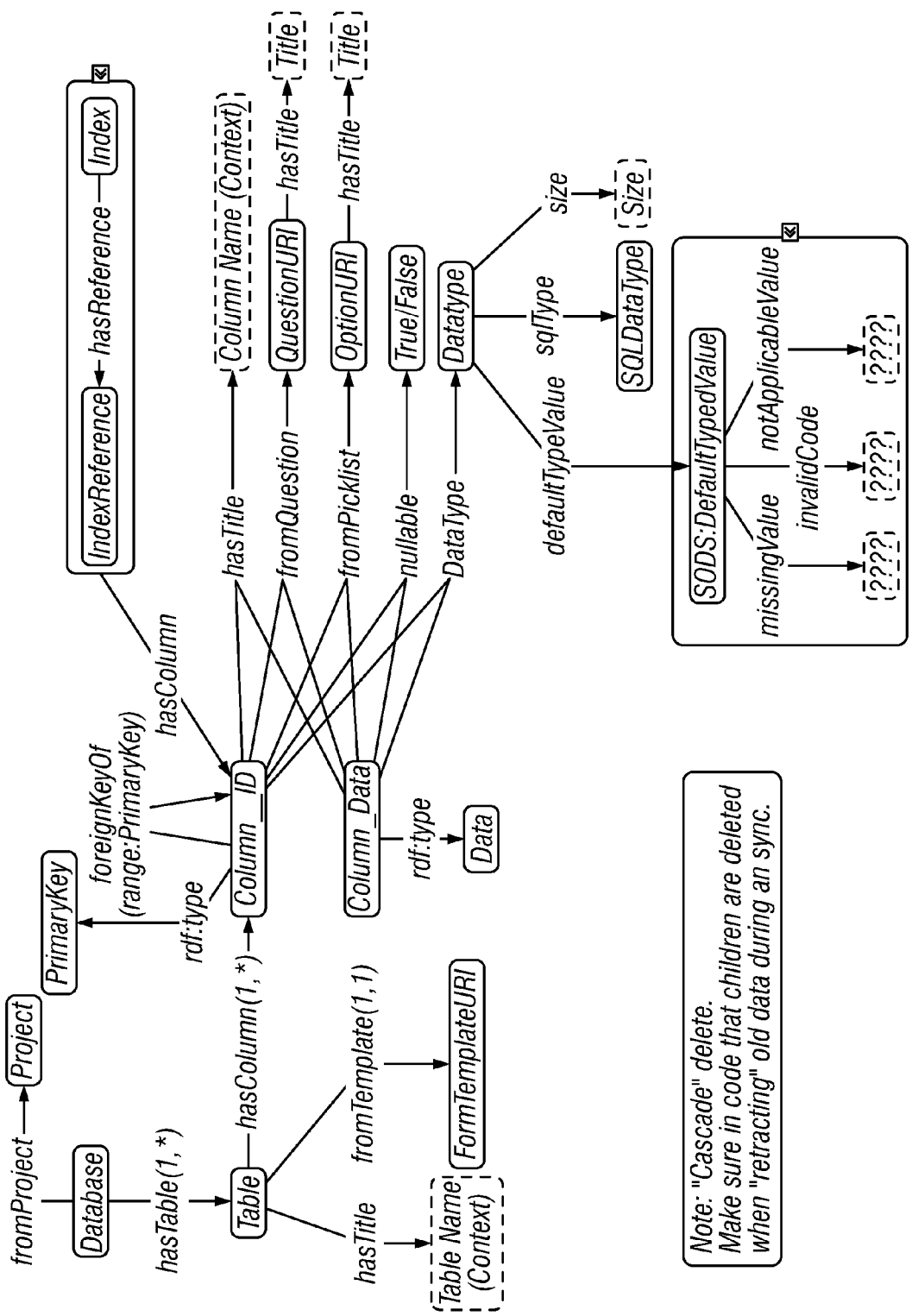
FIG. 17 depicts relationships inside a survey ontology that automates design and construction of conventional relational databases out of the graph representation. Ontological representation of these relationships between domain concepts, questions, their datatypes, responses and relationships facilitates computer code to automatically generate relational database schema that best represents the underlying ontological representation of surveys and their responses. If the survey structure changes by human interaction, the nature of these relationships will change and as a result a new database schema may be generated to account for the change in the design of the surveys.

As discussed above, an informatics system may be able to create a format for the storage of concepts and relationships created using the SODS module of an informatics system. FIG. 17 depicts a graph representing the relationships between relational database objects and concepts that may be used by the SODS module. This graph may enable a program, script, etc. to construct a relational database schema to store data from the graph representation used by informatics system including concepts representing the questionnaire structure, question responses, their relationships to each other etc. Such a program or script may identify changes in an existing schema needed to persist all data points collected through an RDF graph.

Figure 18:
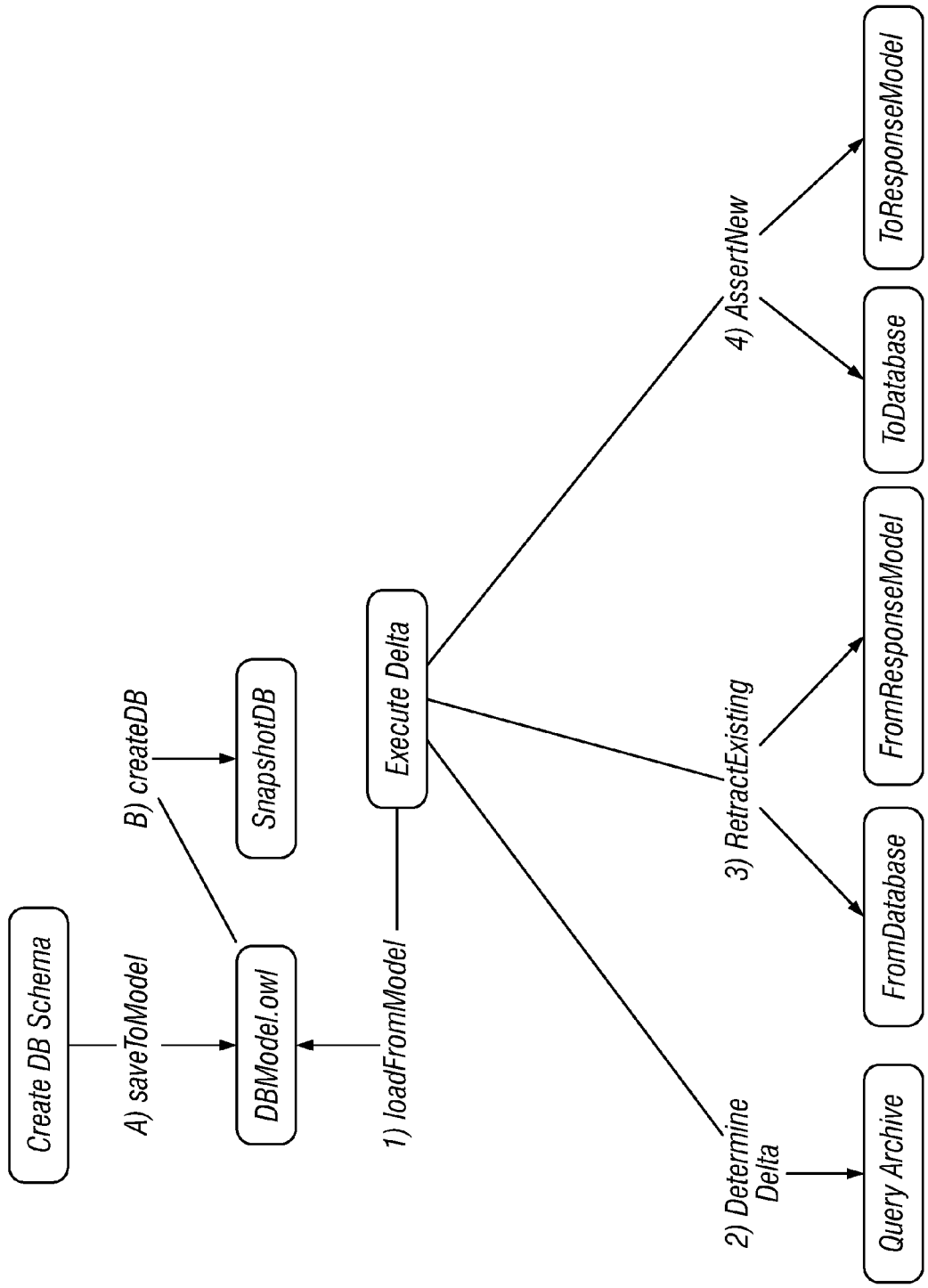
FIG. 18 depicts one embodiments of a method for the construction and population of a relational database schema based on the relationships depicted in FIG. 17.
Figure 19:
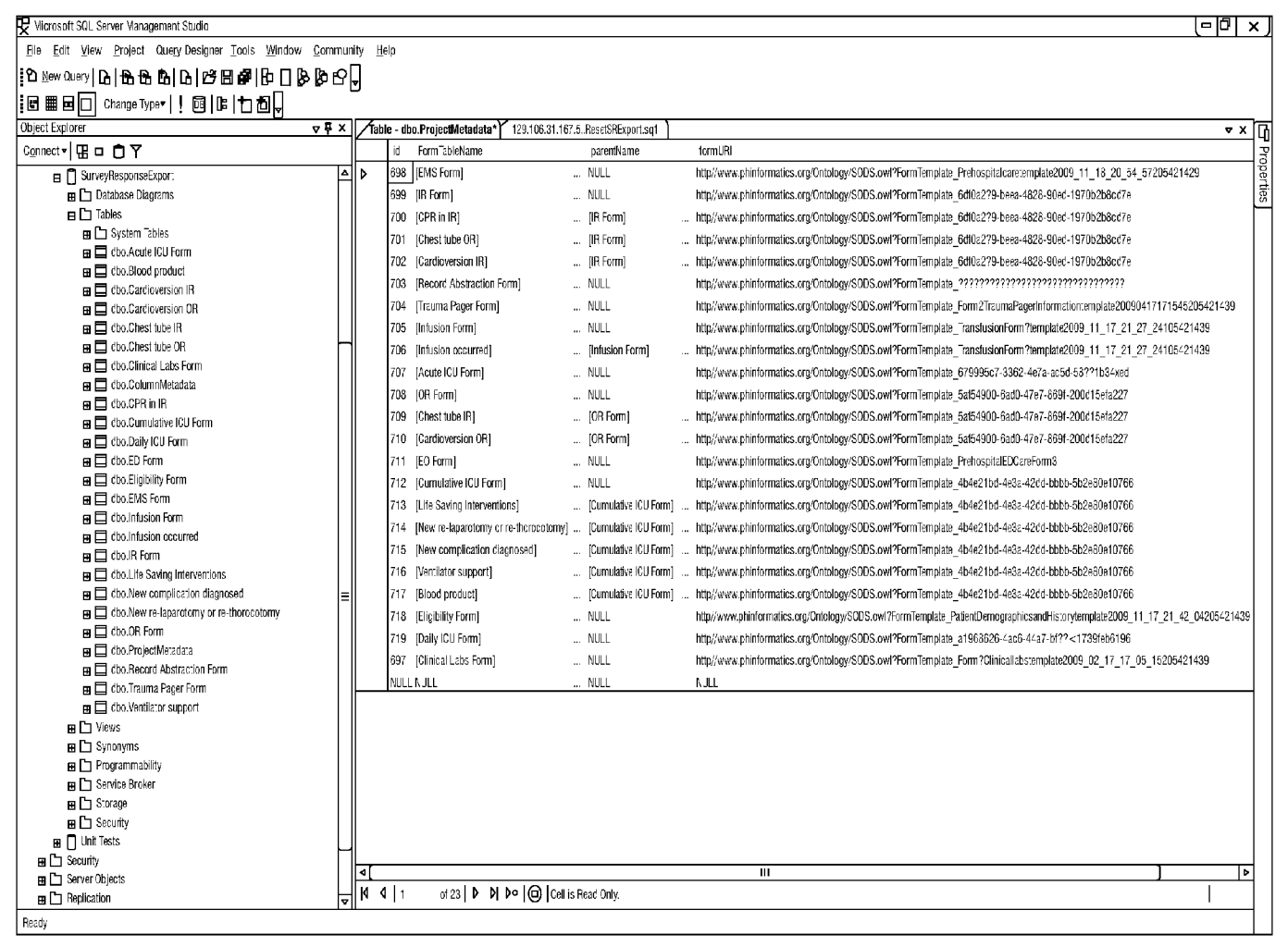

One embodiments of a method for the construction and population of such a relational database schema is depicted in FIG. 18. Here, the currently existing survey ontology may be loaded as a graph (for example, represented in OWL). A difference determined between the currently existing database and the newly updated ontology. The old schema may be retracted from the database and a new schema corresponding to the newly update ontology may replace the old schema. FIG. 19 depicts a listing of a relational database schema that may be constructed from a graph used by a SODS module.

In one embodiment, the data store may be at least partially configured as a relational database schema configured to embody data that is represented as a formal graph. Specifically, there may be a database configuration module (not shown) that can evaluate surveys to construct one or more database schema types to store the survey responses each for an specific use case and specialized purpose. For example, in one embodiment the following schemas may be generically computed for every survey response:

a. RDF model: all survey responses may be well formed RDF documents when they are received (as discussed later) and can easily be added to data store 130 which may be configured as a triple store. However, one or more transformations may occur prior to storage of an RDF survey response to the data store. One transformation may assign a URI to the response based on if the response is associated with a context that is an identifier as described above. The method will ensure valid objects (for example, responses, questions, etc.) are found and associated with those URIs at the time of insertion into the data store such that queries to describe those URI can retrieve proper data substantially immediately after insertion of the new responses.

Accordingly, an RDF view of the data may be a globally integrated and unified view of all surveys from all projects can be navigated or mined from multiple perspectives as the RDF transformation process plus the URI assignment mechanism result in a unified graph (within the RDF model), as long as the contexts associated with the survey ontology are used and mapped consistently and properly throughout the life of the system.

b. Standard Relational DB for Online Transactional Systems (OLTP): In one embodiment a parser algorithm will inspect questions and relationships between questions associated with each survey to construct a default relational schema for each survey. As a result, these database schemas may be relational schemas that are immediately useful for online transactional processing (for example, OLTP).

c. Rectangularized DB (Spreadsheet): In one embodiment, all relational links associated with a survey in this view are collapsed into a single table that turns all one too many relations into an iterative set of columns in the same table. That is, the normalized structure of the relational schema constructed in the previous model, is denormalized in to one big rectangularized schema that encompasses all relations and fields (columns) repeated as many times necessary in the same table.

d. Multidimensional Databases (CUBE representations): in one embodiment all concepts mapped to enumeration Questions are considered as dimensions of a multidimensional database, all numerical question types are considered measures in a multidimensional database and all Identifier Questions are considered reportable (countable) entities of a multidimensional database, where a computer algorithm then can parse through the RDF graph and construct either a star schema relational database readily available for CUBE processors or directly implement a CUBE inside analytic engines such as Microsoft Analytic Server.

Returning now to FIG. 4, as discussed above, when a survey has been defined using a survey ontology a unified graph may be created between the survey ontology, the domain ontology and the created survey. When a user at a client device may access the informatics system the informatics system may select a survey to deliver to the user at step 420. More specifically, based on some criteria associated with the user or the client device accessing the informatics system (for example, user identifier, client device identifier, data associated with the user such a clinical trial identifier, sex, location, medical data or almost any other data desired that may be provided or obtained about the user or the client device) the SODS module may select a survey to present to the user.

In one embodiment of the system all these criteria can be incorporated in the survey ontology to customize access to the system resource based on all information available to the system up to that moment by searching the unified graph as a whole (survey ontology, survey responses, question response, user profiles, domain knowledge, etc.).

The survey may be selected by, for example, identifying a concept in the unified graph representing the user. The unified graph comprising the survey ontology, the survey and the domain ontology may be navigated starting at the concept in the graph associated with the user to determine a survey associated with the user to provide to the user. The survey provided to the user may comprise a RDF description of the portion of the unified graph comprising the concepts and relationships mapped to the selected form template or may comprise an identifier for the form template such that an application at the client device may provide this identifier to the informatics system to obtain data (for example, concepts or relationships) corresponding to the form template as they are needed).

Once the survey is received at the client device, an interface may be rendered based on the survey by the client application executing on the client device. More specifically, the interface may present the questions of the survey according to the concepts of the survey (for example the concepts representing the questions, the concepts for the graphical rendering and style of the question concepts in the form template, the concepts of the types of value that the questions will accepts, etc.

Figure 20:
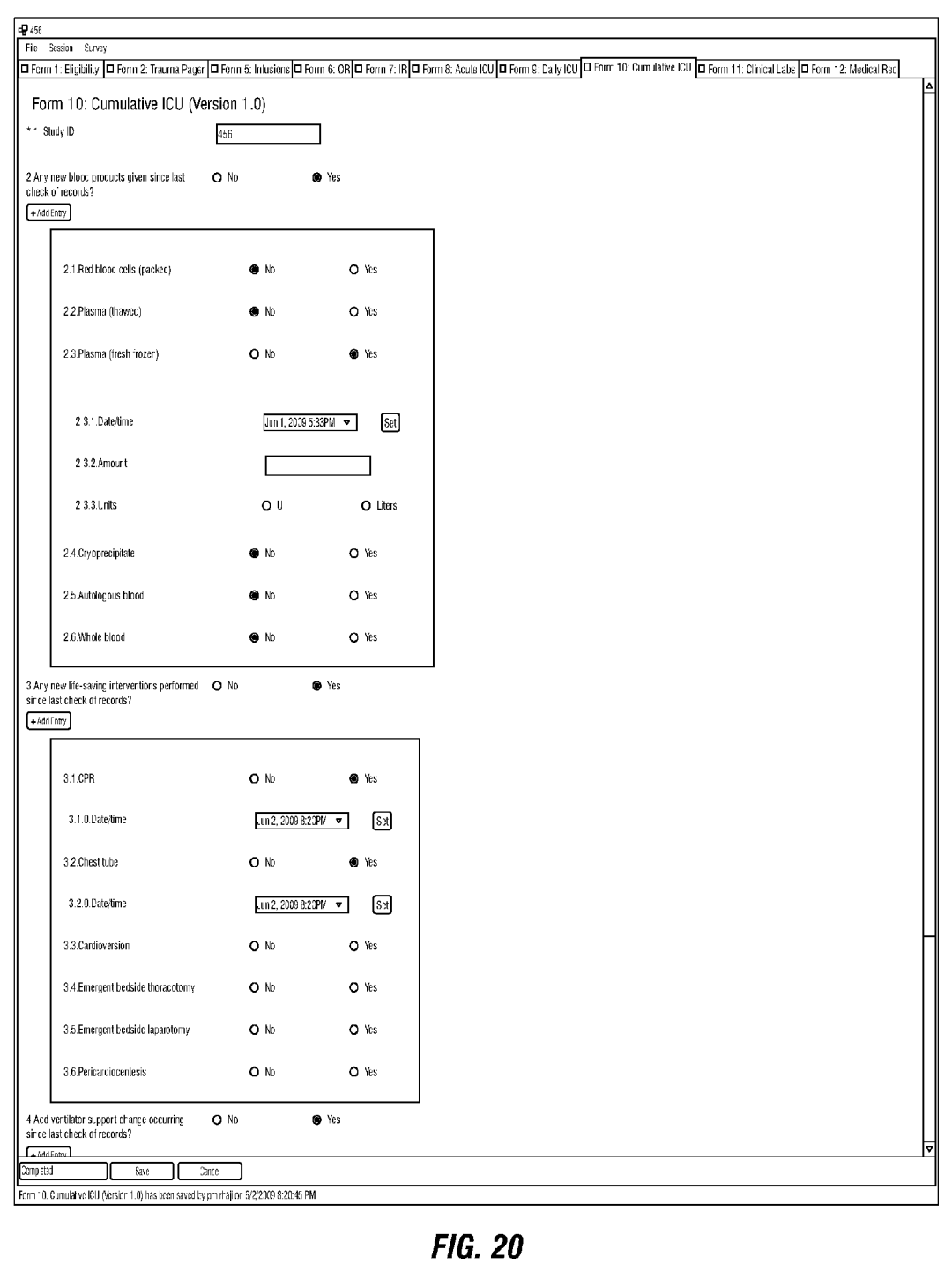

FIG. 20 depicts one embodiment of such an interface that may be presented to a user at a client device, where the interface has been rendered based on the survey provided by the informatics system to the client device. The user may interact with the rendered interface to provide responses to the questions presented through the interface. These responses may be captured by the client application on the client device. In one particular embodiment, the data entered by the user with respect to the rendered interface of the survey is captured as RDF and associated with one or more questions of the survey.

It should be noted here that because of the architecture of the informatics system, once a survey is obtained from the informatics system the survey may be "taken" (for example an interface associated with the survey rendered and answers obtained and stored on the client device) regardless of whether the client device is in communication with the informatics system at the time the survey is taken by the user. This capability exists because in some embodiments, all the information needed by the client device to render the interface of the survey and capture the response to the questions of the survey was delivered by the informatics system in form of a self descriptive survey graph. In other words, in one embodiment, the provided survey may comprise all information needed by a client device to present the interface for the survey and capture the response. It will be apparent, however, that other architectures are also possible. For example, the client application may obtain each question of a survey from the informatics system as it is needed to render the interface and provide answers to the question to the informatics system as they are provided by the user with respect to the interface. Other arrangements will also be possible.

In any event, once responses to the questions of the survey are captured by the client application at the client device at step 430, they may be provided to the informatics system whenever the client device is in communication with the informatics system at step 440. These response may be provided in a response graph, that may be an RDF graph that represents the user and client device from which the responses are being provided, the date the survey was taken, the survey to which the response were provided (for example a survey identifier or version identifier), the answer associated with the question, user submitting the survey, etc.

When the response graph is received, each of the response to the question may be validated against an expected type of response and represented in a question response concept that is associated with the question of the survey to which it is a response, as depicted in FIGS. 15-17. In this manner each of the response to the questions of the survey is represented in a question response concept that is associated with the concept representing the question to which it is a response. In one embodiment, all response to a question are mapped to a sub-graph that that keeps track of the versioning and update history of the answer.

Figure 21:
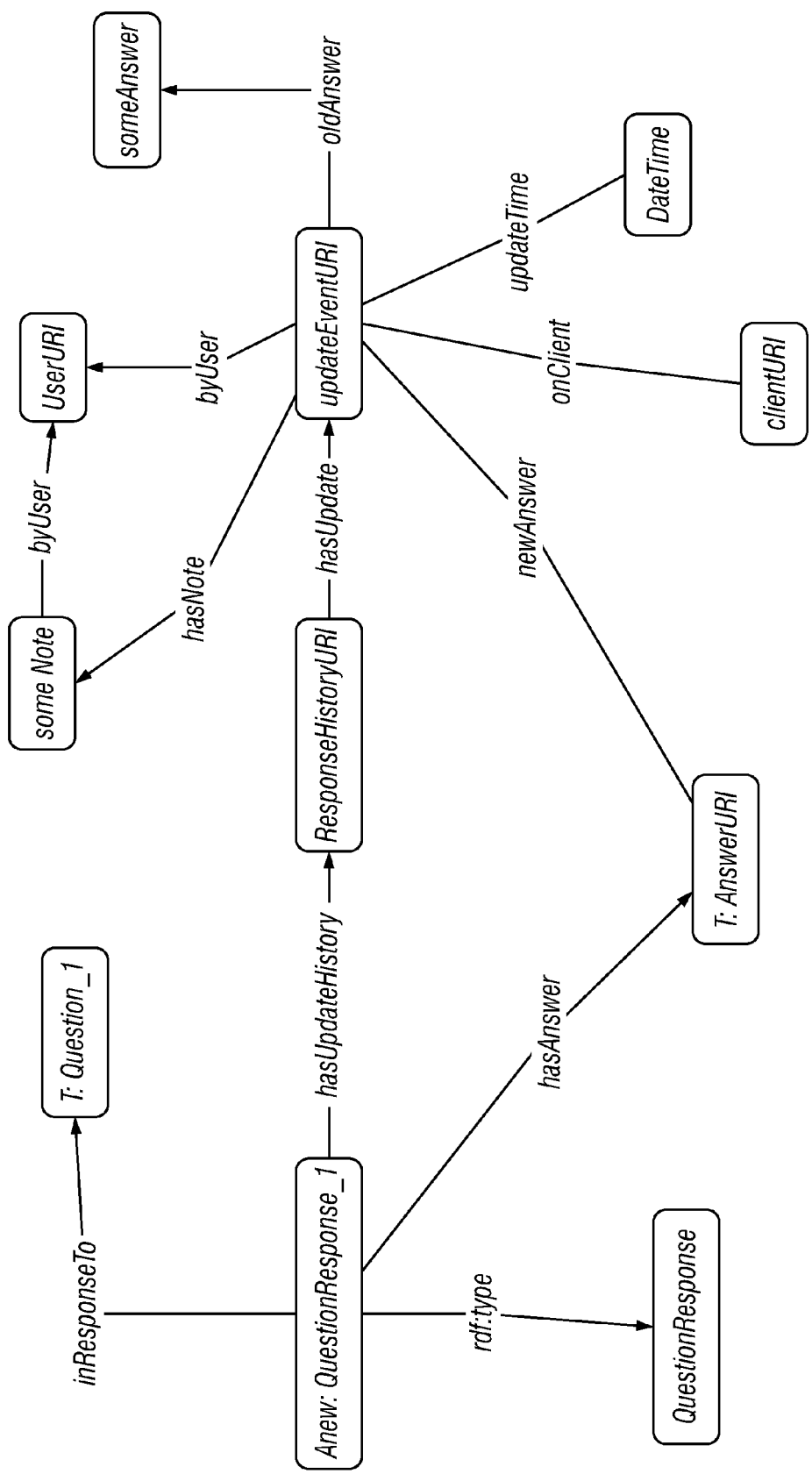
FIG. 21 depicts one embodiment of a question response along with recording of the change and update history for any given response as a graph representation. This graph maps and integrates with the rest of the survey response graph, survey ontology and domain knowledge as a unified whole.

FIG. 21 depicts one embodiment of a question response mapped to such a sub-graph. A note concept may be associated with every new update, such that a series of time stamped notes can be attached to every update to every response to every question in every survey. Using these note concepts then, any change in an answer can be traced, logged and audited.

Responses (question responses) may be associated with values recorded by a particular user as an answer to a single question presented in an interface associated with a survey. In one embodiment, a SODS module provides a globally unique way to identify responses to question using the same URI mechanism used to unambiguously identify and interact with questions. In one embodiment, a received response is represented by a URI that is globally unique to that instance of question response, excepting in the case where the response is an answer to a question whose context is itself a unique identifier. That is, if two responses to two questions are recorded at different times, the two answers will receive the same URI only if they point to the same question context and that question context is an Identifier concept of the question itself is an Identifier Question according to the Survey Ontology. Otherwise, each answer will receive a unique URI of its own. In other words, question response URIs are reused and recreated for those questions whose context may be used as an identifier (for example, for Social Security) or if the Question type is set to the Identifier Question.

For example a question "Please enter your SSN:" and "Social Security Number" may be asked in two different forms A and B, in two different and independent projects, in two different times apart from each other. However, if both questions are contextualized (associated with) the same SODS context of "Social Security Number", and if the "Social Security Number" is marked as a unique identifier of a person, the same global identifier may be assigned to a response recorded by the two distinct forms at different times. As a result, it can be identified that these forms are both about the same 'person', and data mining augment, compare, integrate, etc. data about that person determined from responses to form A with data from response to form B, although they were designed in different time, for different purposes.

Figure 22:
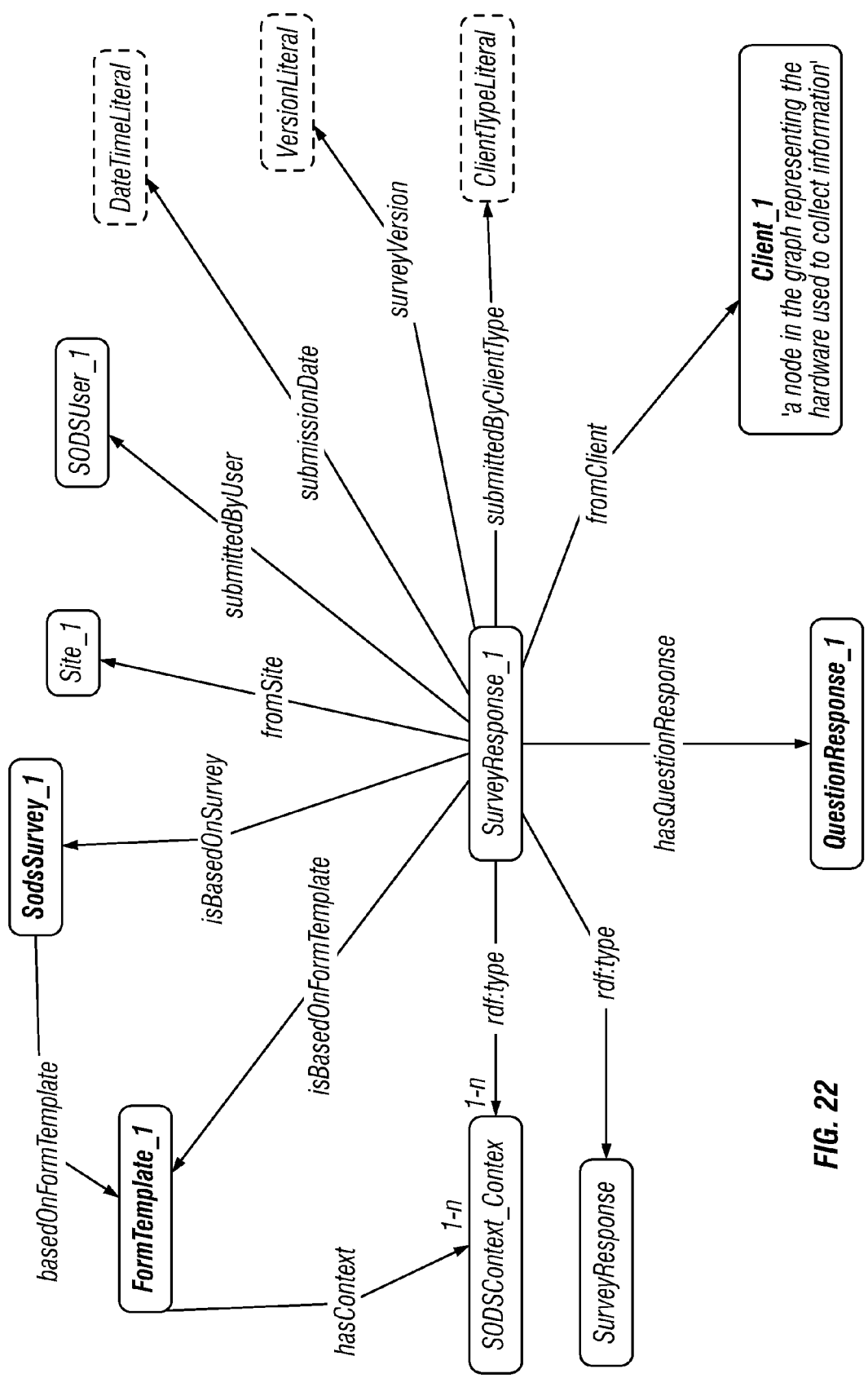
FIG. 22 depicts one embodiment of a survey response.

Question response concepts may be, in turn, collected into a concept called a survey response. FIG. 22 depicts one embodiment of a survey response concept sub-graph. Survey responses are linked to a form template concept that is in turn contextualized by a context (for example, from an ontology) concept. The link between the form template and the ontology concept can be interpreted as being an instance of that concept. Similarly, a question response may be interpreted as an instance of the context concept mapped to the question to which it is a response, a survey response may become an instance of the context concept for a the template concept associated with a survey. This enables the identification of forms, surveys and response that are conceptually or semantically about the same real world objects or conceptual entities. For example two different forms for collecting data 'about Influenza' can get linked to each other and treated by application similarly, when they both use the same context concept for their templates.

Figure 23:
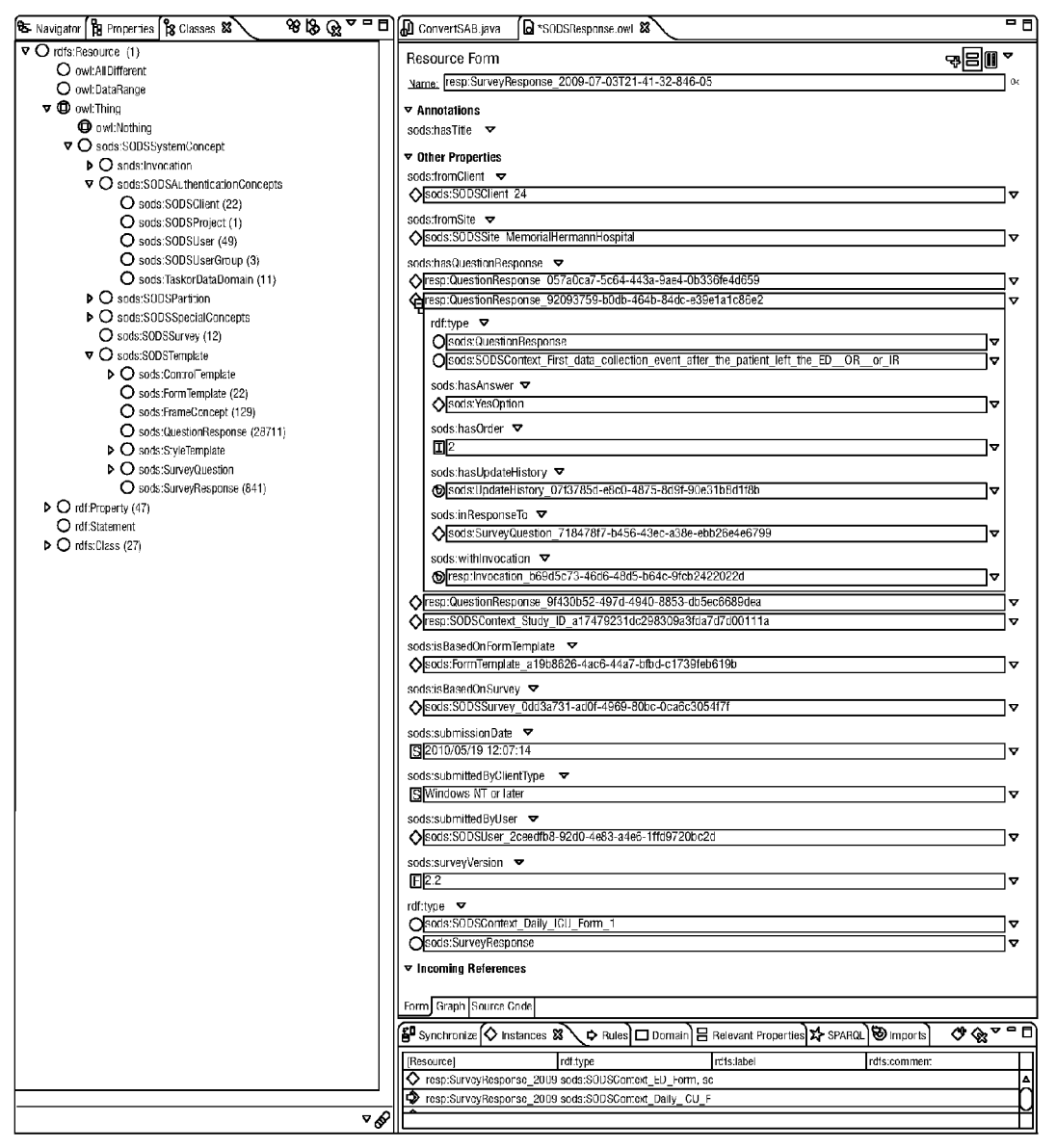

FIG. 23 is a representation of an example survey response with four questions answered. One of the questions is expanded to demonstrate the response (yes option) and the fact that it invoked a frame concept when answered with the "Yes" option. As can be seen, the depicted survey response is also an instance of a concept that represents its context (rdf:type Daily_ICU_Form_1).

Accordingly, when responses are received from a client device, these responses may be represented as questions response in a unified graph where all of the question responses are mapped to the question of the survey to which they are responses and to a survey response concept representing a response to that survey. As the survey is mapped to the survey ontology and the domain ontology, a unified graph is thus formed from the survey response, the survey, the survey ontology and the domain ontology.

The resulting unified graph may be searched at step 450 to obtain data about the response to the surveys received from the users at the client device. In one embodiment, the interface presented to the user may provide an open framework for the user to construct queries according to the context of the domain ontology. Specifically, the interface may present the users with the set of concepts or relationships utilized in the domain ontology to allow the user to formulate queries based on these concepts and relationships. Searches can then be formed and conducted based on the domain ontology. In this manner users are provided with a highly effective and contextual method for extracting meaning from obtained data. In particular, the concepts in the domain ontology specified by the user using the interface may be used as starting points in the unified graph and the graph navigated from these staring points to determine survey data responsive to the user's query. In one embodiment, these queries formed by the user can be translated into a SPARQL query that is run against the unified graph comprising the domain ontology, survey and survey responses obtained from users to provide the user who initiated the query with data obtained from users that is relevant to the query.

Figure 24:
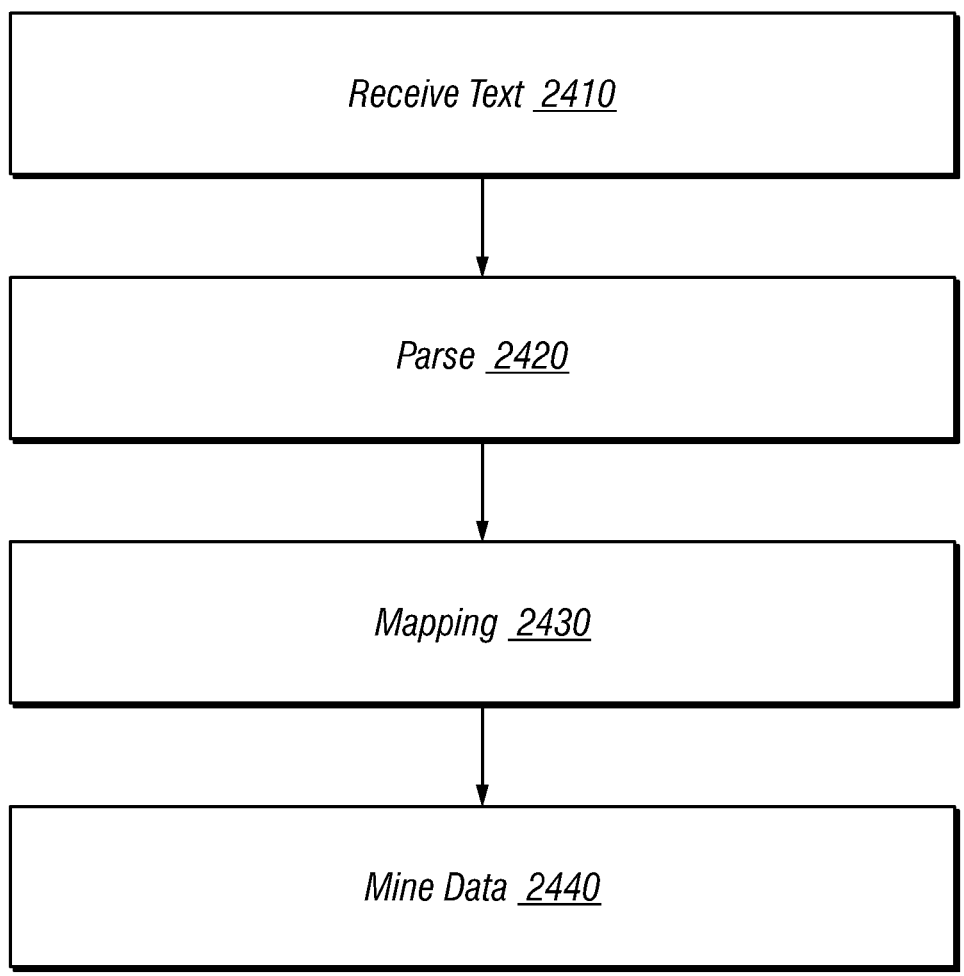
FIG. 24 depicts one embodiment of a method to process text.

Other methods of gathering and mining data may also be utilized by an informatics system. As discussed above, data may also be obtained from text based sources. FIG. 24 depicts one embodiment of a method that may be employed in conjunction with a CTU module of an informatics system to process such text. Text, such as clinical text may be received from a data source at step 2410, parsed according to a syntax ontology to generate a parse graph at step 2420 and the concepts of the parse graph mapped to a domain ontology and semantic ontology in step 2430 to create a unified graph between the graph representing the clinical text, the domain ontology and the semantic ontology. The resulting unified graph may be searched at step 2440 to obtain data about the clinical text.

In a medical environment these sources may comprise, for example, an electronic medical records system (EMR), lab reports, medical charts, discharge diagnosis, chief complaint, nurse and practitioner notes, diagnostic reports and consultations, etc. This text may be input manually to the informatics system or received electronically. This text may be processed to normalize the text or to extract certain non-essential text before further processing is done.

Figure 25:
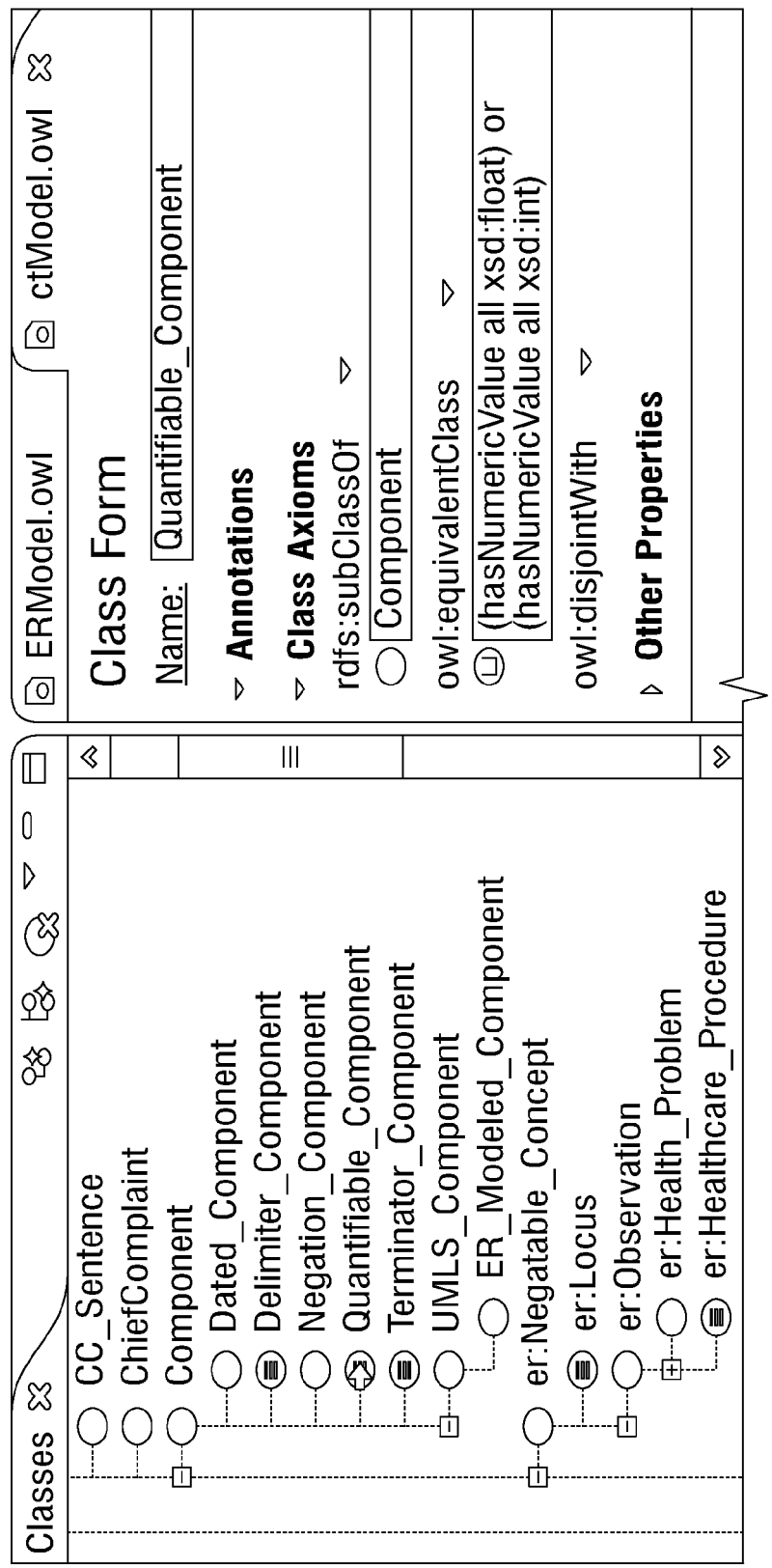
FIG. 25 depicts one embodiment of concepts defined in a syntax ontology.

The method may thus employ a syntax ontology, a semantic ontology and a domain ontology as discussed above. Before delving into the method in more detail it may be helpful to elaborate on these types of ontologies as they may be applied to the method of processing clinical text. The syntactic ontology utilized may be selected based upon the expected language, format, type of text, environment to which the text may pertain, etc. The syntactic ontology may be used to provide tokens, including a dictionary of valid terms in a domain (lexicon), morphological and syntactic rules of the underlying language (such as valence and inflexions), and a grammar that sanctions or constrains allowable combinations of terms in a domain. The lexicon may also contain relationships such as synonymy, hyponymy (i.e., narrower), hypernymy (i.e., broader), polysemy (i.e., related terms), and meronymy (i.e., part of term) between terms (terminological knowledge) to be used for disambiguation and reducing the variability (normalization) of the output. FIG. 25 depicts one embodiment of tokens representing quantities defined in a syntax ontology.

Figure 26:
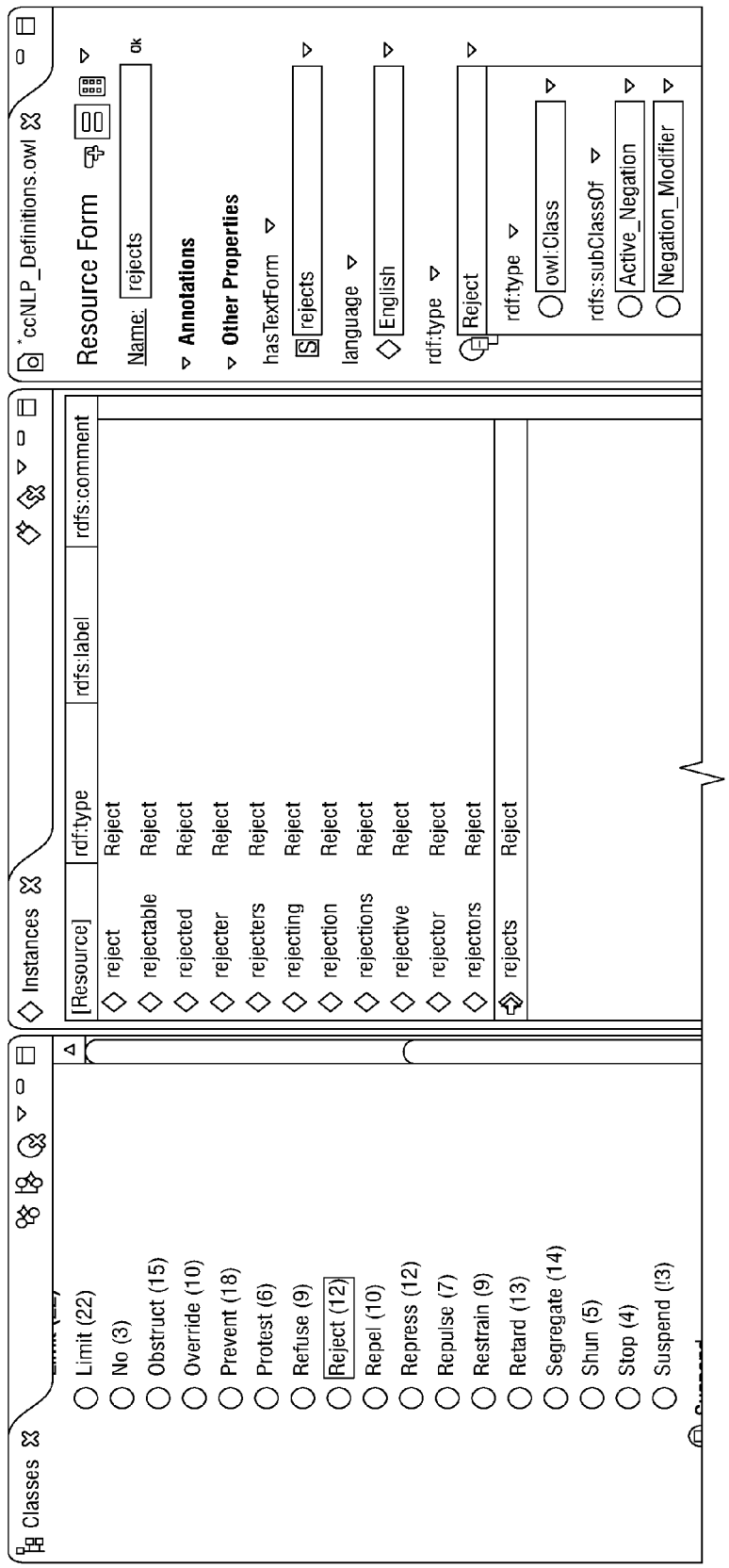
FIG. 26 depicts one embodiment of a class definition to define negation syntactically.

The syntax ontology may be an OWL ontology that represents a lexicon for the generic and mainly non-clinical aspects of the clinical content. The model represents each lexeme in terms of a unique resource identifier (URI) that can be referred to by many morphologically different symbols. Each lexeme is modeled as an instance of at least one semantic class or concept in the Lexicon or Syntax ontology (for example, "ctm:Reject [reject, rejecting, rejected, rejects, . . . ]). Each class may have further semantics as inferred by its definition within the ontology. For example, as depicted in FIG. 26, ctm:Reject may be a subclass of ctm:Active_Negation, whereas the ctm:Unable is an instance of both ctm:Subjective_Negation and ctm:Passive_Negation.

Figure 27:
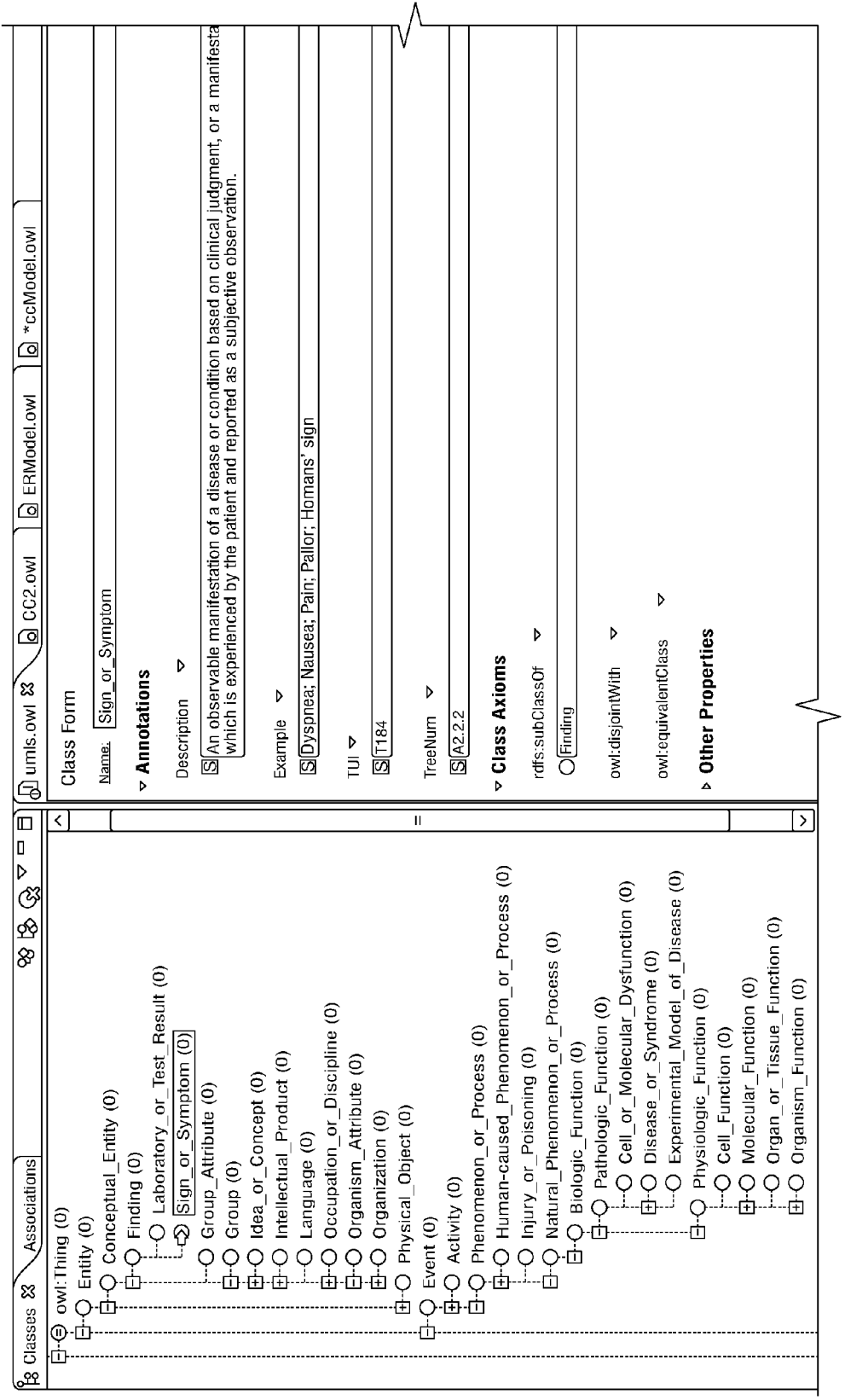
FIG. 27 depicts one embodiment of a portion of the UMLS-SKOS domain ontology.

A text-understanding application intended to operate in a biomedical and clinical environment may use a domain ontology that formally describes domain concepts (for example, Diseases) and semantic relationships between them (for example, All Infectious Disease are Caused by some Infectious Agent). In one embodiment, the domain ontology may be UMLS-SKOS, an OWL ontology that partially but consistently adopts the UMLS-SN for the Semantic Web applications. FIG. 27 depicts a portion of the UMLS-SKOS domain ontology.

The UMLS-SKOS domain ontology maps each UMLS Semantic Type into a corresponding owl:Class and each UMLS Semantic Relationship into an owl:ObjectProperty. Concepts and Properties in this model have rdfs:subClassOf and rdfs:subPropertyOf relationships when there is an 'isa' relationship in the UMLS-KS.

Figure 28:
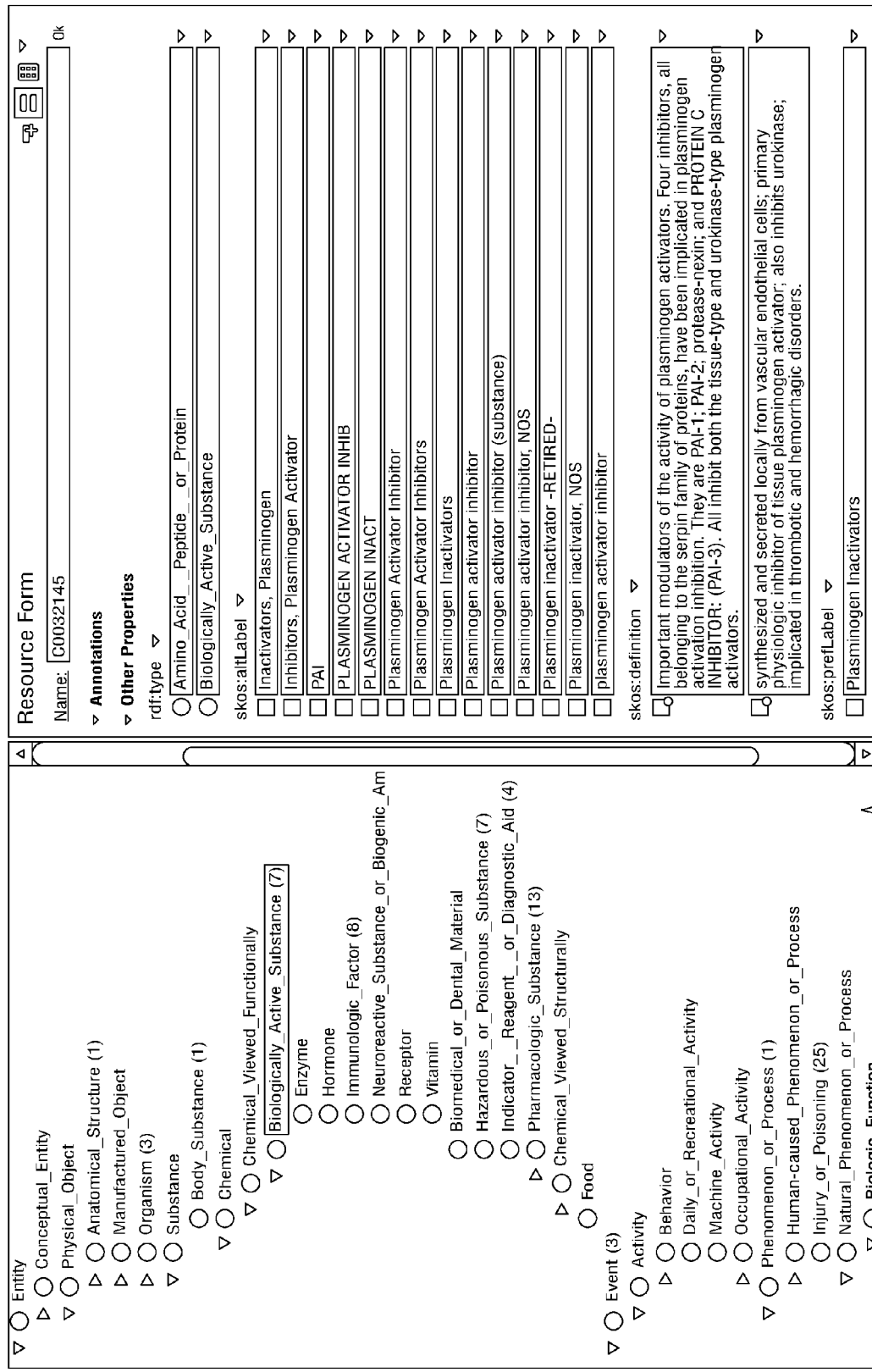
FIG. 28 depicts one embodiment of a biomedical concept in the UMLS-SKOS domain ontology.

In the UMLS-SKOS domain ontology, each UMLS-MTH concept represents a resource with a unique resource identifier (URI) constructed using a NameSpace:CUI schema, where NameSpace can represent any unique URL such as 'umls=http://nih.nlm.gov/umls/'. All UMLS-MTH concepts are conceptualized to be instances of (rdf:type) the Concept representing its associated Semantic Type. For example, as depicted in FIG. 28, the "Plasminogen Inactivator" with the CUI=C0032145, is a resource uniquely identified by the uri='umls:C0032145' in the UMLS-SKOS and has two semantic types of "Amino Acid, Peptide, or Protein" and "Biologically Active Substance".

The semantics of each UMLS-SKOS resource (each UMLS-MTH concept) is defined by its source and through variety of means: by a textual definition or annotation; by its Semantic Type and its place in the hierarchy; by source defined relationships between concepts, or by terminological relationships between terms (hyponymy, hypernymy, synonymy, etc.) defined by the UMLS-MTH. There are major groupings of Semantic Types incorporated in the UMLS-SN and therefore in the UMLS-SKOS for organisms, anatomical structures, biologic functions, chemicals, events, physical objects, and concepts or ideas.

Figure 29:
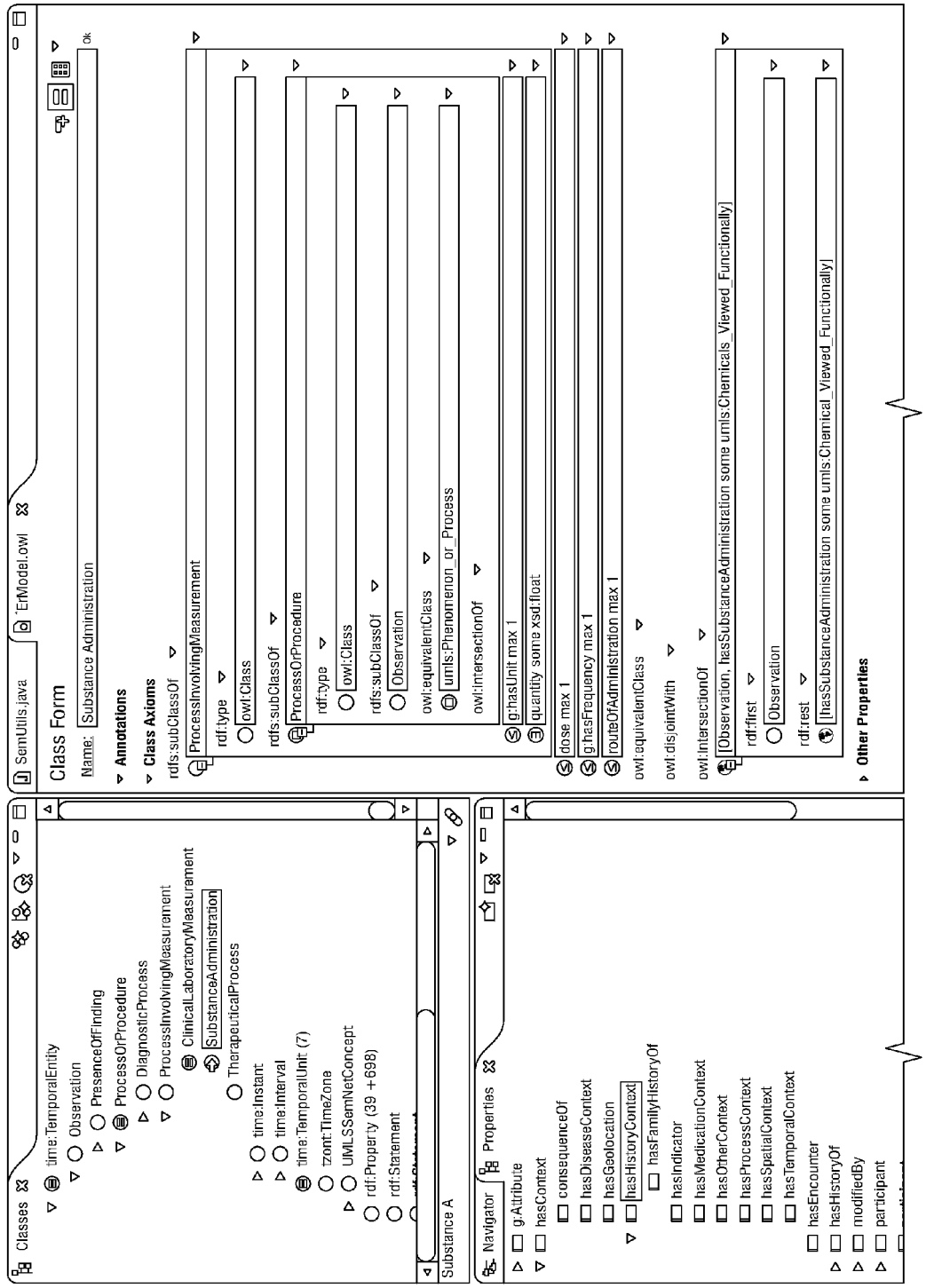
FIG. 29 depicts one embodiment of the expression of logical constraints in domain ontology.

The UMLS-SKOS domain ontology may allow for extensions that enable classification and reasoning in a range of applications related to the biomedical domains. For example, FIG. 29 depicts how two UMLS Semantic Types (Phenomenon_or_Process and Chemical_Viewed_Functionally) have been used to express logical constraints that define the new concept of 'SubstanceAdministration' inside the ontology to represent a new clinically meaningful pattern (an Observation that involves administration of at least one chemical with a known function, along with some optional dose, frequency and route information). Remembering from previous section, an observation in this model is a temporal entity, that is, a substance administration will be sanctioned to have a relationship with a temporal entity such as an absolute (for example Dec. 1, 2010 12:32 pm) or a relative time (for example, 2 hours ago).

The semantic ontology may be a generic and extensible ontology that represents the concepts that are likely to be found in text of the type being processed. A semantic ontology may serve as a high level schemata (information model) with minimal set of semantic constrains that sufficiently represent major patterns identifiable in typical text of the type being processed that enables extensions and mappings to more specialized ontologies to specialize it to meet particular requirements of a new use case or domain. The semantic ontology may define meaning of lexical constituents of text and its syntactic components by mapping them to unique concepts and sensible relationships between them. In most systems semantic knowledge includes a set of explicit schemata that captures generalized semantically interpretable relationships between concepts, and semantic interpretation of template linguistic patterns observable or frequently used in the clinical content. That is, the semantic knowledge enables the algorithm to determine the proper relations between terms within the text, and transforming (mapping) them to desirable output formats.

The semantic ontology may be OWL ontology has been constructed to provide a generic and extensible information model for a prototypical clinical content. The model is conceptualized to serve as a high level schemata (information model) with minimal set of semantic constrains that sufficiently represent major patterns identifiable in a typical clinical text, and in the meantime enable ad-hoc extensions and mappings to more specialized (for example, task specific) ontologies by systems that intend to specialize it to meet particular requirements of a new use case or domain.

Figure 30:
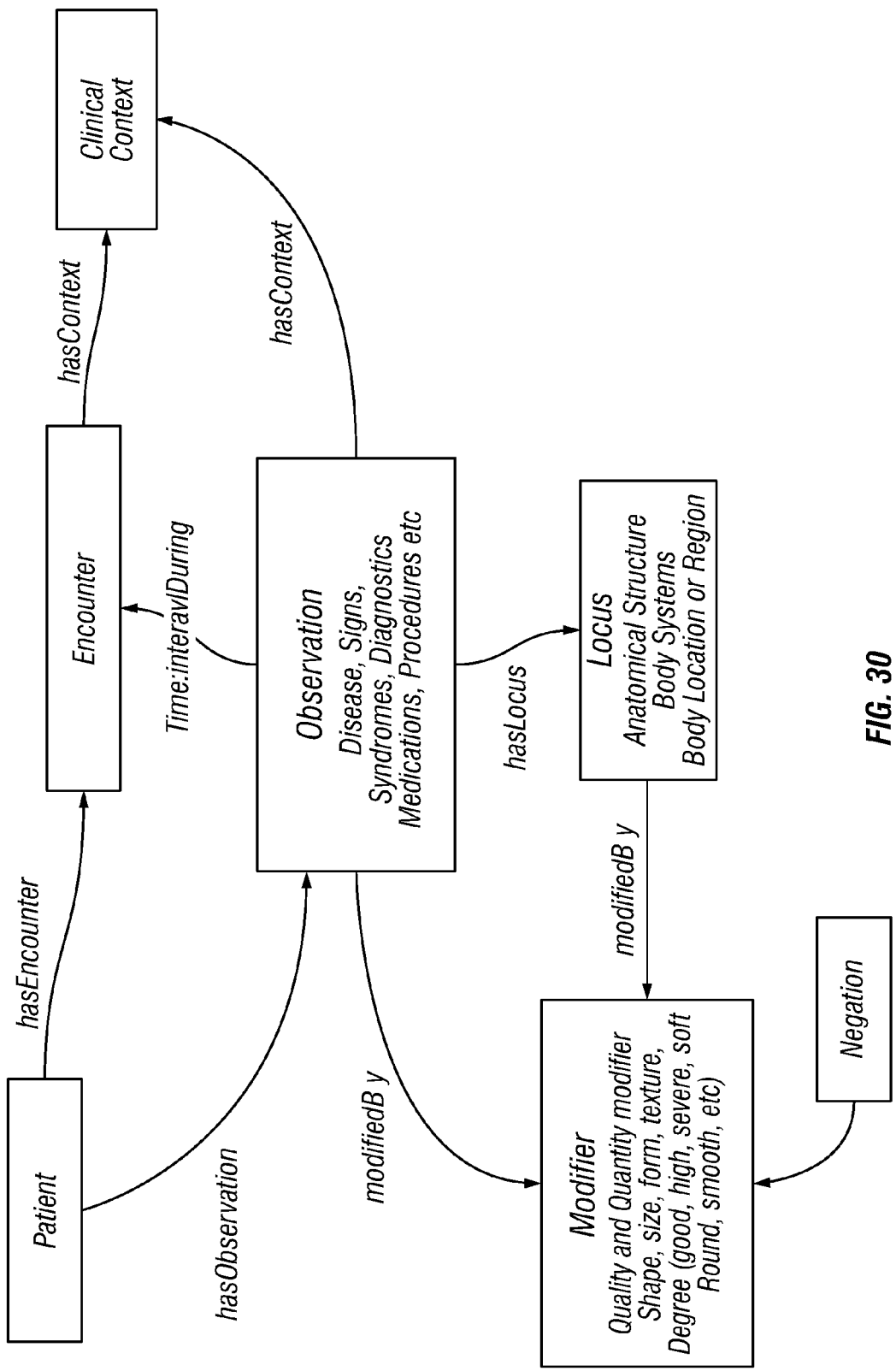
FIG. 30 depicts one embodiment of a portion of a semantic ontology.

The semantic ontology may also provide mapping points for importing new semantic and syntactic ontologies, or extending it dynamically to meet requirements of a new type of document or domain (for example to add concepts pertaining to medications and prescriptions, in a model originally intended to capture vital signs and physical exam data). The semantic ontology may include concepts such as clinical text and its different types such as chief complaint, relationships with presenter (for example, Patient, Nurse, EMS Personnel), Clinical Observation (for example, Sign, Syndrome, Disease, Procedure), and their Locus (for example, Body Site or Region, Body Part), Modifiers (for example, QualitativeModifier and QuantitativeModifer), Clinical Contexts (for example, Temporal_Context, Causation_Context, Process_Context, Allergy_Context, History_Context) that can further explain implications of Clinical Observations are introduced in this model. FIG. 30 graphically depicts a portion of one embodiment of a semantic ontology.

With these syntax, semantic and domain ontologies in mind, attention is directed back to FIG. 24 and the method for representing and contextualizing clinical text depicted therein. Text, such as clinical text may be received from a data source at step 2410. The received text may be prepared or processed to put the text in a format for parsing. At step 2420 the text may be parsed according to a syntactic ontology. This parser may perform a text parsing and syntactic analysis. The results of the syntactic analysis forms a parse graph that is comprised of tokens of text mapped to concepts of the syntax ontology.

In one embodiment, parsing may occur by creating evidence spaces from the input text (for example, by segmenting the text (segments of text are referred to as evidence spaces) according to identifiers defined in the syntax ontology. Chunks can then be created within each evidence space by using an iterative algorithm which creates permutations of all possible chunks of size 5 (plus or minus 2) within the evidence space. Within each of the evidence spaces, rules can be used to exclude zero or more of the chunks. Such a parser may not be dependent on the syntax of language as it uses chunks (tokens) and may utilize a moving window to account for cognitive aspect of human produced text. Accordingly, such a parser may be utilized effectively, even with grammatically incorrect or structurally aberrant text (often produced by doctors).

More specifically, in one embodiment, the parser may compute an indexed array of all permutations of tokens extractable from input text based on the position of syntactic concepts (represented in the syntactic ontology) in the input text. A token is any ordered combination of words extracted from text. Tokens may be defined by their positional index (their distance from the beginning of the text) and their length (number of words they contain). Tokens can overlap, contain or trail each other.

The parser first scans through the text to create larger segments of text based on syntactic concepts found in the syntactic ontology. An evidence space may be a token closest to a sentence or a phrase. A sentence in the text may therefore comprise multiple or a single evidence space. These evidence spaces are ordered, and are parsed individually to create all permutations of legible tokens based on the above heuristics as it maintains the order of the evidence spaces according to the text.

To reduce the size of combinatorial space, an algorithm based on the regular expressions uses the lexicon provided by the syntactic ontology to identify and tag tokens with the least possibility of representing a single unique concept (for example, tokens containing dates, time, numbers, separators, etc.), or those tokens whose type is already identifiable by mappings between the syntactic model and the semantic model (for example, named objects (People, Devices), units of measurement, negation, etc.).

A parse graph can then be generated wherein the parse graph represents a sequence of evidence spaces and within each evidence space chunks and their dependencies, for example, tokens extracted from the text and their positional relationships. This graph representation may represent the concepts and relationships of the text. In one embodiment, the generation of parse graph may include representing chunks as RDF, assigning URIs and representing relationships between the chunks. The parse graph may be a directed graph with a non-hierarchical structure (a network) that maintains an index of all tokens and their positional information from original text as well as their containment information as a token may contain other tokens (example token related to "left arm" also contains tokens of "left" and "arm" which once linked form a small sub-graph).

Figure 31:
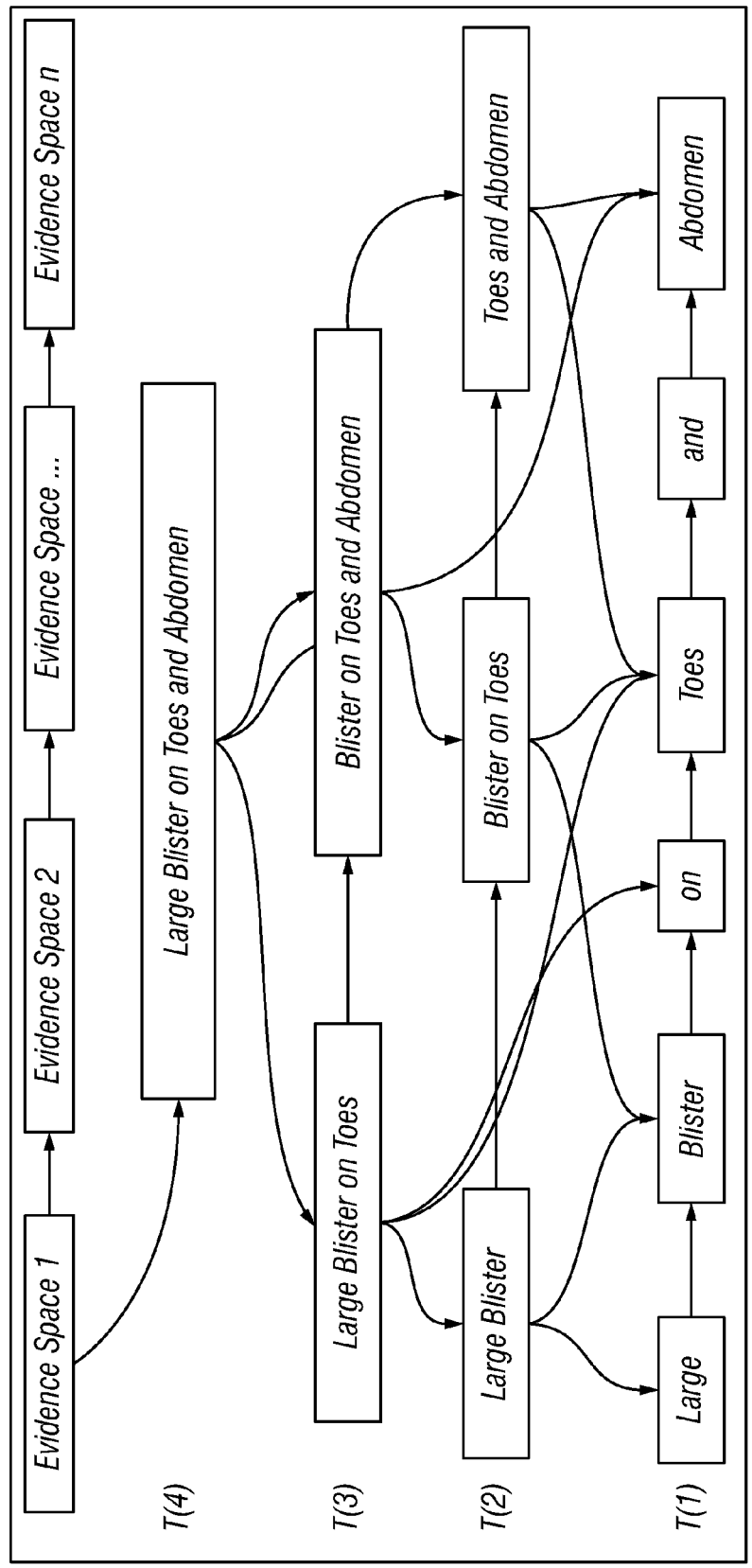
FIG. 31 depicts one embodiment of a parse graph.
Figure 32:
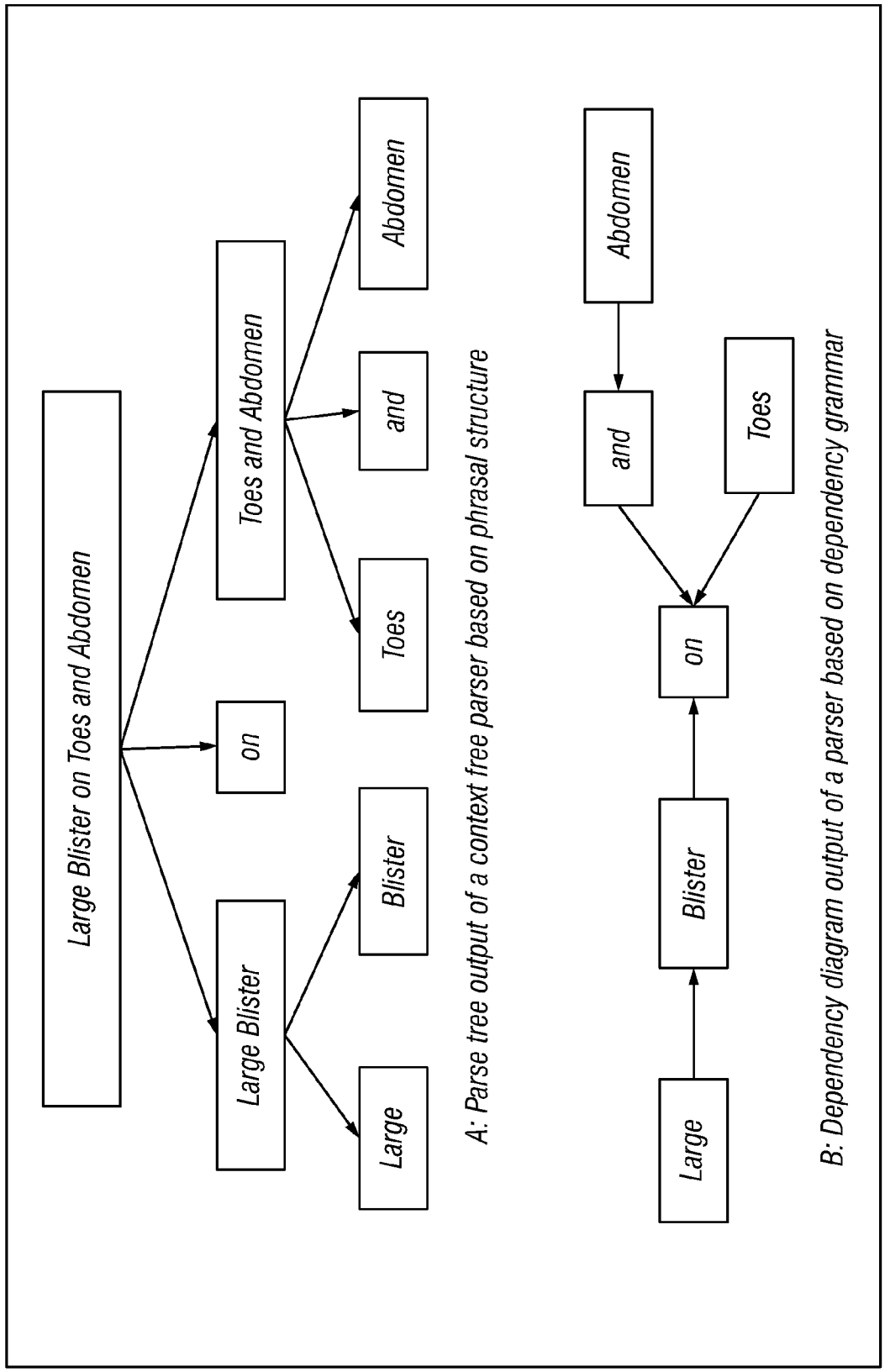
FIG. 32 depicts one embodiment of the output of a syntactic parser.

FIG. 31 depicts a representation of one embodiment of a parse graph. A parse graph may represent a set of ordered evidence spaces (here, for example, (evidence spaces 1, 2, 3, 4). In particular, here, the evidence space 1 is represented. The evidence space 1 may represent the text "Large Blister on Toes and Abdomen." Notice here that tokens of the evidence space may be ordered (for example, the token "large" is before the toke "blister" which is before the token "toes", etc.). A large token may contain smaller tokens (for example, the token "large blister on toes" contains the tokens "large blister" "on" and "toes", etc.). A parser can effectively query this parse graph to extract a parse tree consistent with the phrase structure grammar, or a dependency diagram consistent with a dependency grammar. FIG. 32 depicts the corresponding output of a syntactic parser using a typical context free grammar or dependency grammar.

At step 2430 the graph representation of the text (parse graph) may then be mapped to a domain ontology to form a unified graph comprising the parse graph representing the text, the syntax ontology and the domain ontology. Using the mappings between the graph representing the text and the domain ontology, and previously established mappings between the domain ontology and the semantic ontology, the graph representing the text may be mapped to a semantic ontology. In this manner, a unified graph comprising the graph representing the text, the domain ontology and the semantic ontology can be formed.

More specifically, in one embodiment, concepts of the parse graph may be mapped to concepts in the domain ontology using a matching algorithm such as the MMTx algorithm, as discussed above. In one particular embodiment, the MMTx linguistic analysis and concept mapping tool from NLM may be used to map eligible tokens in the parse graph to the UMLS-MTH. While all eligible tokens may be processed by the MMTx, only tokens with a MMTx mapping score of 1000 (a perfect match with at least one UMLS-MTH concept) may be mapped. The CUI and Semantic Types associated with the token are returned as the results of the application of the MMTx algorithm. The MMTX algorithm may be utilized to add the link between a given token and a corresponding CUI using the :correspondsToCUI property. This associates the token with the UMLS-SKOS resource defining the corresponding CUI and its Semantic Type(s). As soon as a token is linked to a corresponding CUI, the class membership of the token with a corresponding class in the Semantic ontology may be established.

In one embodiment of the system and using the mapping of the concepts in the parse graph, (for example, the RDF graph generated by the syntactic analysis of the parser) a mapping algorithm tries to connect each token of the parse graph with some concept (for example, owl:Class) from the semantic ontology. That is, the parse graph is further extended by information regarding mapping of each token to a related concept from the syntax or semantic ontologies. Each token in the resulting RDF graph is represented as an instance (rdf:type) of at least one concept (owl:Class) from the semantic ontology. Extensions and modifications to the ontology representing the semantic ontology may affect the class membership and classification results. This can be used as a vehicle to customize and contextualize the behavior of the system for different use cases, without changing the algorithm.

Figure 33:
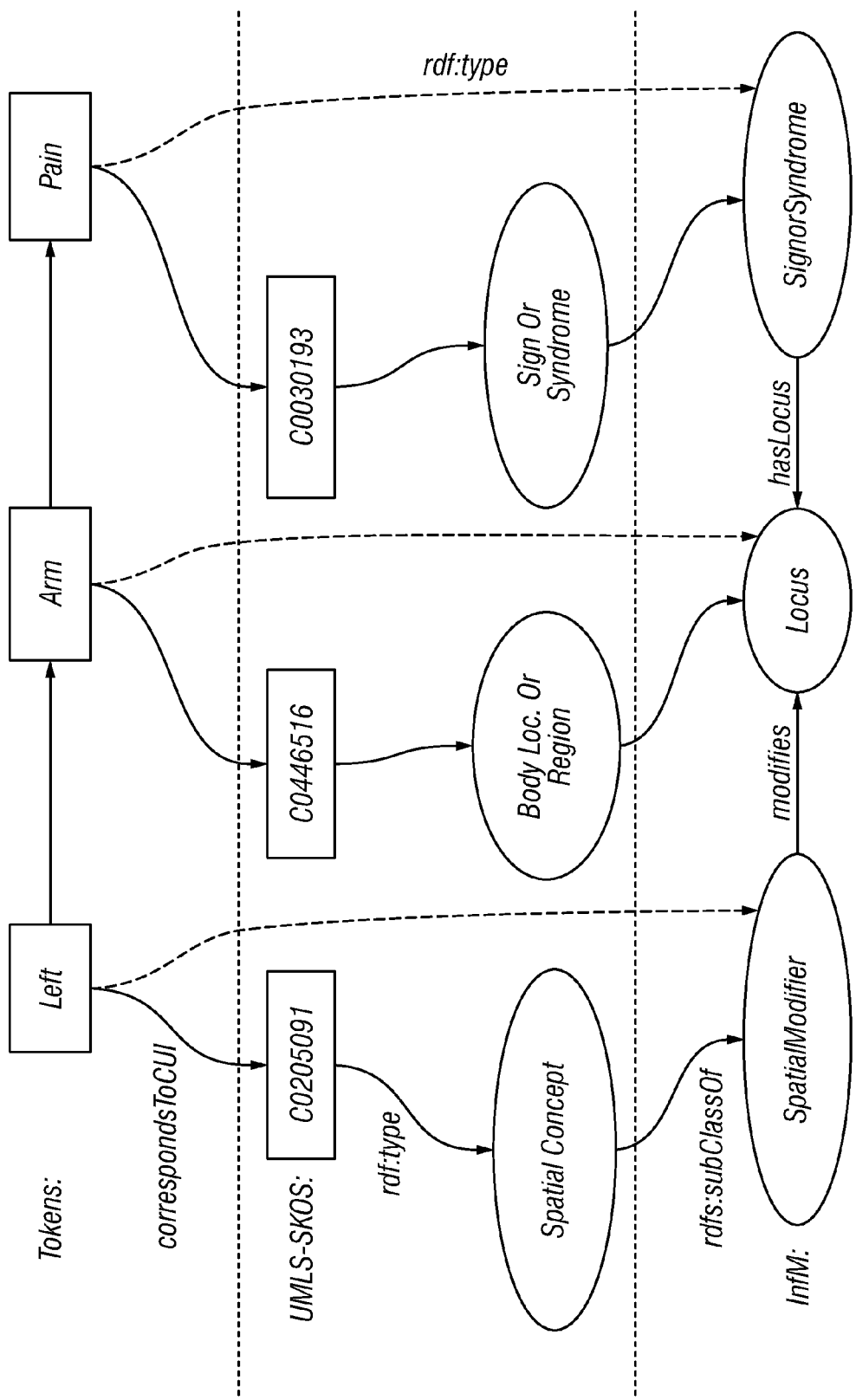
FIG. 33 depicts one embodiment of a unified graph as a result of mapping a parse graph to domain ontology and semantic ontology.

FIG. 33 depicts one embodiment of a unified graph comprising the tokens of a parse graph, a semantic ontology (here InfM) and a domain ontology (here UMLS-SKOS). In one embodiment an example of an RDF output associated with such a unified graph related to the text "a 13 years old teenager with nausea and vomiting after drinking bad milk. has taken Reglan that made her drowsy and confused. no fever and headache. Feels tingling on finger tips and around his mouth. dry skin in observation" may look like the following:

```
<rdf:RDF
    xmlns="http://www.phinformatics.org/erData.owl#"
    xmlns:rdf="http://www.w3.org/1999/02/22-rdf-syntax-ns#"
    xmlns:xsd="xsd:"
    xmlns:rdfs="http://www.w3.org/2000/01/rdf-schema#"
    xmlns:owl="http://www.w3.org/2002/07/owl#"
    xmlns:umls="http://umls.nlm.nih.gov/"
    xmlns:Defs="http://www.phinformatics.org/ccNLP_Definitions.owl#"
    xmlns:daml="http://www.daml.org/2001/03/daml+oil#"
    xmlns:erm="http://www.phinformatics.org/erModel.owl#"
    xmlns:sparql="http://www.topbraidcomposer.org/owl/2006/09/sparql.owl#"
    xml:base="http://www.phinformatics.org/erData.owl">
<rdf:Description rdf:about="umls:C0042963"
<rdf:type rdf:resource="erm:Observation"/>
<rdf:type rdf:resource="erm:Health_Related_Finding"/>
<rdf:type rdf:resource="erm:ER_Modeled_Concept"/>
<erm:hasMetaString         rdf:datatype="xsd:string">Vomitting</erm:hasMetaString>
<erm:hasConceptString      rdf:datatype="xsd:string">Vomiting</erm:hasConceptString>
<rdf:type rdf:resource="erm:UMLS_Concept"/>
<rdf:type rdf:resource="umls:Sign_or_Symptom"/>
</rdf:Description>
<rdf:Description rdf:about="#Mod_453904929">
<erm:hasModifier rdf:resource="http://www.phinformatics.org/ccNLP_Definitions.owl#no"/>
<erm:operatesOn rdf:resource="umls:C0015967"/>
<rdf:type rdf:resource="erm:Modifier_Operation"/>
</rdf:Description>
<rdf:Description rdf:about="#MAN_1072652244">
<erm:hasLocus rdf:resource="umls:C0226896"/>
<erm:hasLocus rdf:resource="umls:C1267547"/>
<erm:hasLocus rdf:resource="umls:C1278910"/>
<erm:hasLocus rdf:resource="umls:C0016129"/>
<erm:hasLocus rdf:resource="umls:C0851278"/>
<erm:hasLocus rdf:resource="umls:C1281584"/>
<erm:aboutObservation      rdf:resource="umls:C0234211"/>
<erm:isManifestationOf     rdf:resource="#EV_309412434"/>
<rdf:type rdf:resource="erm:Manifestation"/>
</rdf:Description>
<rdf:Description rdf:about="umls:C0026131">
<rdf:type rdf:resource="erm:Observed_Context"/>
<rdf:type rdf:resource="erm:Food_Context"/>
<rdf:type rdf:resource="erm:ER_Modeled_Concept"/>
<erm:hasConceptString      rdf:datatype="xsd:string">Milk</erm:hasConceptString>
<erm:hasMetaString  rdf:datatype="xsd:string">Milk</erm:hasMetaString>
<rdf:type rdf:resource="umls:Body_Substance"/>
<rdf:type rdf:resource="erm:UMLS_Concept"/>
<rdf:type rdf:resource="umls:Food"/>
</rdf:Description>
<rdf:Description rdf:about="umls:C0009676">
<rdf:type rdf:resource="erm:Observation"/>
<rdf:type rdf:resource="erm:Disease_Syndromes"/>
<rdf:type rdf:resource="erm:ER_Modeled_Concept"/>
<erm:hasConceptString      rdf:datatype="xsd:string">Confusion</erm:hasConceptString>
<erm:hasMetaString         rdf:datatype="xsd:string">Confused</erm:hasMetaString>
<rdf:type rdf:resource="erm:UMLS_Concept"/>
<rdf:type        rdf:resource="umls:Mental_or_Behavioral_Dysfunction"/>
</rdf:Description>
<rdf:Description rdf:about="#EV_1658750257">
<rdf:type rdf:resource="erm:Evidence"/>
</rdf:Description>
</rdf:Description>
<rdf:Description rdf:about=" ">
<owl:imports   rdf:resource="http://www.phinformatics.org/erModel.owl"/>
<owl:imports rdf:resource="http://www.topbraidcomposer.org/owl/2006/09/sparql.owl"/>
<owl:imports rdf:resource="umls:"/>
<rdf:type       rdf:resource="http://www.w3.org/2002/07/owl#Ontology"/>
</rdf:Description>
<rdf:Description rdf:about="umls:location_of">
<owl:inverseOf rdf:resource="erm:hasLocus"/>
</rdf:Description>
<rdf:Description rdf:about="#MAN_521713778">
<erm:hasMedicationContext       rdf:resource="umls:C0034977"/>
<erm:aboutObservation-rdf:resource="umls:C0013144"/>
<erm:isManifestationOf         rdf:resource="#EV_1658750257"/>
<rdf:type rdf:resource="erm:Manifestation"/>
</rdf:Description>
<rdf:Description rdf:about="umls:C0205169">
<rdf:type rdf:resource="erm:Functional_Modifiers"/>
<rdf:type rdf:resource="erm:Qualitative_Modifier"/>
<rdf:type rdf:resource="erm:ER_Modeled_Concept"/>
<erm:hasConceptString rdf:datatype="xsd:string">Bad (qualifier value)</erm:hasConceptString>
<erm:hasMetaString  rdf:datatype="xsd:string">Bad</erm:hasMetaString>
<rdf:type rdf:resource="erm:UMLS_Concept"/>
<rdf:type rdf:resource="umls:Qualitative_Concept"/>
</rdf:Description>
<rdf:Description rdf:about="umls:C0231290">
<rdf:type rdf:resource="erm:Observed_Context"/>
<rdf:type rdf:resource="erm:Temporal_Context"/>
<rdf:type rdf:resource="erm:ER_Modeled_Concept"/>
<erm:hasConceptString rdf:datatype="xsd:string">Status post (contextual qualifier) (qualifier value)</erm:hasConceptString>
<erm:hasMetaString  rdf:datatype="xsd:string">After</erm:hasMetaString>
<rdf:type rdf:resource="erm:UMLS_Concept"/>
<rdf:type rdf:resource="umls:Temporal_Concept"/>
</rdf:Description>
<rdf:Description rdf:about="#MAN_1923090911">
<erm:hasMedicationContext       rdf:resource="umls:C0034977"/>
<erm:aboutObservation          rdf:resource="umls:C0009676"/>
<erm:isManifestationOf         rdf:resource="#EV_1658750257"/>
<rdf:type rdf:resource="erm:Manifestation"/>
```

```
</rdf:Description>
<rdf:Description rdf:about="umls:C1123023">
<rdf:type rdf:resource="erm:Locus"/>
<rdf:type rdf:resource="erm:ER_Modeled_Concept"/>
<erm:hasConceptString rdf:datatype="xsd:string">Skin</erm:hasConceptString>
<erm:hasMetaString rdf:datatype="xsd:string">Skin</erm:hasMetaString>
<rdf:type rdf:resource="erm:UMLS_Concept"/>
<rdf:type rdf:resource="umls:Body_Part_Organ_or_Organ_Component"/>
</rdf:Description>
<rdf:Description rdf:about="umls:C0013123">
<rdf:type rdf:resource="erm:UMLS_Concept"/>
<rdf:type rdf:resource="umls:Organism_Function"/>
</rdf:Description>
<rdf:Description rdf:about="#MAN__174111234">
<erm:aboutObservation rdf:resource="umls:C0042963"/>
<erm:isModifiedBy rdf:resource="#Mod__2053891702"/>
<erm:hasTemporalContext rdf:resource="umls:C0231290"/>
<erm:isManifestationOf rdf:resource="#EV__161514994"/>
<erm:hasFoodContext rdf:resource="umls:C0026131"/>
<erm:hasAgeContext rdf:resource="umls:C0001578"/>
<rdf:type rdf:resource="erm:Manifestation"/>
</rdf:Description>
<rdf:Description rdf:about="umls:C1278910">
<rdf:type rdf:resource="erm:Locus"/>
<rdf:type rdf:resource="erm:ER_Modeled_Concept"/>
<erm:hasConceptString rdf:datatype="xsd:string">Entire oral cavity</erm:hasConceptString>
<erm:hasMetaString rdf:datatype="xsd:string">Mouth</erm:hasMetaString>
<rdf:type rdf:resource="erm:UMLS_Concept"/>
<rdf:type rdf:resource="umls:Body_Location_or_Region"/>
</rdf:Description>
<rdf:Description rdf:about="#MAN__1972197664">
<erm:isModifiedBy rdf:resource="#Mod__453904929"/>
<erm:aboutObservation rdf:resource="umls:C0015967"/>
<erm:isManifestationOf rdf:resource="#EV__1703472089"/>
<rdf:type rdf:resource="erm:Manifestation"/>
</rdf:Description>
<rdf:Description rdf:about="erm:NeurologicalSignorSymptom">
<rdfs:subClassOf rdf:resource="erm:Signs_Symptoms"/>
<rdf:type rdf:resource="http://www.w3.org/2002/07/owl#Class"/>
</rdf:Description>
<rdf:Description rdf:about="umls:C0034977">
<rdf:type rdf:resource="erm:Observed_Context"/>
<rdf:type rdf:resource="erm:Medication_Context"/>
<rdf:type rdf:resource="erm:ER_Modeled_Concept"/>
<erm:hasConceptString rdf:datatype="xsd:string">Reglan</erm:hasConceptString>
<erm:hasMetaString rdf:datatype="xsd:string">Reglan</erm:hasMetaString>
<rdf:type rdf:resource="umls:Organic_Chemical"/>
<rdf:type rdf:resource="erm:UMLS_Concept"/>
<rdf:type rdf:resource="umls:Pharmacologic_Substance"/>
</rdf:Description>
<rdf:Description rdf:about="umls:C0302523">
<rdf:type rdf:resource="erm:UMLS_Concept"/>
<rdf:type rdf:resource="umls:Research_Activity"/>
</rdf:Description>
<rdf:Description rdf:about="#Mod__202233976">
<erm:hasModifier rdf:resource="umls:C0205222"/>
<erm:operatesOn rdf:resource="umls:C1278993"/>
<rdf:type rdf:resource="erm:Modifier_Operation"/>
</rdf:Description>
<rdf:Description rdf:about="umls:C1278993">
<rdf:type rdf:resource="erm:Locus"/>
<rdf:type rdf:resource="erm:ER_Modeled_Concept"/>
<erm:hasConceptString rdf:datatype="xsd:string">Entire skin</erm:hasConceptString>
<erm:hasMetaString rdf:datatype="xsd:string">Skin</erm:hasMetaString>
<rdf:type rdf:resource="erm:UMLS_Concept"/>
<rdf:type rdf:resource="umls:Body_System"/>
</rdf:Description>
<rdf:Description rdf:about="umls:C0234211">
<erm:hasConceptString rdf:datatype="xsd:string">Pins and needles (finding)</erm:hasConceptString>
<erm:hasMetaString rdf:datatype="xsd:string">Tingling</erm:hasMetaString>
<rdf:type rdf:resource="erm:NeurologicalSignorSymptom"/>
</rdf:Description>
<rdf:Description rdf:about="umls:C1267547">
<rdf:type rdf:resource="erm:Locus"/>
<rdf:type rdf:resource="erm:ER_Modeled_Concept"/>
<erm:hasConceptString rdf:datatype="xsd:string">Entire mouth region</erm:hasConceptString>
<erm:hasMetaString rdf:datatype="xsd:string">Mouth</erm:hasMetaString>
<rdf:type rdf:resource="erm:UMLS_Concept"/>
<rdf:type rdf:resource="umls:Body_Location_or_Region"/>
</rdf:Description>
<rdf:Description rdf:about="umls:C0205222">
<rdf:type rdf:resource="erm:Functional_Modifiers"/>
<rdf:type rdf:resource="erm:Qualitative_Modifier"/>
<rdf:type rdf:resource="erm:ER_Modeled_Concept"/>
<erm:hasConceptString rdf:datatype="xsd:string">Dry</erm:hasConceptString>
<erm:hasMetaString rdf:datatype="xsd:string">Dry</erm:hasMetaString>
<rdf:type rdf:resource="erm:UMLS_Concept"/>
<rdf:type rdf:resource="umls:Qualitative_Concept"/>
</rdf:Description>
<rdf:Description rdf:about="#MAN__1741111145">
<erm:hasAgeContext rdf:resource="umls:C0001578"/>
<erm:hasFoodContext rdf:resource="umls:C0026131"/>
<erm:isManifestationOf rdf:resource="#EV__161514994"/>
<erm:aboutObservation rdf:resource="umls:C0027497"/>
<erm:isModifiedBy rdf:resource="#Mod__2053891702"/>
<erm:hasTemporalContext rdf:resource="umls:C0231290"/>
<rdf:type rdf:resource="erm:Manifestation"/>
</rdf:Description>
<rdf:Description rdf:about="#CC__165770160">
<erm:hasCCText rdf:datatype="xsd:string">a 13 years old teenager with nausea and vomiting after drinking bad milk. has taken Reglan that made her drowsy and
``` confused. no fever and headache. Feels tingling on fingertips and around his mouth. dry skin in observation.</erm:hasCCText>
<erm:hasEvidence rdf:resource="#EV_309412434"/>
<erm:hasEvidence rdf:resource="#EV_1703472089"/>
<erm:hasEvidence rdf:resource="#EV_1658750257"/>
<erm:hasEvidence rdf:resource="#EV_161514994"/>
<erm:hasEvidence rdf:resource="#EV_258386563"/>
<rdf:type rdf:resource="erm:ChiefComplaint"/>
</rdf:Description>
<rdf:Description rdf:about="#EV_258386563">
<rdf:type rdf:resource="erm:Evidence"/>
</rdf:Description>
<rdf:Description rdf:about="#Mod_2053891702">
<erm:hasModifier rdf:resource="umls:C0205169"/>
<erm:operatesOn rdf:resource="umls:C0026131"/>
<rdf:type rdf:resource="erm:Modifier_Operation"/>
</rdf:Description>
<rdf:Description rdf:about="#Mod_1682377644">
<erm:hasModifier rdf:resource="umls:C0205222"/>
<erm:operatesOn rdf:resource="umls:C1278993"/>
<rdf:type rdf:resource="erm:Modifier_Operation"/>
</rdf:Description>
<rdf:Description rdf:about="#EV_1703472089">
<rdf:type rdf:resource="erm:Evidence"/>
</rdf:Description>
<rdf:Description rdf:about="umls:C0700325">
<rdf:type rdf:resource="erm:Observation"/>
<rdf:type rdf:resource="erm:Healthcare_Procedure"/>
<rdf:type rdf:resource="erm:ER_Modeled_Concept"/>
<erm:hasConceptString rdf:datatype="xsd:string">Patient observation</erm:hasConceptString>
<erm:hasMetaString rdf:datatype="xsd:string">observation</erm:hasMetaString>
<rdf:type rdf:resource="erm:UMLS_Concept"/>
<rdf:type rdf:resource="umls:Therapeutic_or_Preventive_Procedure"/>
</rdf:Description>
<rdf:Description rdf:about="umls:C0013144">
<erm:hasConceptString rdf:datatype="xsd:string">Drowsiness</erm:hasConceptString>
<erm:hasMetaString rdf:datatype="xsd:string">Drowsy</erm:hasMetaString>
<rdf:type rdf:resource="erm:NeurologicalSignorSymptom"/>
</rdf:Description>
<rdf:Description rdf:about="umls:C0226896">
<rdf:type rdf:resource="erm:Locus"/>
<rdf:type rdf:resource="erm:ER_Modeled_Concept"/>
<erm:hasConceptString rdf:datatype="xsd:string">Oral cavity</erm:hasConceptString>
<erm:hasMetaString rdf:datatype="xsd:string">Mouth</erm:hasMetaString>
<rdf:type rdf:resource="erm:UMLS_Concept"/>
<rdf:type rdf:resource="umls:Body_Part_Organ_or_Organ_Component"/>
</rdf:Description>
<rdf:Description rdf:about="umls:C0015967">
<rdf:type rdf:resource="erm:Health_Related_Finding"/>
<rdf:type rdf:resource="erm:Observation"/>
<rdf:type rdf:resource="erm:Signs_Symptoms"/>
<rdf:type rdf:resource="erm:ER_Modeled_Concept"/>
<erm:hasConceptString rdf:datatype="xsd:string">Fever</erm:hasConceptString>
<erm:hasMetaString rdf:datatype="xsd:string">Fever</erm:hasMetaString>
<rdf:type rdf:resource="erm:UMLS_Concept"/>
<rdf:type rdf:resource="umls:Sign_or_Symptom"/>
</rdf:Description>
<rdf:Description rdf:about="umls:manifestation_of">
<owl:equivalentProperty rdf:resource="erm:isManifestationOf"/>
<owl:inverseOf rdf:resource="erm:hasManifestation"/>
</rdf:Description>
<rdf:Description rdf:about="umls:C0851278">
<rdf:type rdf:resource="erm:Locus"/>
<rdf:type rdf:resource="erm:ER_Modeled_Concept"/>
<erm:hasConceptString rdf:datatype="xsd:string">Fingers not including thumb</erm:hasConceptString>
<erm:hasMetaString rdf:datatype="xsd:string">Finger</erm:hasMetaString>
<rdf:type rdf:resource="erm:UMLS_Concept"/>
<rdf:type rdf:resource="umls:Body_Part_Organ_or_Organ_Component"/>
</rdf:Description>
<rdf:Description rdf:about="#suggestedTreatment">
<rdf:type rdf:resource="http://www.w3.org/2002/07/owl#ObjectProperty"/>
</rdf:Description>
<rdf:Description rdf:about="#Mod_1301669563">
<erm:hasModifier rdf:resource="http://www.phinformatics.org/ccNLP_Definitions.owl#no"/>
<erm:operatesOn rdf:resource="umls:C0018681"/>
<rdf:type rdf:resource="erm:Modifier_Operation"/>
</rdf:Description>
<rdf:Description rdf:about="#EV_309412434">
<rdf:type rdf:resource="erm:Evidence"/>
</rdf:Description>
<rdf:Description rdf:about="#MAN_614078524">
<erm:isModifiedBy rdf:resource="#Mod_1301669563"/>
<erm:aboutObservation rdf:resource="umls:C0018681"/>
<erm:isManifestationOf rdf:resource="#EV_1703472089"/>
<rdf:type rdf:resource="erm:Manifestation"/>
</rdf:Description>
<rdf:Description rdf:about="umls:C0684271">
<rdf:type rdf:resource="erm:UMLS_Concept"/>
<rdf:type rdf:resource="umls:Organism_Function"/>
</rdf:Description>
<rdf:Description rdf:about="umls:indicates">
<owl:equivalentProperty rdf:resource="erm:aboutObservation"/>
</rdf:Description>
<rdf:Description rdf:about="umls:C0027497">
<rdf:type rdf:resource="erm:Observation"/>
<rdf:type rdf:resource="erm:Health_Related_Finding"/>
<rdf:type rdf:resource="erm:ER_Modeled_Concept"/>
<erm:hasConceptString rdf:datatype="xsd:string">Nausea</erm:hasConceptString>
<erm:hasMetaString rdf:datatype="xsd:string">Nausea</erm:hasMetaString>
<rdf:type rdf:resource="erm:UMLS_Concept"/>
<rdf:type rdf:resource="umls:Finding"/>
</rdf:Description>
<rdf:Description rdf:about="umls:C0001578">
<rdf:type rdf:resource="erm:Observed_Context"/>
<rdf:type rdf:resource="erm:Age_Context"/>
<rdf:type rdf:resource="erm:ER_Modeled_Concept"/>
<erm:hasConceptString rdf:datatype="xsd:string">Adolescence</erm:hasConceptString>

```
<erm:hasMetaString rdf:datatype="xsd:string">teenager</erm:hasMetaString>
<rdf:type rdf:resource="erm:UMLS_Concept"/>
<rdf:type rdf:resource="umls:Age_Group"/>
</rdf:Description>
<rdf:Description rdf:about="#Mod__739632424">
<erm:hasModifier rdf:resource="umls:C0205222"/>
<erm:operatesOn rdf:resource="umls:C1123023"/>
<rdf:type rdf:resource="erm:Modifier_Operation"/>
</rdf:Description>
<rdf:Description rdf:about="umls:C0001948">
<rdf:type rdf:resource="erm:UMLS_Concept"/>
<rdf:type rdf:resource="umls:Individual_Behavior"/>
</rdf:Description>
<rdf:Description rdf:about="umls:C1281584">
<rdf:type rdf:resource="erm:Locus"/>
<rdf:type rdf:resource="erm:ER_Modeled_Concept"/>
<erm:hasConceptString rdf:datatype="xsd:string">Entire finger</erm:hasConceptString>
<erm:hasMetaString rdf:datatype="xsd:string">Finger</erm:hasMetaString>
<rdf:type rdf:resource="erm:UMLS_Concept"/>
<rdf:type rdf:resource="umls:Body_Part_Organ_or_Organ_Component"/>
</rdf:Description>
<rdf:Description rdf:about="umls:affects">
<owl:inverseOf rdf:resource="erm:hasModifier"/>
</rdf:Description>
<rdf:Description rdf:about="#EV__161514994">
<Defs:hasTextForm rdf:datatype="xsd:string">a 13 years old teenager with nausea and vomitting after drinking bad milk</Defs:hasTextForm>
<rdf:type rdf:resource="erm:Evidence"/>
</rdf:Description>
<rdf:Description rdf:about="#MAN__1077141075">
<erm:hasLocus rdf:resource="umls:C1278993"/>
<erm:isModifiedBy rdf:resource="#Mod__202233976"/>
<erm:hasLocus rdf:resource="umls:C1123023"/>
<erm:isModifiedBy rdf:resource="#Mod__739632424"/>
<erm:aboutObservation rdf:resource="umls:C0700325"/>
<erm:isManifestationOf rdf:resource="#EV__258386563"/>
<rdf:type rdf:resource="erm:Manifestation"/>
</rdf:Description>
<rdf:Description rdf:about="#MAN__1802408159">
<erm:hasLocus rdf:resource="umls:C0226896"/>
<erm:hasLocus rdf:resource="umls:C1267547"/>
<erm:hasLocus rdf:resource="umls:C1278910"/>
<erm:hasLocus rdf:resource="umls:C0016129"/>
<erm:hasLocus rdf:resource="umls:C0851278"/>
<erm:hasLocus rdf:resource="umls:C1281584"/>
<erm:isManifestationOf rdf:resource="#EV__309412434"/>
<rdf:type rdf:resource="erm:Manifestation"/>
</rdf:Description>
<rdf:Description rdf:about="#Mod__1178085293">
<erm:hasModifier rdf:resource="umls:C0205222"/>
<erm:operatesOn rdf:resource="umls:C1123023"/>
<rdf:type rdf:resource="erm:Modifier_Operation"/>
</rdf:Description>
<rdf:Description rdf:about="umls:C0016129">
<rdf:type rdf:resource="erm:Locus"/>
<rdf:type rdf:resource="erm:ER_Modeled_Concept"/>
<erm:hasConceptString rdf:datatype="xsd:string">Fingers</erm:hasConceptString>
<erm:hasMetaString rdf:datatype="xsd:string">Finger</erm:hasMetaString>
<rdf:type rdf:resource="erm:UMLS_Concept"/>
<rdf:type rdf:resource="umls:Body_Part_Organ_or_Organ_Component"/>
</rdf:Description>
<rdf:Description rdf:about="umls:C0151908">
<rdf:type rdf:resource="erm:Health_Related_Finding"/>
<rdf:type rdf:resource="erm:Observation"/>
<rdf:type rdf:resource="erm:Signs_Symptoms"/>
<rdf:type rdf:resource="erm:ER_Modeled_Concept"/>
<erm:hasConceptString rdf:datatype="xsd:string">Dry skin</erm:hasConceptString>
<erm:hasMetaString rdf:datatype="xsd:string">Dry skin</erm:hasMetaString>
<rdf:type rdf:resource="erm:UMLS_Concept"/>
<rdf:type rdf:resource="umls:Sign_or_Symptom"/>
</rdf:Description>
<rdf:Description rdf:about="#MAN__1736546832">
<erm:hasLocus rdf:resource="umls:C1278993"/>
<erm:isModifiedBy rdf:resource="#Mod__1682377644"/>
<erm:hasLocus rdf:resource="umls:C1123023"/>
<erm:isModifiedBy rdf:resource="#Mod__1178085293"/>
<erm:aboutObservation rdf:resource="umls:C0151908"/>
<erm:isManifestationOf rdf:resource="#EV__258386563"/>
<rdf:type rdf:resource="erm:Manifestation"/>
</rdf:Description>
<rdf:Description rdf:about="umls:C0018681">
<rdf:type rdf:resource="erm:Health_Related_Finding"/>
<rdf:type rdf:resource="erm:Observation"/>
<rdf:type rdf:resource="erm:Signs_Symptoms"/>
<rdf:type rdf:resource="erm:ER_Modeled_Concept"/>
<erm:hasConceptString rdf:datatype="xsd:string">Headache</erm:hasConceptString>
<erm:hasMetaString rdf:datatype="xsd:string">Headache</erm:hasMetaString>
<rdf:type rdf:resource="erm:UMLS_Concept"/>
<rdf:type rdf:resource="umls:Sign_or_Symptom"/>
</rdf:Description>
</rdf:RDF>
```

In one embodiment, after the mapping described above is complete a filter function may discard from the parse graph all tokens that have failed to map to at least one concept in the semantic model. At this stage the process of extraction and encoding may be complete in that the interaction of the tokenization, mapping and filtering functions have extracted all meaningful concepts identifiable using the combination of the system lexicon, the terminological and domain knowledge (UMLS-SKOS) and the semantic ontology.

A semantic interpreter may add an index to all tokens based on their semantics extractable from the syntax and semantic ontology, and its linkage to the domain ontology (for example, UMLS-SKOS). The indexer uses heuristics associated with the allowable distance for related concepts (for example, five as discussed above), syntactic cues from the syntax ontology (for example, the role of 'and', 'or', 'in, on, into, upon, of' etc.), and semantic relationships defined in the semantic and domain ontologies to transform the parse graph into a conceptual graph in which tokens are related to each other based on a set of generic relationships other than their position in the text. Relationships between tokens in the conceptual graph are similar in utility to the edges in a dependency diagram, in that, they indicate relationship between tokens without making an assumption about its nature and a specific meaning.

Figure 34:
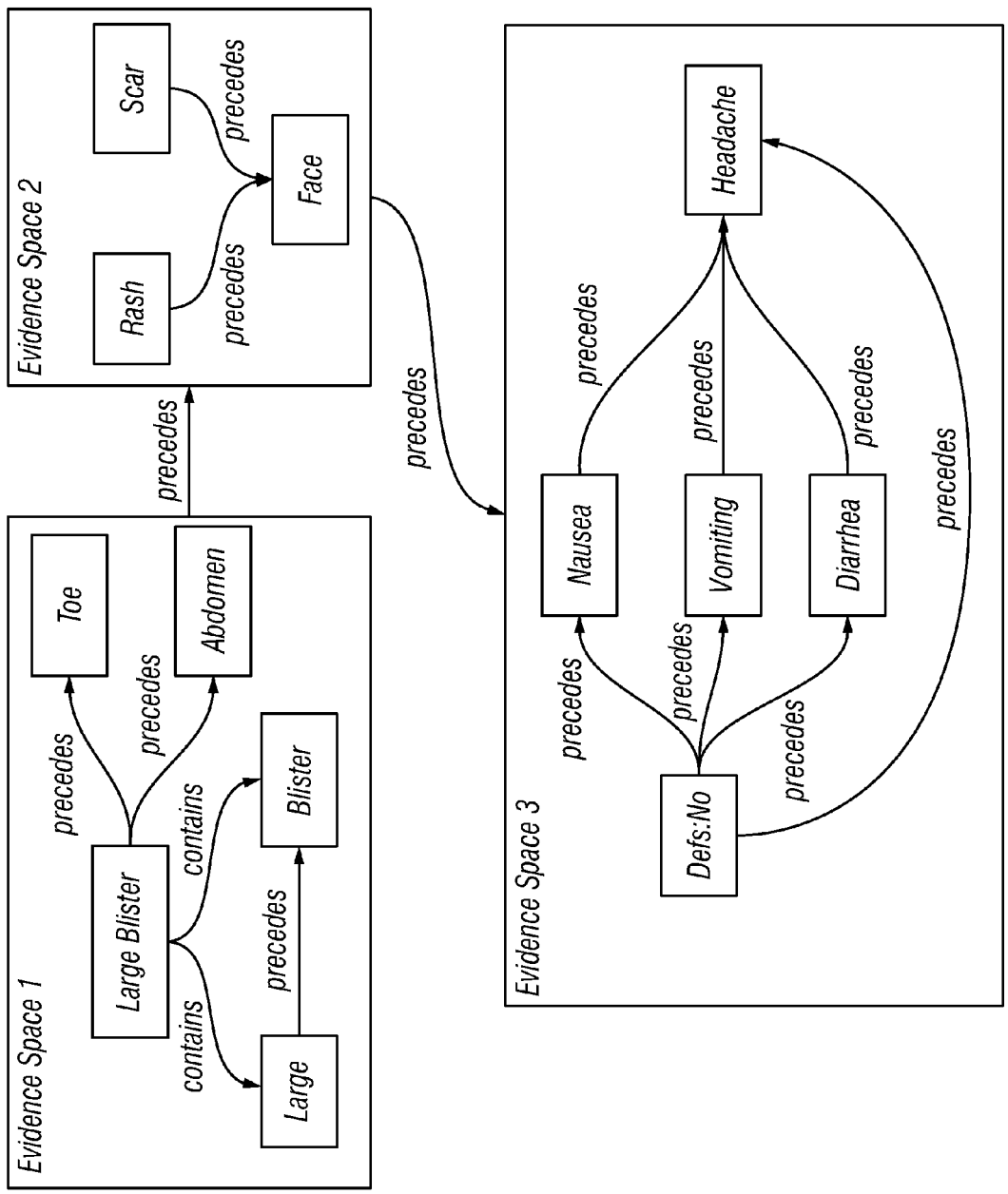
FIG. 34 depicts one embodiment of a conceptual graph.

FIG. 34 depicts an example of a conceptual graph. Note that the tokens related to "Rash" and "Scar" both are related to the "Face" through a "precede" property but have no relationships with each other, and that the semantics of how this precedence should be interpreted, and what it may mean in any context is not represented.

Figure 35:
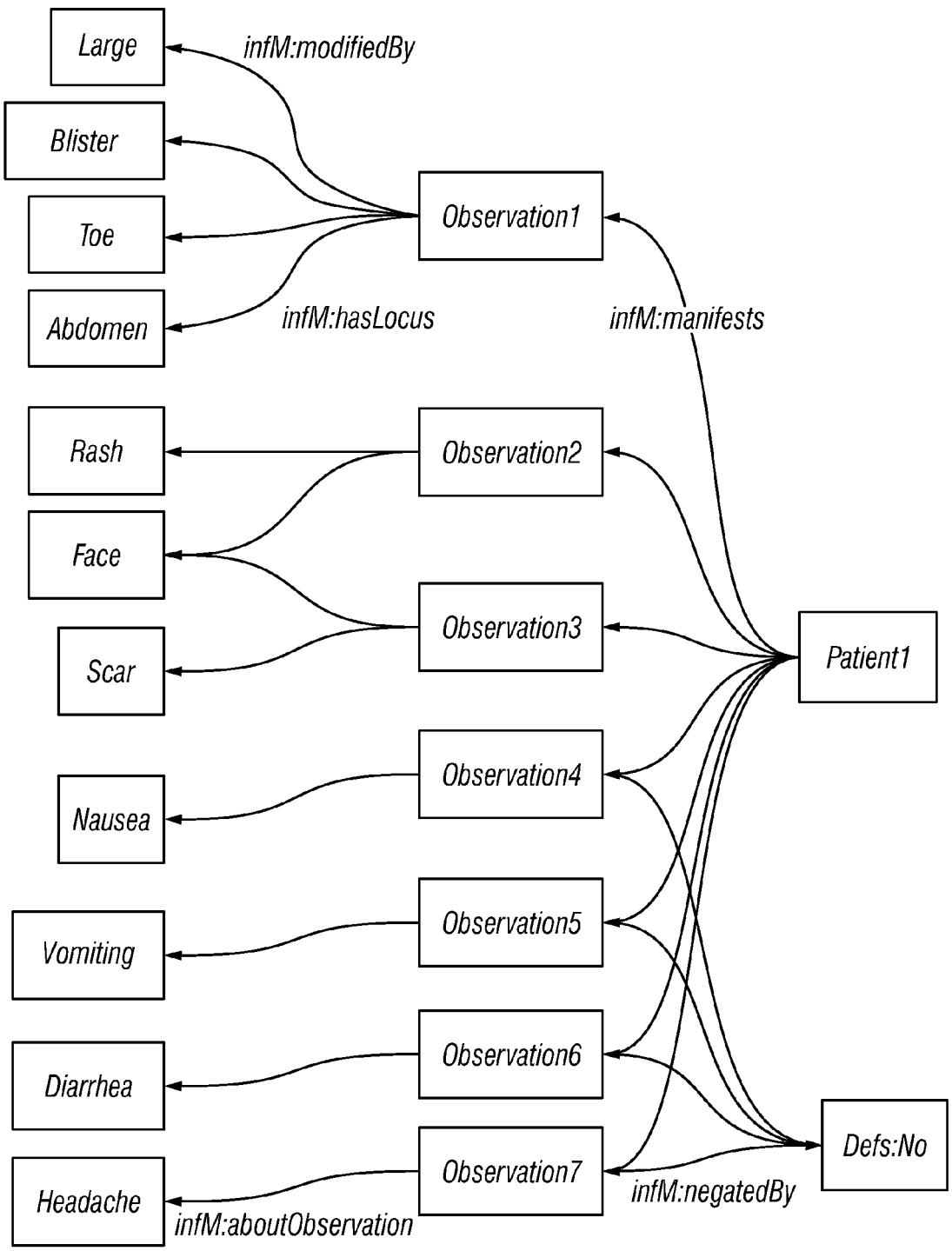
FIG. 35 depicts one embodiment of formal RDF output of the text processing algorithm. The input text turns into a formal graph representation with all mapping needed to facilitate its integration and automated interpretation, navigation, search and retrieval.

FIG. 35 depicts the formal RDF output corresponding to the conceptual graph of FIG. 33. The conceptual graph may be an intermediate output that represents tokens of clinical text mapped to concepts from ontologies with formal semantics and encoded with at least one UMLS-MTH CUI when possible, linked to each other and to their meaning in the ontologies available to the system. This enables any third party parser, classifier, or reasoner to be able to use the conceptual graph for further processing, querying and contextualization to construct outputs specific to their local needs, without having to utilize the specific ontologies used by the informatics system. This enables reuse and repurposing of such a conceptual graph in other contexts.

In any event, the unified graph comprising the tokens of the parse graph, the semantic ontology and the domain ontology may be searched at step 2440 to obtain data about received clinical text. As discussed above, the interface presented to the user may provide an open framework for the user to construct queries according to the context of the domain ontology. Specifically, the interface may present the users with the set of concepts or relationships utilized in the domain ontology to allow the user to formulate queries based on these concepts and relationships. Searches can then be formed and conducted based on the domain ontology. In this manner users are provided with a highly effective and contextual method for extracting meaning from obtained data. In particular, the concepts in the domain ontology specified by the user using the interface may be used as starting points in the unified graph and the graph navigated from these staring points to determine survey data responsive to the user's query.

In addition to processing clinical text, embodiments of an informatics system may utilize a substantially automated method of creating a unified graph based on a structured dataset (which may for example, be received from a data source), such as an XML document formed as an XML message or the like, or a data formed according to a database schema employed by a data source. Specifically, in one embodiment, the structured dataset may be received and a graph representation of an ontology that describes the structure or types of data from the data source may be constructed. A graph representing the actual data of the data set may then be constructed based on the ontology describing the structured data to create a unified graph comprising the ontology and the graph representation of the data of the dataset. This unified graph may then be used for a variety of purposes. For example, in one embodiment, concepts in the ontology may be mapped to a domain ontology or the like such that a unified graph can be created from the ontology representing the source, the graph representing the data of the structured data and the domain ontology. Such a unified graph can then be searched according to the concepts and relationships of the domain ontology.

Figure 46:
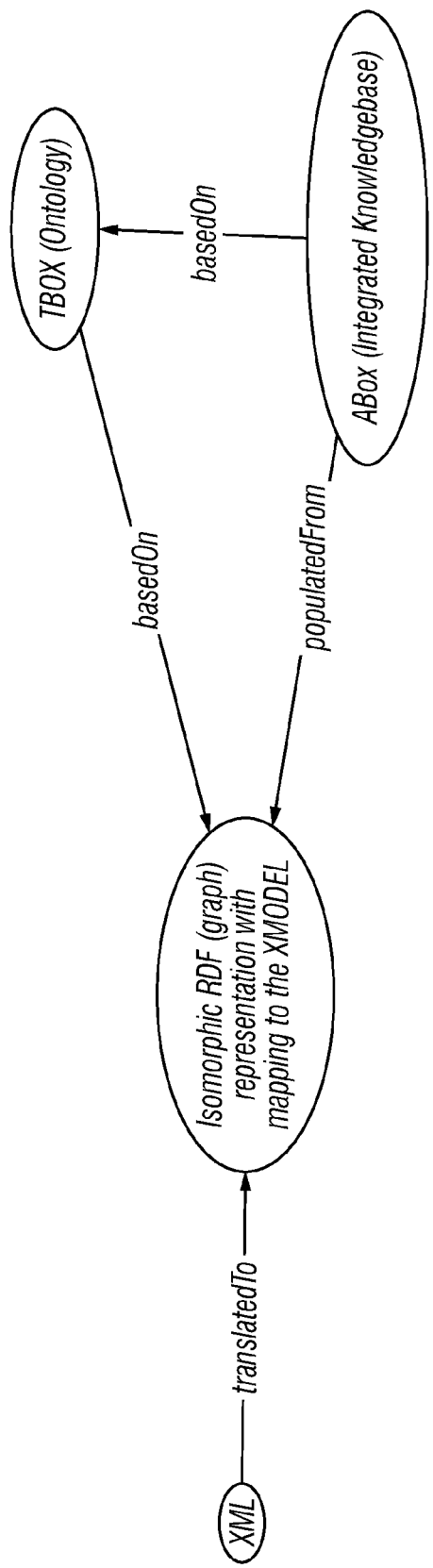
FIG. 46 depicts one embodiment of a method for creating an ontology representing a data source based on structured data.

FIG. 46 depicts one embodiment of creating a source ontology based on structured data representing a particular data. In particular the relationship between the input (structured data such as an XML message), the outputs (source ontology or TBOX and ABOX (population of the ontology with the data from structured data)), and the intermediate representation (for example, an isomorphic RDF graph) is depicted. It will be noted that the isomorphic RDF graph may be disposed of after the ABOX is populated.

Here, the data set comprising a structured representation of data from the data source may be translated to a graph representation comprising a source ontology (TBOX) and the formal representation of data described by the ontology (ABOX). An ontology for the data source (which is referred to as a source ontology or the TBOX for the data source) may be created automatically based on the graph representation of the received structured data. Once the source ontology is constructed, the data from the data source may be represented as a graph (referred to as the graph representation of the data or the ABOX for the received data) by populating instances of the concepts in the ontology for the data source (the TBOX).

Figure 47:
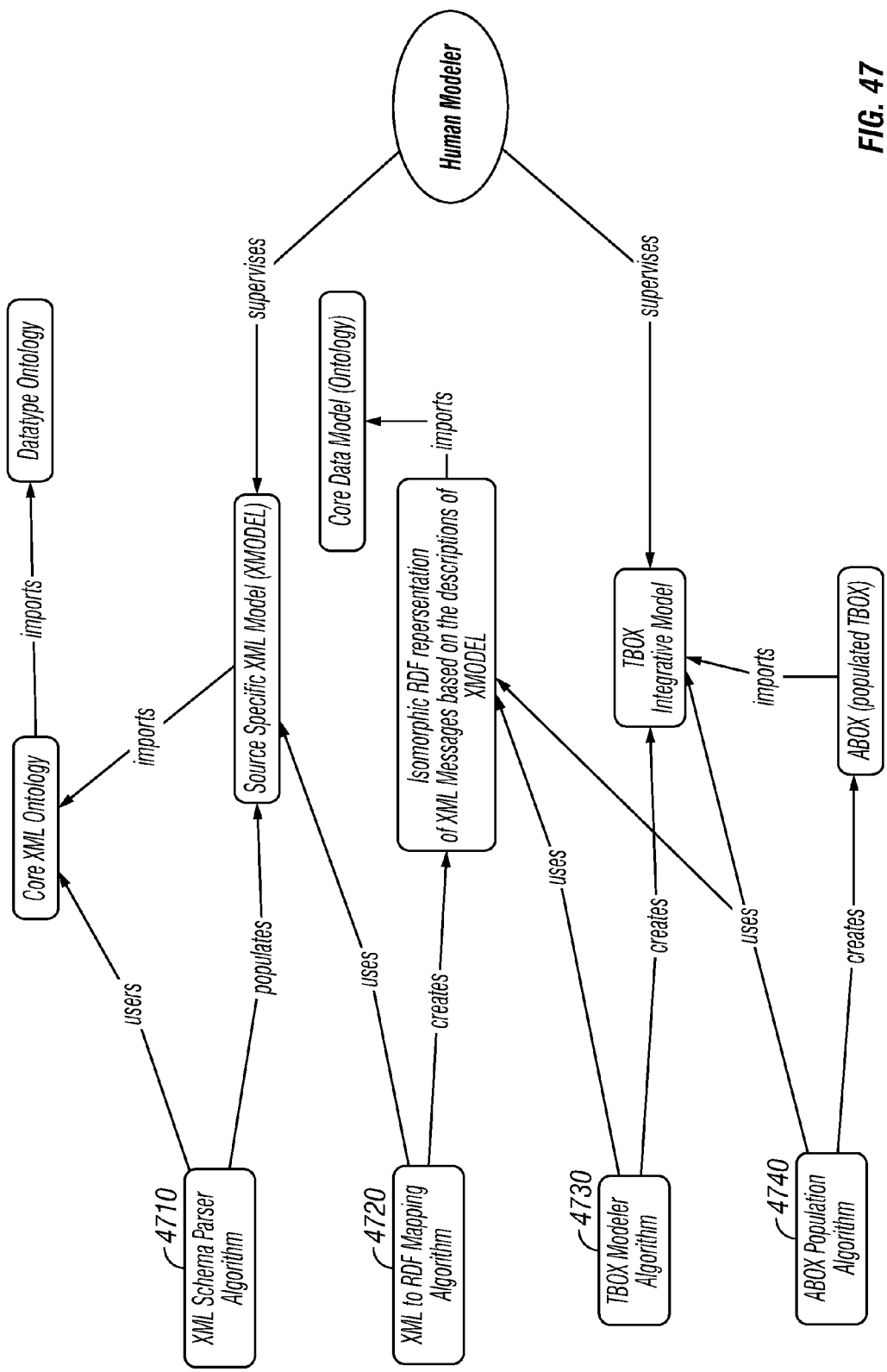
FIG. 47 depicts one embodiment of a method of creating an ontology representation of a data source and representing data from a data source according to the created ontology.
Figure 52:
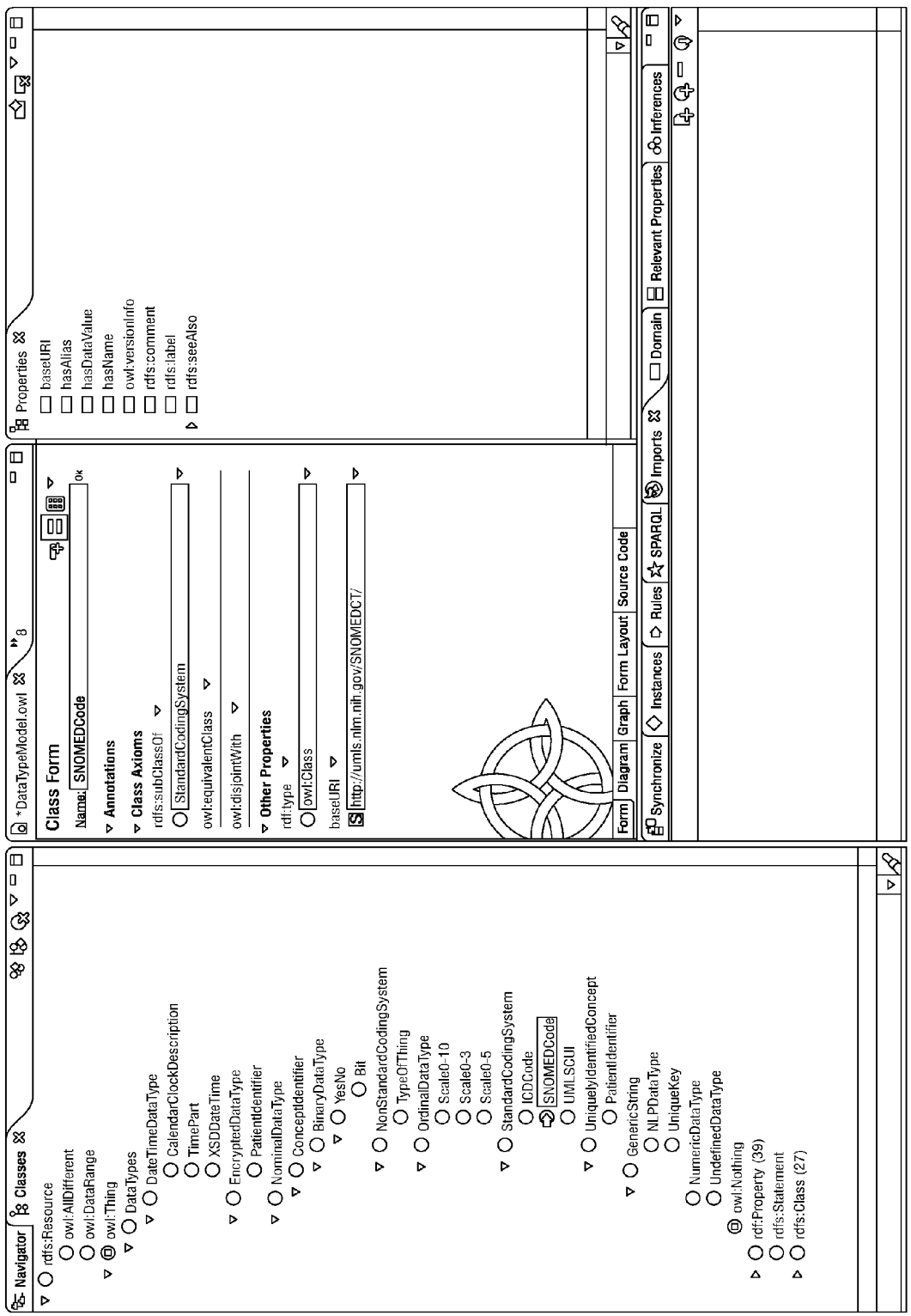
FIG. 52 depicts one embodiment of a portion of a datatype model.

FIG. 47 depicts the one embodiment of a method of creating an ontology for a data source and representing data from a data source according to the created ontology in more detail. The method depicted may utilize a core schema ontology, that may comprise knowledge on the construction of structured documents and which may form a unified graph with a datatype ontology which is a representation of types of data which may exist in a data source. Specifically, a datatype ontology introduces a simple classification of datatypes that are expected to be found in the structured data. It starts with notion of basic datatypes such as numbers, strings, datetime etc. Each datatype may get further extended to include subtypes, for example such as integer or float, in the case of numerical datatypes. FIG. 52 depicts one embodiment of a portion of a datatype model.

The core Schema model or CXM imports the datatype ontology and describes any given structured data set in terms of two aspects: 1) the hierarchy (for example, in an XML document it would be formal description of XML Elements and XML Attributes, and the child parent relations between them and 2) the Concept Expressions. Concept expressions describe each and every data element (e.g., XML node, including both XML Elements and XML Attributes) in terms of what kind of information it brings to bear. In this ontology, every data element maybe categorized as the main concept being described by other data elements (SchemaExpression) or it may be categorized as some metadata about a main concept (MetaDataExpression). For establishes, in the case of an XML document, it formally establishes the simple assumption that there is only one concept (SchemaExpression) to be described in each and every XML Element (and all other concepts in the XML Element are basically some description (MetadataExpression) of that SchemaExpression.

In case of a relational database this can be described as following: all primaryKey Identifier columns of a given table are represented as a node categorized as SchemaExpression (and there can only be only one of them per table row) and all other fields are child nodes of that node and categorized as MetaDataExpression. In both examples the informatics system first establishes a hierarchy between nodes, and then maps them to some ConceptExpression. The Concept Expressions have their own extensions. That is, both SchemaExpression and MetaDataExpression can be further specialized and further described by more specific definitions. For example, in an XML element <Data Patient="1023" Age="55" Race="White"/>The Patient Node is the SchemaExpression, and all other nodes are MetadataExpressions. This ontology enables binding any given node to a meaning, use case, or combine it with other nodes to compose a new meaning based on data from different aspects of multiple nodes.

Figure 53:
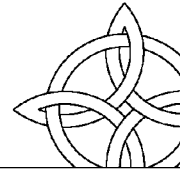
FIG. 53 depicts one embodiment of a portion of a core schema ontology.

For example, a global patient identifier can be constructed automatically for all patients by combining the data from a Patient ID node with the data from Hospital ID node. This constructs a new identifier concept for each patient that is unique in the context of multiple hospitals, therefore eliminating the possibility of two different patients with similar IDs from two different hospitals being mistaken with each other. FIG. 53 depicts one embodiment of a snapshot of core Schema ontology and its extensions that may be used to instantiate XML nodes and Concept Expressions.

Figure 54:
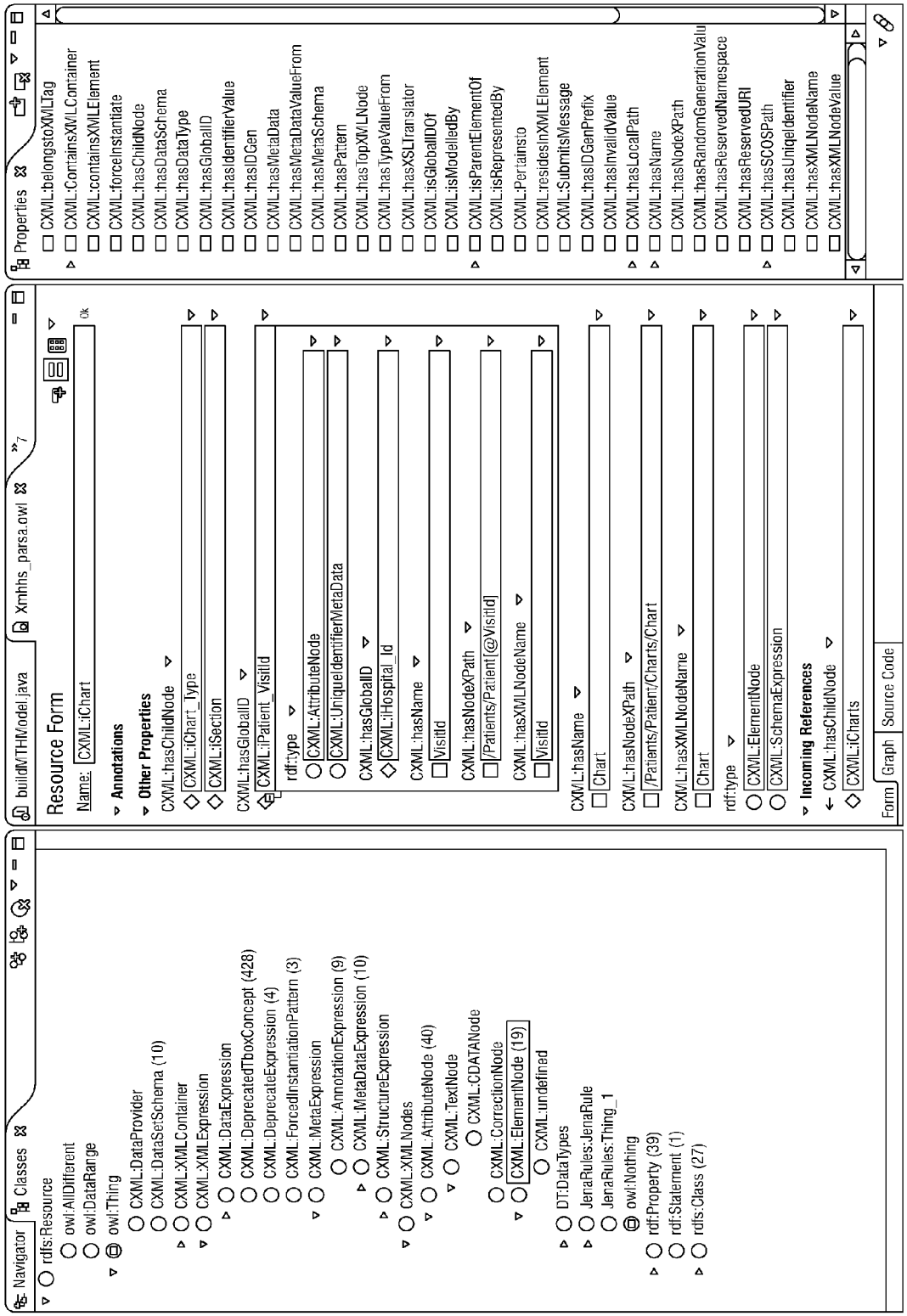
FIG. 54 depicts one embodiment of an example source specific population of an XML model.

Moving to the actual algorithm, first at step 4710 an schema parser algorithm may use the core Schema ontology (CXM) to parse received structured data from a data source to create a source specific schema model (XMODEL) corresponding to the data source from which the structured data was received. The CXM ontology may be used to parse any incoming structured data to extract its schema and map to a source specific XMODEL ontology. One may think of the XMODEL ontology as a model whose TBOX is CXM, and is populated by the Schema information extractable from the received structured data. It does not contain the actual data from the structured data, only the information model corresponding to the received structured data. FIG. 54 depicts one embodiment of a source specific population of the XMODEL Ontology. Here, a Chart XML node is instantiated and mapped to its XML Expressions (it is modeled as an XML Attribute node and it expresses a UniqueIdentifierMetadata for another node in the same element.

The XMODEL may then be utilized by an Structured Data to RDF mapping algorithm to create a graph representation of the received structured data at step 4720. This graph representation may be an RDF representation of the structured data based on the descriptions in the XMODEL and contains the actual instances of the data contained in the structured data. In one embodiment once the schema of structured data is known by XMODEL ontology, the incoming structured data may be consumed and turned into an Isomorphic RDF graph whose nodes are mapped to the nodes of the XMODEL ontology (another RDF graph) that formally describes the information model of the structured data. This mapping creates a unified graph that may be used by future steps to associate any given data node with its description in the XMODEL ontology and make inferences about them. This graph may be isomorphic as its schema is morphologically similar or identical to the original schema of the structured data, that is it preserves the same kind of hierarchical relations within the RDF nodes (using the hasXmlChildNode property as observed in the structured data).

This graph representation may be used by a TBOX modeler algorithm to create a TBOX integrative model at step 4730. This TBOX integrative model may be a graph representation of all concepts that may be contained in the data received from the data source and may be mapped to a core data model ontology (CDM) that is a high level ontology to create concepts that other TBOX concepts can be derived or extended from. The CDM plays the role of a upper ontology for all ontologies generated by this algorithm and enables future integration of all ontologies (TBOX) constructed by this algorithm into a unified model.

In one embodiment, the unified graph resulting from step 4720 is navigated and a new class for every single SchemaExpression and MetadataExpression in the unified graph is created inside the TBOX if it does not already exist. A corresponding property for each concept can also be created if it does not exist. Most properties are extensions of SKOS: broader and skos:narrower property to convey hierarchical relations extractable from structured data. The hierarchical information from the Isomorphic RDF graph or structured data is lost in this model and a substantially flat list of concept are generated in the model. The hierarchical information are extracted into a complementary model called S-Model (stands for SKOS model) that is designed to persist the hierarchical information in a model, without incorporating it for inferencing or querying inside the model.

Figure 55:
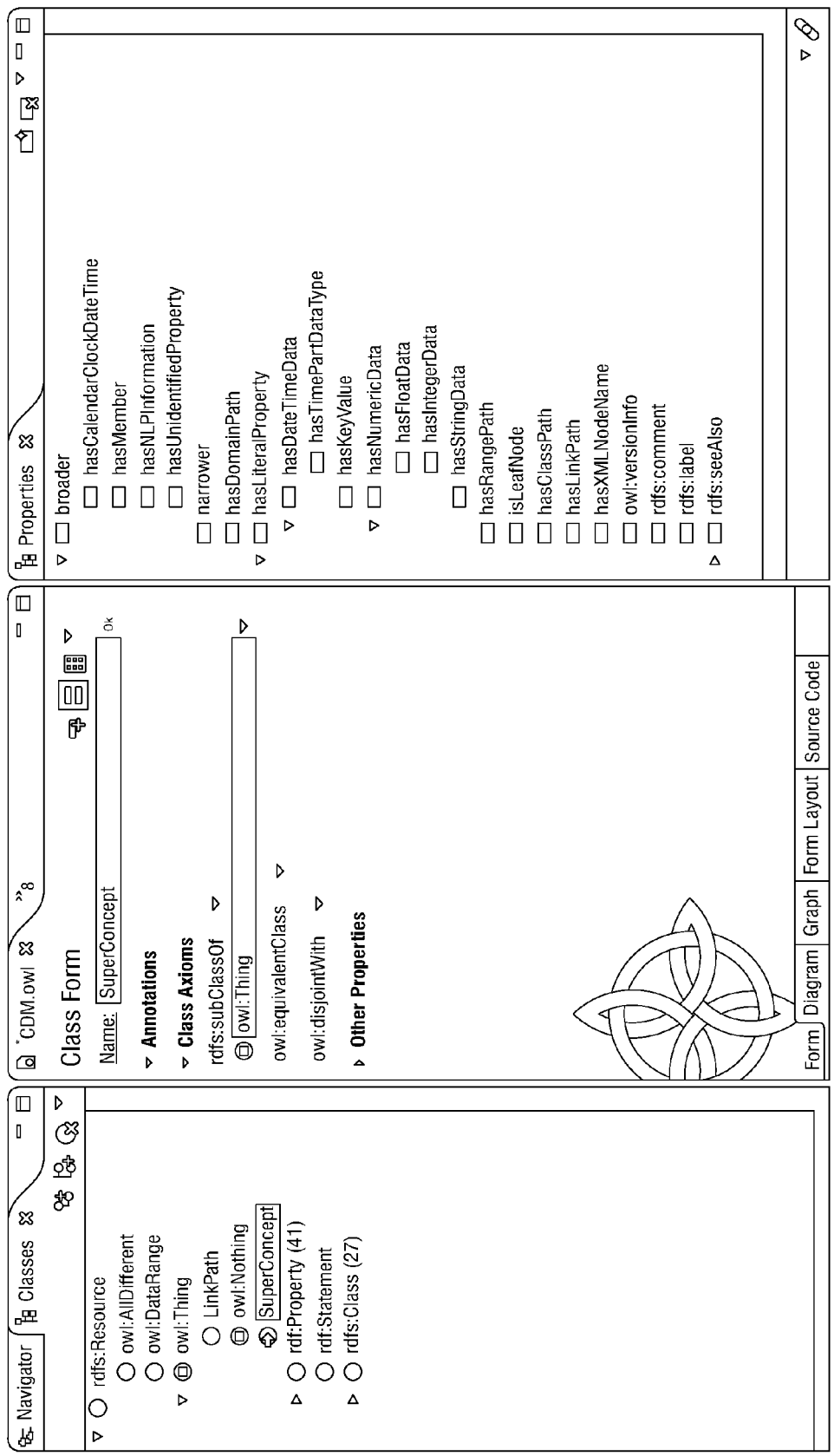
FIG. 55 depicts one embodiment of an ontology that is used to extend the TBOX.

FIG. 55 depicts one embodiment of a high level ontology that is used to extend the TBOX (the upper ontology). This may be a rather small ontology that grows bigger and bigger as new concepts are being discovered and added to this ontology.

Figure 56:
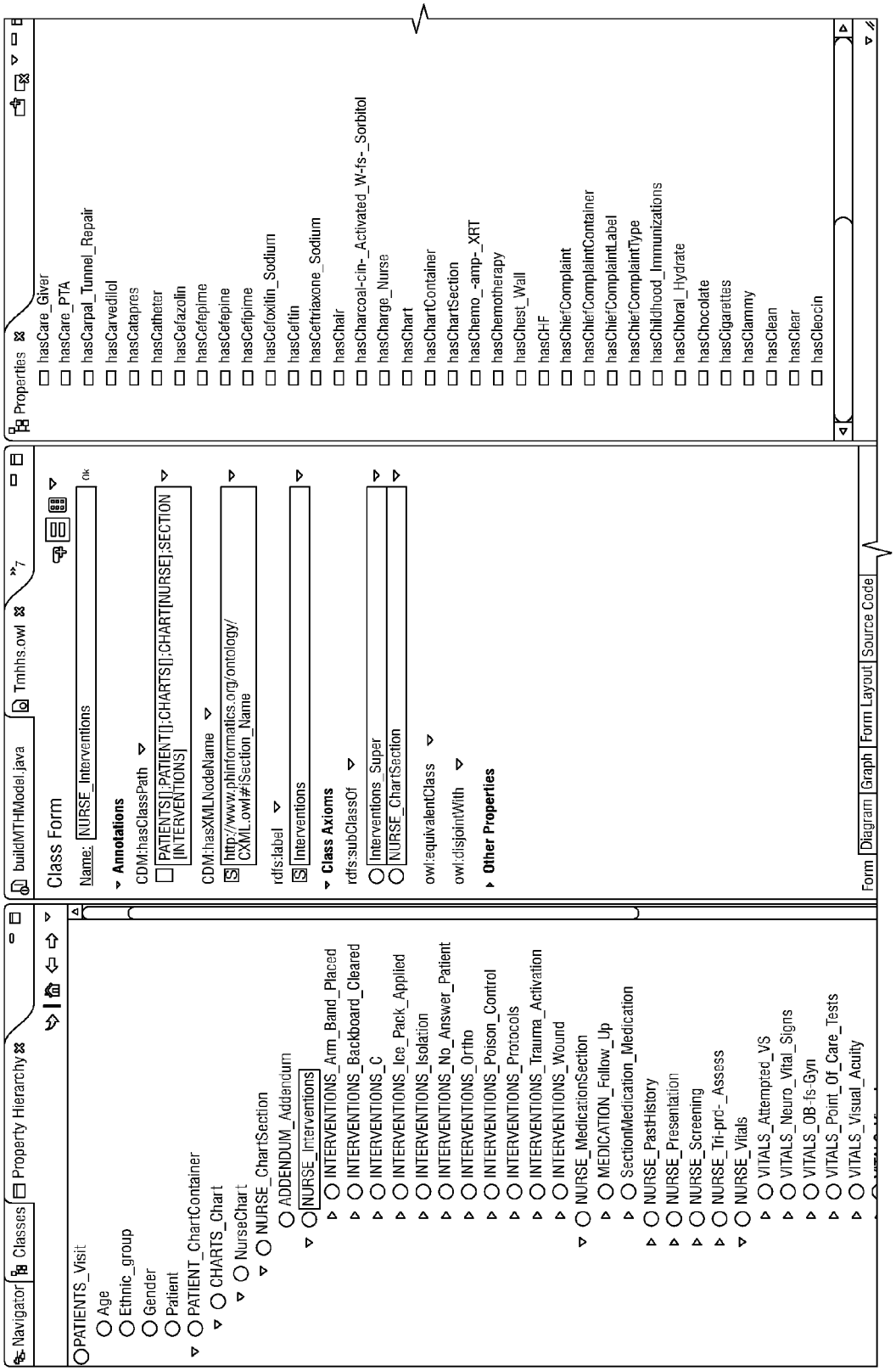
FIG. 56 depicts a snapshot of a one embodiment of a TBOX extracted from a graph.

FIG. 56 depicts a snapshot of a one embodiment of a TBOX extracted from an isomorphic RDF graph. It may be noted that, in one embodiment, the hierarchical representation in the left pane of FIG. 56 may be constructed using the information from S-Model and illustrates the hierarchical relationships between concepts according to the source data. Such hierarchical information may not be incorporated into the TBOX directly, since it cannot be guaranteed that all hierarchies are of type 'inheritance' (non-formal hierarchies). That is, one cannot guarantee that because the data is organized into a hierarchy in a source dataset, it means that child nodes always inherit properties of the parent node. In order to avoid mischaracterization of data during inference and querying, the algorithm separates information about hierarchic relations between concept in the TBOX and persists them in separate module, and as a non-formal hierarchy (using extensions of skos:broader or skos:narrower) which does imply a hierarchy (super-concept and sub-concept), but does not imply inheritance (e.g., rdfs:subClassOf). Similarly hierarchy information can be extracted by parsing the values of the hasClassPath property for each concept in the TBOX that is added by the Tbox modeler algorithm to each and every concept to annotate the hierarchical location of any given concept as extractable from the original data but for human use.

An ABOX population algorithm may utilize the TBOX model and the graph representation of the structured data received from the data source to construct a graph representation of the actual data (ABOX) received from the data source at step 4740, where the graph representation of the actual data (ABOX) received from the data source is mapped to the TBOX model. Such an algorithm may import the updated TBOX produced by step 4730 and populates it with information extracted from the unified graph produced by step 4720 (for example, isomorphic RDF graph). The ABOX joins the hierarchical relations between the nodes of the received structured data together, for example, using the properties that may be extensions of skos:broader or skos: narrower.

Figure 57:
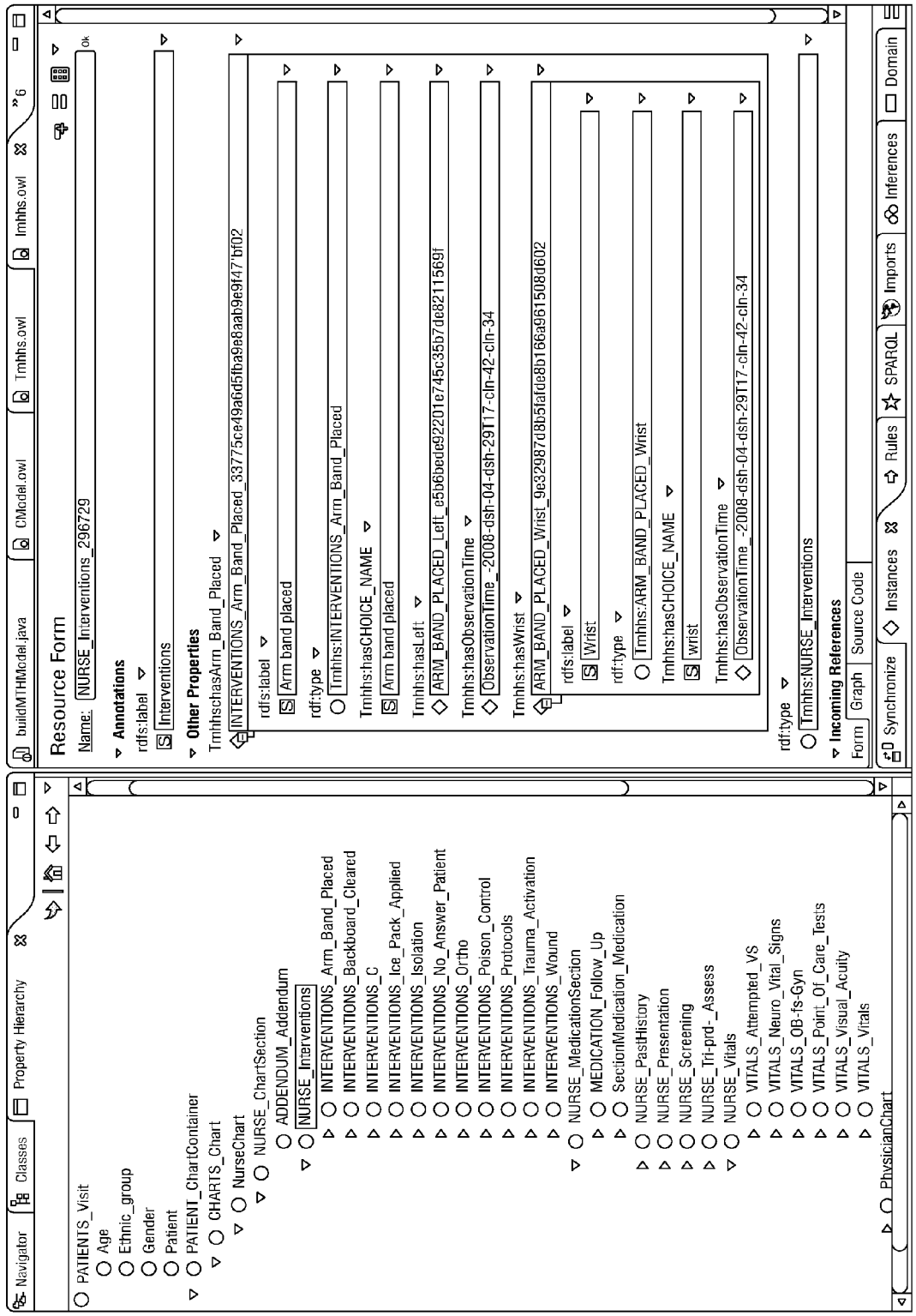
FIG. 57 depicts one embodiment of an portion of an ABOX.

FIG. 57 depicts one embodiment of an portion of an ABOX. A node (right panel) is related to all other nodes extracted from the isomorphic graph and mapped to the TBOX (left panel). FIG. 58 depicts one embodiment of a snapshot of an XML message that can be converted to a TBOX representation and an ABOX created using the structured data to ontology method as described above. As is apparent, most nodes without specific meanings are completely filtered out and the remaining model is remarkably richer and more formal in the ontology generated from this model, without information loss.

Figures 48, 48A, 48B:
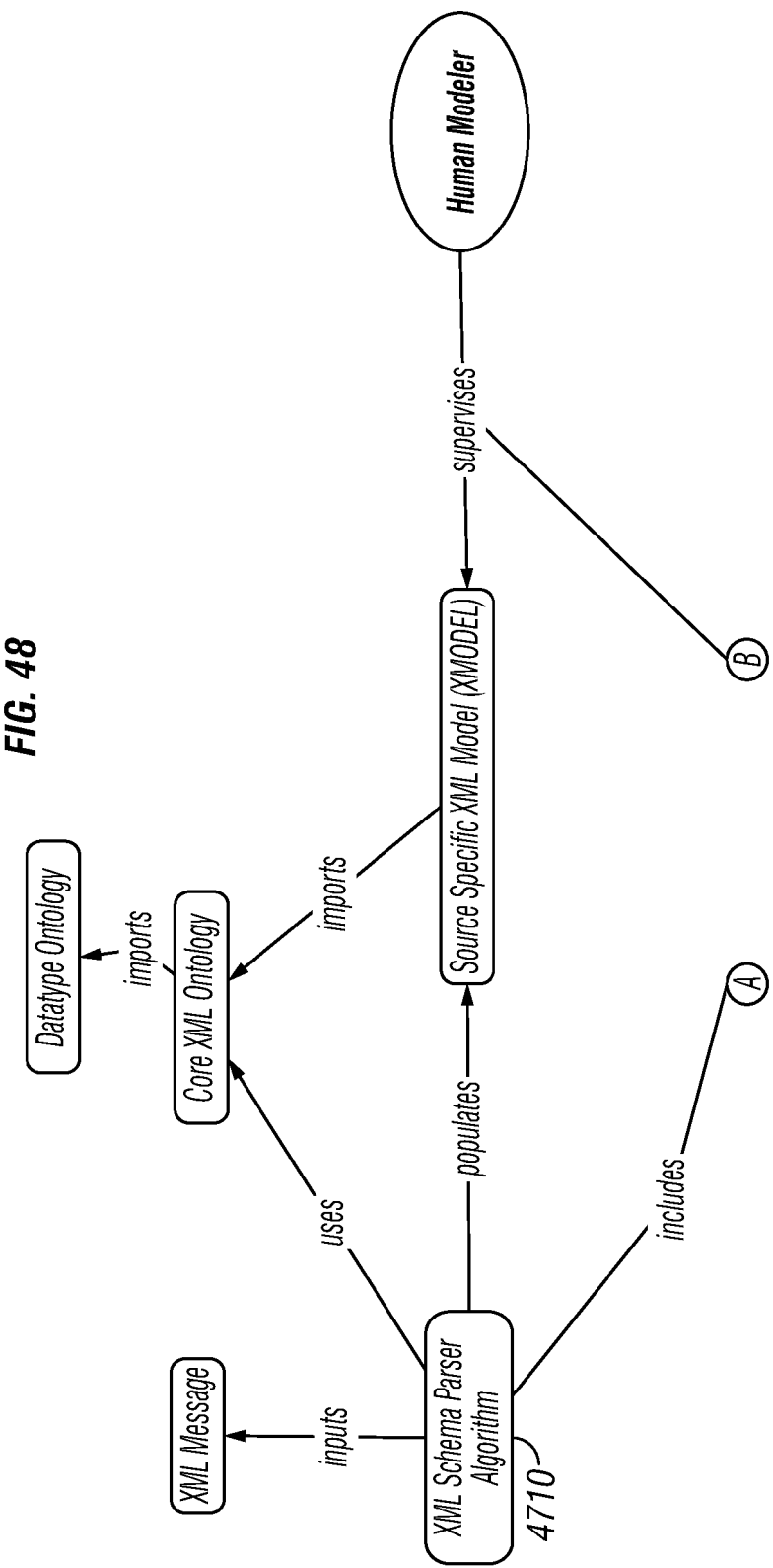
FIG. 48 depicts one embodiment of a method for an XML schema parser.
Figure 48B:
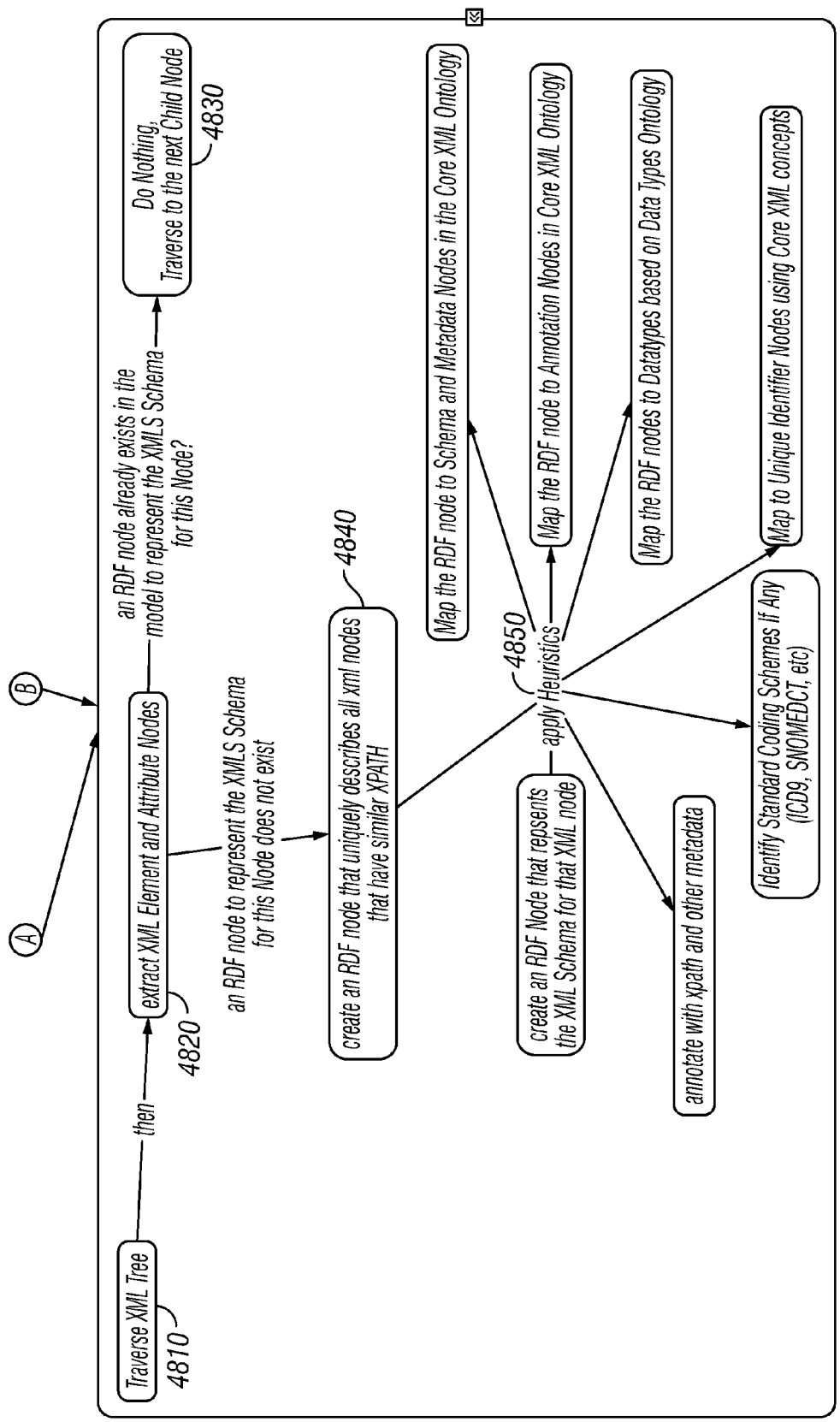

It may be useful here to go into more detail with respect to each of the algorithms depicted in FIG. 47. Moving then to FIG. 48, one embodiment of a method for an schema parser is depicted. This schema parser takes as input an structured data set from a data source and uses the core Schema ontology to populate a source specific model (XMODEL). The schema parser may traverse the schema of the received structured data at step 4810. The nodes containing some data within structured data may be extracted at step 4820. For each of the nodes it can then be determined if a node (for example, represented in RDF) already exists in the source specific XMODEL to represent the Schema information for the node. If such a node exists, at step 4830 no action is taken and the next child node is evaluated. However, if no such node exists, at step 4840 a node in the source specific model may be created (for example, an RDF node) that uniquely describes any node in the structured data that may have a similar position (Path) to the node in question.

The creation of such an RDF node may entail the application of a set of heuristics at step 4850, where the application of the set of heuristics may comprise mapping the RDF node to SchemaExpression and MetadataExpression nodes in the core Schema ontology, mapping the RDF node to annotation nodes in the core Schema ontology, mapping the RDF node to data types based on the data type ontology, mapping the node to unique identifier nodes using the concepts of the core Schema ontology, the identification of standard coding schemes (for example, ICD9, SNOMEDCT, etc.), the annotation of the node with Path and other metadata and, if the structured data is formatted as an XML document, the creation of the RDF node that represents the XML schema for that XML node.

Figure 49:
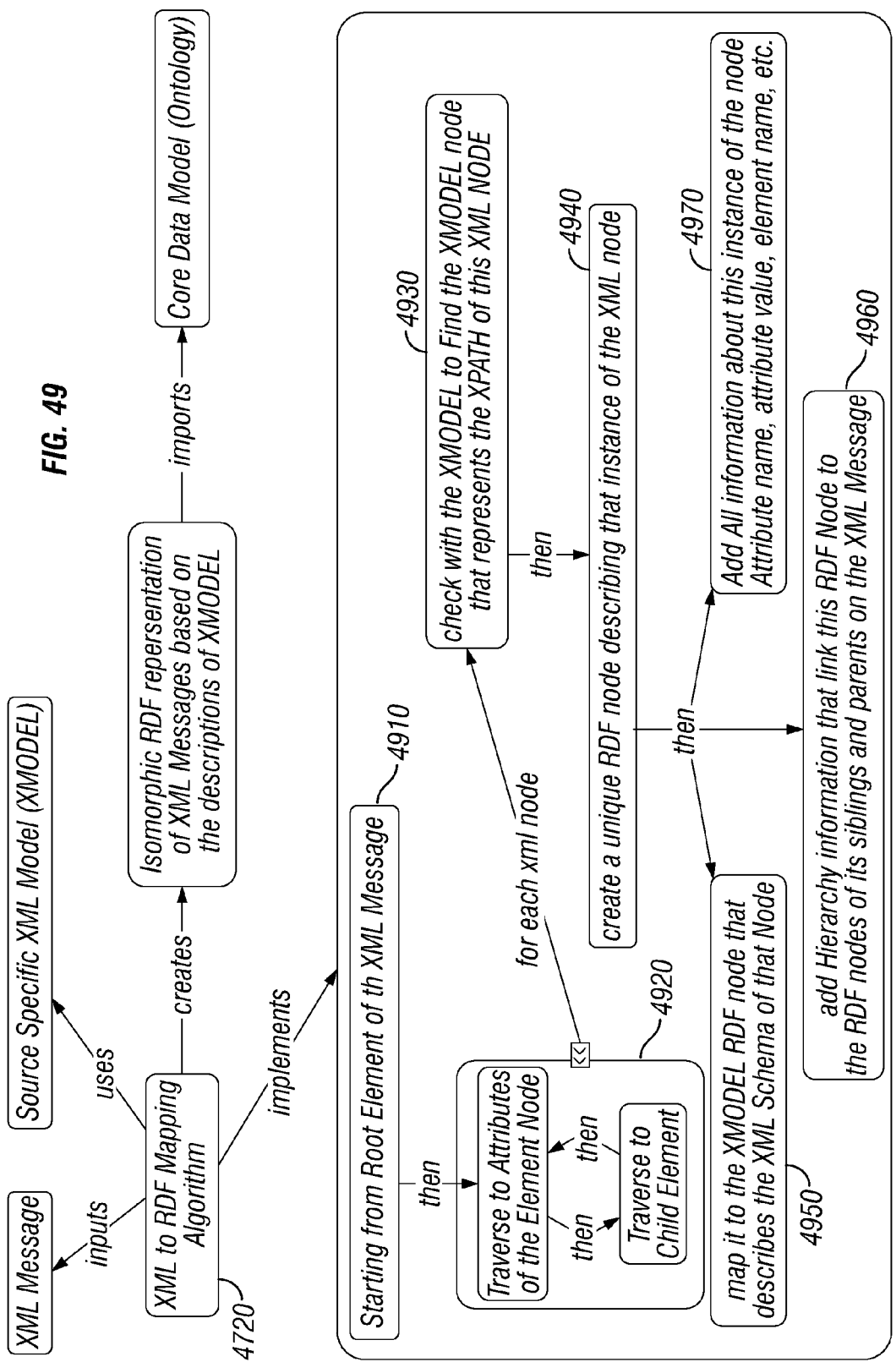
FIG. 49 depicts one embodiment of a method for an XML to RDF mapping.

In FIG. 49, one embodiment of a method for an structured data to RDF mapping is depicted. Embodiments of this method may be used to create an isomorphic RDF representation of structured data based on the XMODEL created using above method. Beginning with the top most data element of the received structured data at step 4910, structured data can be traversed at step 4920, where the traversal of a node may comprise traversing to each of the child nodes of that node. For each node in the received structured data, then, at step 4930 the node in the XMODEL that represents the PATH (position) of that node may be located. A unique RDF node to describe that specific node can then be created at step 4940.

This newly created RDF node can be mapped to the XMODEL RDF node that describes the schema of the node at step 4950. At step 4960, hierarchy information that links the RDF node to the RDF nodes representing that node's siblings and patens in the structured data may be added to the node along with other information about this node, including for example, attribute or column name, attribute or column value, element name (if the structured data is an XML document), etc. at step 4970.

Figure 50B:
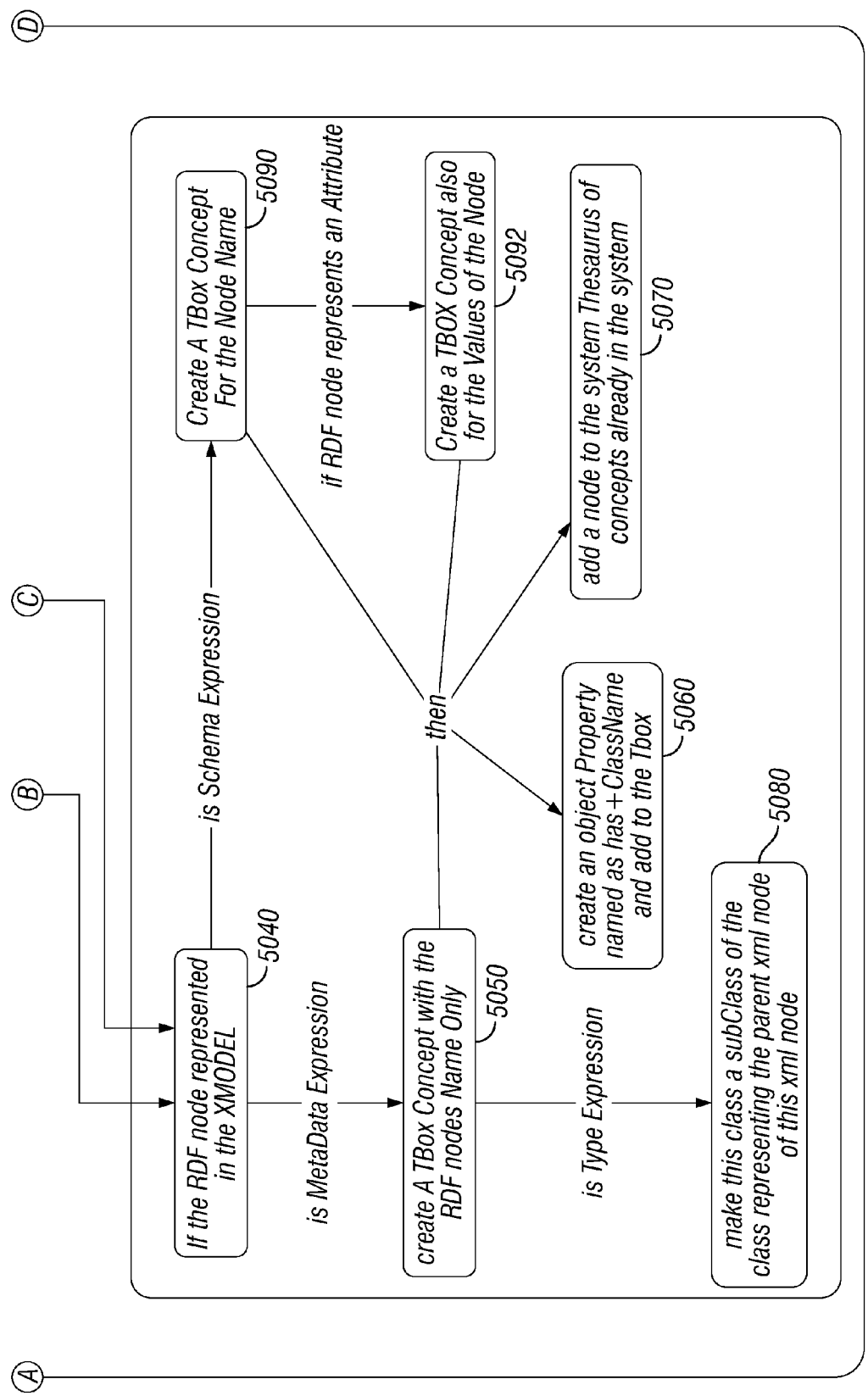
FIG. 50 depicts one embodiment of a method for creating an ontology for a data source.

Moving on to FIG. 50, one embodiment of a method for creating an ontology for the data source is depicted. This ontology may be a formal model of the structure and type of data found in the data source (according to the received structured data) and may be referred to as a TBOX or TBOX model of the data source. This TBOX model may be created by a TBOX modeler algorithm using the RDF representation of the structured data. Beginning with the node of the RDF from the XMODEL that represents the topmost node of the structured data at step 5010, the RDF nodes representing the attributes of the root element may be traversed at step 5020, where the traversal of a node may comprise traversing to each of the RDF elements representing the child elements of that node.

For each of the RDF nodes of an attribute (including the RDF nodes associated with the child elements), it can be determined at step 5030 if a node with the same name already exists, where the node may be a class in the TBOX model. If a node already exists in a system thesaurus, and has the same PATH (position) or schema as described in the XMODEL, the next RDF node associated with a child element (or if the attribute has no more child nodes, the next attribute node) may be obtained.

However, if a corresponding class does not exists, it can be determined at step 5040 if the RDF node is represented in the XMODEL is a Schema Expression or a Metadata Expression. If the RDF node in the XMODEL is a metadata expression a TBOX concept with the RDF nodes name may be created at step 5050. In an embodiment of the system an object property named "has"+"ClassName" may be created and added to the TBOX. In another embodiment of the system an object property named "has"+"Parent node ClassName" may be created and added to the TBOX. Then a node may be added to the system thesaurus that comprises concepts already represented at steps 5060 and 5070. Furthermore, if the RDF node is a Type expression, the TBOX concept with the RDF node name may be made a subclass of the class representing the parent node of the node corresponding to the RDF node for which the TBOX concept was created at step 5080.

Returning to step 5040 if the RDF node is a schema expression, a TBOX concept corresponding to the node name may be created at step 5090. Additionally, an object property named "has"+"ClassName" or "has"+"Parent node ClassName" may be created and added to the TBOX, and a node may be added to the system thesaurus that comprises concepts already represented at steps 5060 and 5070. Furthermore, if the RDF node represents an attribute one or more TBOX concepts may be created for the values of the node at step 5092.

Additionally if any RDF node describing the node in XMODEL is mapped to a ConceptIdentifier class in the data type ontology a new class will be added to the TBOX for each data value of the node in the structured data, and system thesaurus will be updated. For example in an XML document as <Data PatientID="12345" Age="20" Race="Black"/>4 concepts (PatientID, Age, Race, Black) may be added to the TBOX if the Race node is modeled as MetaDataExpression and ConceptIdentifier at the same time).

In one embodiment of the system, the values of ConceptIdentifier nodes can be forced to be instantiated as individuals instead of concepts in TBOX ontology through some heuristics (for example for all Standards Based concepts) or through configuration by a human modeler. For example in an XML document as <Data PatientID="12345" Age="20" Race="Black"/>3 concepts (PatientID, Age, Race) may be added to the TBOX if the Race node is modeled as MetaDataExpression and ConceptIdentifier at the same time and further mapped to the ForcedInstantiation concept by a modeler). An additional node representing 'Black' will be instantiated as an individual of type 'Race' concept.

Returning to step 5030, if a node already exists in the system thesaurus, but has a different PATH or position in the XMODEL, a class named "Super"+"ClassName" may be created if it does not already exist at step 5032, and the new class can be made a subClassOf this newly created superClass at step 5034. Following this the set of steps beginning with step 5040 may be performed as described above.

Once the source ontology is created, this source ontology may be used to construct a graph representation of the actual data in the received structured data based on the source ontology. This process may be referred to as populating the ABOX (graph representation of the actual data) based on the TBOX (source ontology). Thus, a graph is formed representing the structured data, where the graph is unified with the source ontology describing the structured data from which the data was received.

Figure 51B:
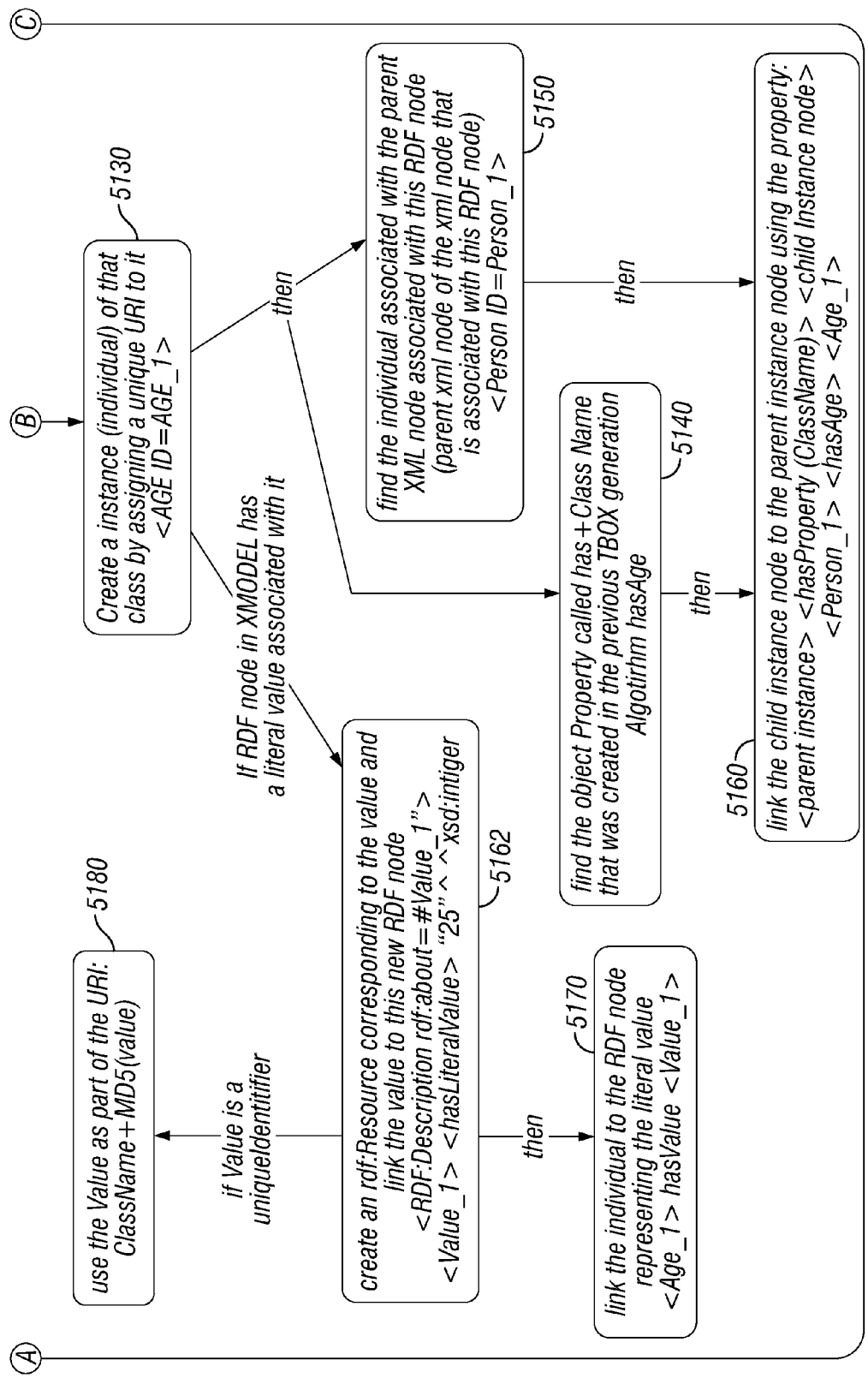
FIG. 51 depicts one embodiment of a method for representing data according to a source ontology.

In FIG. 51, one embodiment of a method for populating the ABOX with data corresponding to the XML message using the TBOX model is depicted. Beginning with the node of the RDF from the XMODEL that represents the root of the XML message at step 5110, the RDF nodes representing the attributes of the root element may be traversed, where the traversal of a node may comprise traversing to each of the RDF elements representing the child elements of that node.

For each of the RDF nodes of an attribute (including the RDF nodes associated with the child elements), the TBOX concept (class) representing that node (as created above) may be found at step 5120. An example of that class may be <owl:Class: ID=#Age>. Once the class is found an individual instance of that class may be created and assigned a unique URI at step 5130 (for example, <AGE ID=AGE 1>. Next, at step 5140 the object Property that has the name "has"+ "Class" in the TBOX will be obtained. (for example, hasAge). At step 5150 the individual data element associated with the parent node of the RDF node being processed (for example, the parent node of the node that is associated with the RDF node being processed, for example, <Person ID=Person__1>) may be found. The child instance node can be linked to the parent instance node through insertion of the following statement in the ABOX:
<parent instance> <hasProperty (has+ClassName)> <child Instance node>. for example <Person__1> <hasAge> <Age__1>
<Person__1> <rdf:type> <Person>
<Age__1> <rdf:type> <Age> at step 5160.

Returning to step 5130 if the RDF node in the XMODEL has a literal value associated with it (for example <Data Age="20"/>), an rdf:Resource corresponding to the value can be created and linked to the newly created RDF node (for example, <RDF:Description rdf:about=#Value__1"> <Value__1> <hasLiteralValue> "25"^^xsd:integer) at step 5162. The individual data element may be linked to the RDF node representing the literal value (for example, <Age__1> <hasValue> <Value__1> at step 5170. Additionally, if the value is a uniqueIdentifier the value can be used as part of the URI for the newly created node (for example, ClassNAme+MD5(value) at step 5180.

As discussed herein, embodiments of the informatics system presented may utilize a domain ontology. In one embodiment, the domain ontology may be UMLS-SKOS, an OWL ontology that partially but consistently adopts the UMLS-SN for the Semantic Web applications. The UMLS-SKOS domain ontology maps each UMLS Semantic Type into a corresponding owl:Class and each UMLS Semantic Relationship into an owl:ObjectProperty. Concepts and Properties in this model have rdfs:subClassOf and rdfs:subPropertyOf relationships when there is an 'isa' relationship in the UMLS-KS. In the UMLS-SKOS domain ontology, each UMLS-MTH concept represents a resource with a unique resource identifier (URI) constructed using a NameSpace:CUI schema, where NameSpace can represent any unique URL such as 'umls=http://nih.nlm.gov/umls/'. All UMLS-MTH concepts are conceptualized to be instances of (rdf:type) the concept representing its associated Semantic Type. The semantics of each UMLS-SKOS resource (each UMLS-MTH concept) is defined by its source and through variety of means: by a textual definition or annotation; by its Semantic Type and its place in the hierarchy; by source defined relationships between concepts, or by terminological relationships between terms (hyponymy, hypernymy, synonymy, etc.) defined by the UMLS-MTH. There are major groupings of Semantic Types incorporated in the UMLS-SN and therefore in the UMLS-SKOS for organisms, anatomical structures, biologic functions, chemicals, events, physical objects, and concepts or ideas.

Figure 36:
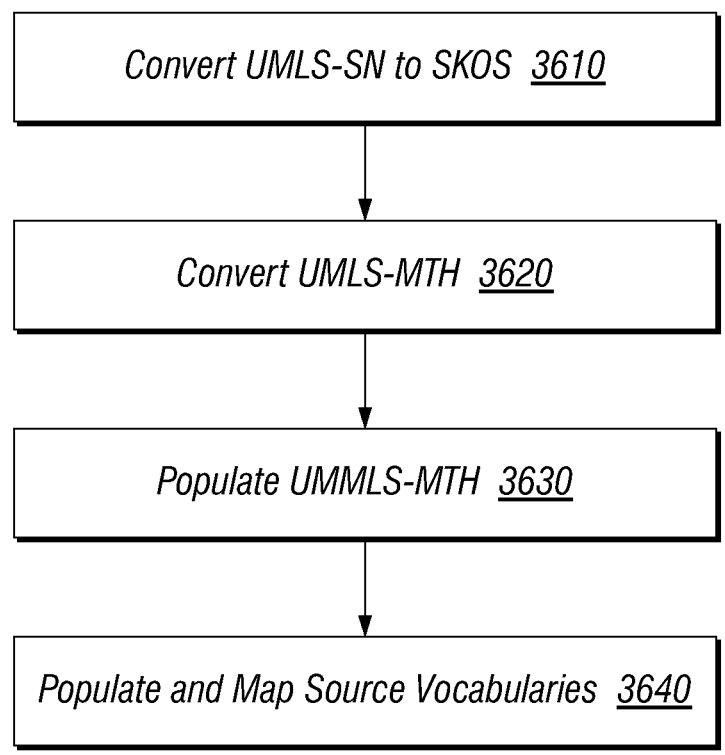
FIG. 36 depicts one embodiment of a method for constructing an ontology for UMLS.

One embodiment of a method for the construction of such a UMLS-SKOS domain ontology from UMLS is depicted in FIG. 36. At step 3610 the UMLS-Semantic Network (UMLS-SN) is converted to a Simple Knowledge Organization System (SKOS) representation. The UMLS-Metathesarus (MTH) model is then converted to SKOS at step 3620. This allows unification of any formal graph within the informatics system with the knowledge from UMLS that can in turn augment mining, interpretation and integration of multi-source information. The metathesarus portion of the ontology is populated with CUIs at step 3630. The source vocabularies of the UMLS ontology being created are then populated and mapped to the metathesarus model at step 3640. This method may be utilized for example, to construct a UMLS-SKOS domain ontology and provide this UMLS-SKOS domain ontology to an informatics system for use as a domain ontology as discussed above.

To construct the UMLS-SKOS domain ontology at step 3610 the UMLS-SN is first converted to SKOS representations. SKOS and SKOS-XL are first obtained for use. Next, the semantic types are set in the ontology by creating a single ontology concept (for example, owl:Class in the Semantic Web framework for knowledge representation) for each Semantic Type in UMLS. Semantic types (STY) may be created by querying the Semantic Network (SN) and adding a single class per each semantic type retrieved. These STY may be defined by adding all properties of each ontology class created based on the UMLS Semantic Network These classes can then be formed into SKOS by further defining every ontology class as a SKOS:Concept. Relationships are then created by querying the UMLS Semantic Network for all semantic relations and creating one property in the ontology for each semantic relation retrieved. These relationships are defined by adding a single ObjectProperty for each semantic relation in the UMLS Semantic Network. These relationships (REL) are then mapped to SKOS by making the Semantic Network properties subProperties of an appropriate SKOS:Relation.

Hierarchies can then be set in the UMLS SKOS ontology. UMLS Semantic Types and UMLS Semantic Relations have defined hierarchies. This hierarchic information can be retrieved from UMLS and added into the UMLS-SKOS ontology being created. An STY Hierarchy can then be created in the ontology by retrieving hierarchic information from UMLS and adding them into the UMLS-SKOS classes (for example, semantic types) created earlier. A REL hierarchy is built by retrieving hierarchic information from UMLS and adding them into the UMLS-SKOS properties (for example, properties).

Semantic relations are then set in the ontology. UMLS Semantic Types have defined relationships through the UMLS semantic relations. Those relations between classes (for example, semantic types) can be retrieved from UMLS and added into the UMLS-SKOS ontology being created. Thus, a triple whose subject and object are semantic types that are related through a semantic relation (STY REL STY) can be created.

Figure 37:
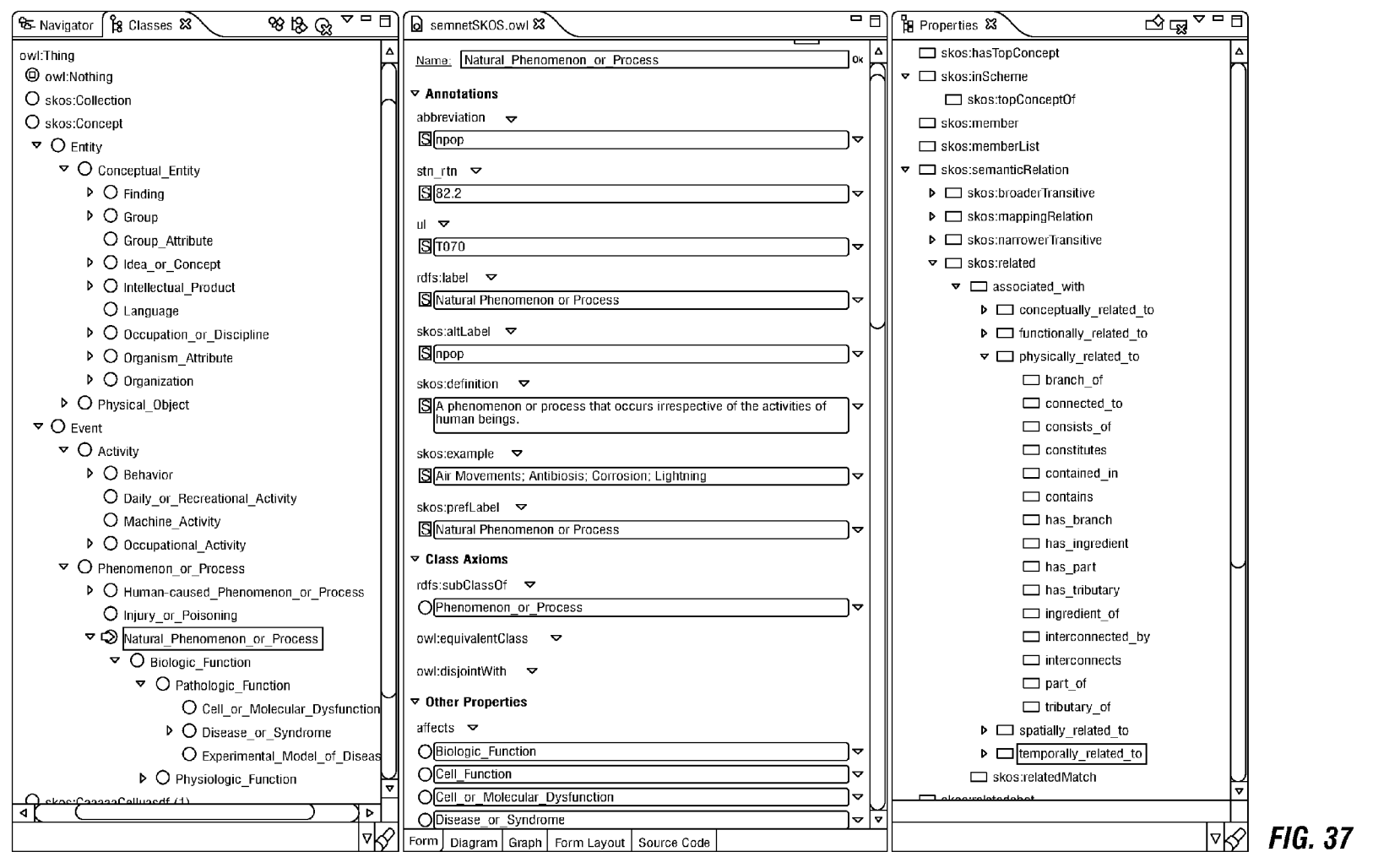

FIG. 37 depicts a representation of one embodiment of Semantic Types converted to an ontology with their hierarchies preserved (left panel of the depicted interface). All concepts are fully defined by properties and relations extracted from UMLS (middle panel of the depicted interface). All semantic properties are extracted and mapped to an object property, along with their mappings to SKOS properties, and subProperty hierarchy.

The UMLS-Metathesarus (MTH) is then created in the ontology at step 3620. UMLS-SN may be accessed and the UMLS version set by obtaining from UMLS the current version of the UMLS being converted. This information may be added to every (or some subset) concept extracted to mark the date and the version of the converted Metathesaurus.

The ConceptScheme is set by obtaining from the current version of the UMLS all source vocabularies (SAB) incorporated, and their current version. These can then be mapped as skos:ConceptScheme concepts to the ontology being created. For each concept schema all root concepts that may be used to navigate the vocabulary can be found, and added to the ontology being created as the skos:topConcept.

Figure 38:
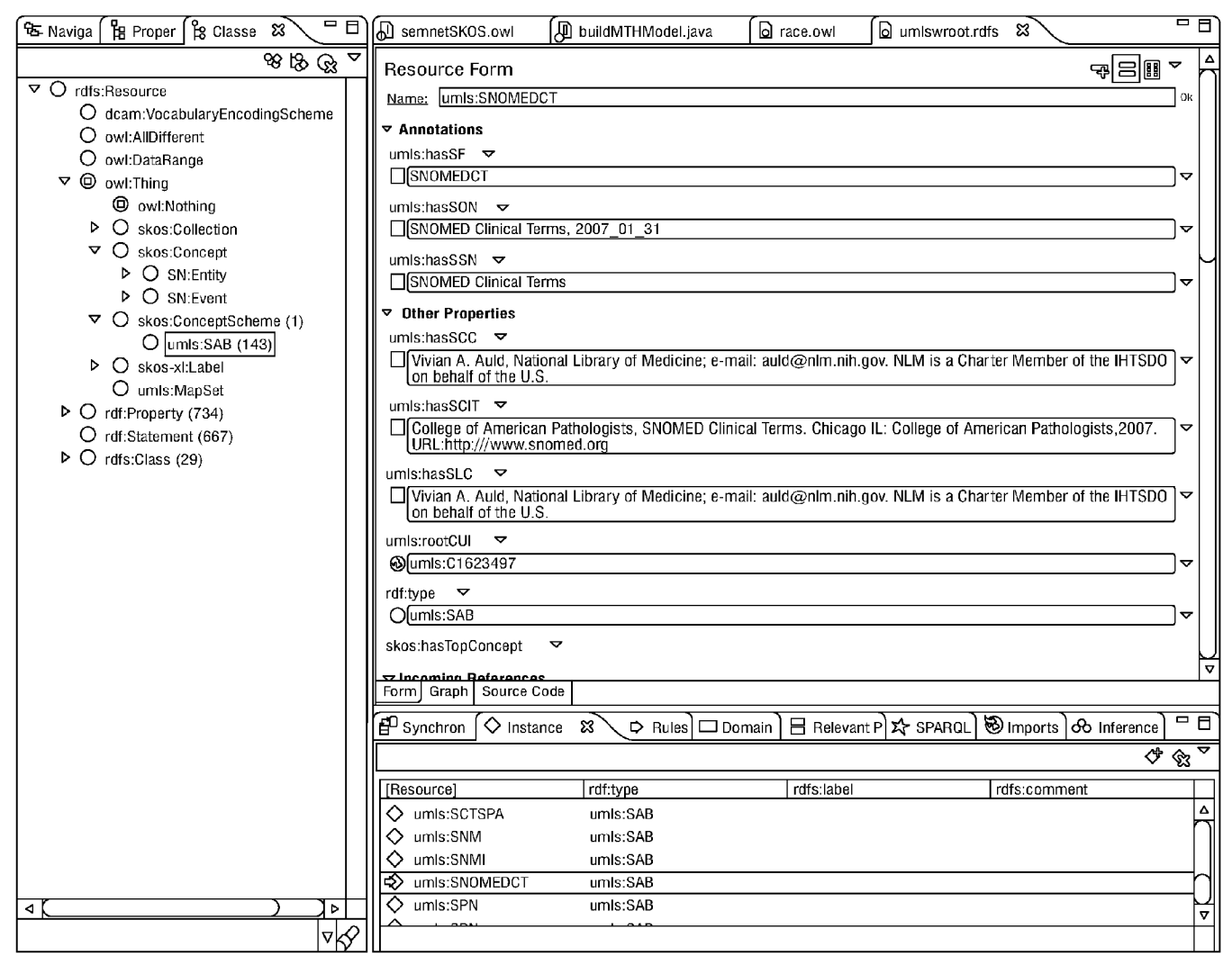

The SAB of the ontology may then be populated by querying the UMLS for all SAB and their metadata, including version and populating the SAB of the ontology based on the response. The root concept of each SAB can be set by querying for the topmost (root) concept from UMLS for each SAB and linked to the SAB using umls:rootCUI. The SABs can then be mapped to SKOS by adding each SAB as an instance of skos:ConceptScheme to the UMLS-SKOS ontology being created. Metadata can then be added and the TopConcept link added as retrieved. FIG. 38 depicts one embodiment of an example SAB class (subclass of skos:ConceptScheme), and its instances and source vocabularies incorporated in the UMLS. In this example SNOMEDCT is shown with its metadata and rootCUI showing its top most concept.

The UMLS-MTH Relations can then be set in the ontology by querying UMLS to obtain all distinct relations (REL, and RELA) and create their subProperty relationships according to the UMLS. These may be added to the ontology as owl:ObjectProperty. The labels (STR, AUI, SUI) in the ontology being constructed may then be set by creating owl:Classes and properties to represent STR, AUI and SUI according to their definition in UMLS. The TermTypes (TTY) for the ontology being created are similarly set by querying the UMLS for all TermTypes from mrDOC and add them as owl:AnnotationProperty to the ontology. TermTypes are used for linking STR to CUI as extractable from mrConso table. These types can then be mapped to SKOS. More specifically, for each UMLS TermType find a corresponding skos:Label that best presents that label type. This may entail a mapping process comparing the definition of the term types in UMLS and finding the best match in SKOS.

Figure 39:
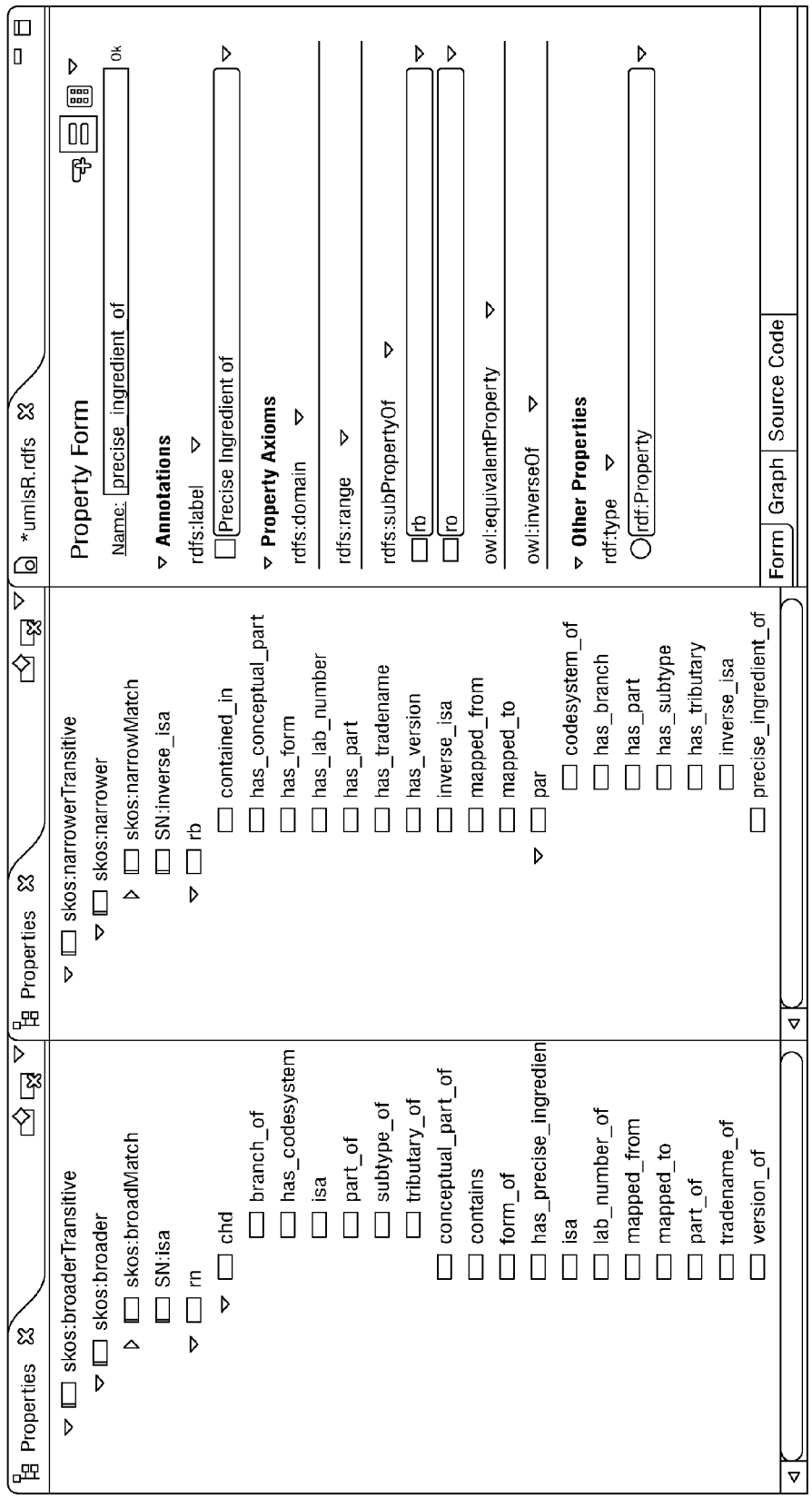
FIG. 39 depicts one embodiment of properties.

Relation hierarchies are then set in the ontology by, for each UMLS relation, finding a corresponding super property and adding that as owl:subPropertyOf. This may entail a mapping process comparing the definition of the term types in UMLS and finding the best match. Symmetric relations are then set. If a property has an inverse relation with itself, that property is made symmetric. This is done by querying the mrDoc and mrRel tables for evidence of properties being in symmetric relations with each other through the same property. FIG. 39 depicts one embodiment of example properties extracted from UMLS Metathesarus and presented with their full hierarchic relations and mappings to SKOS.

Figure 40:
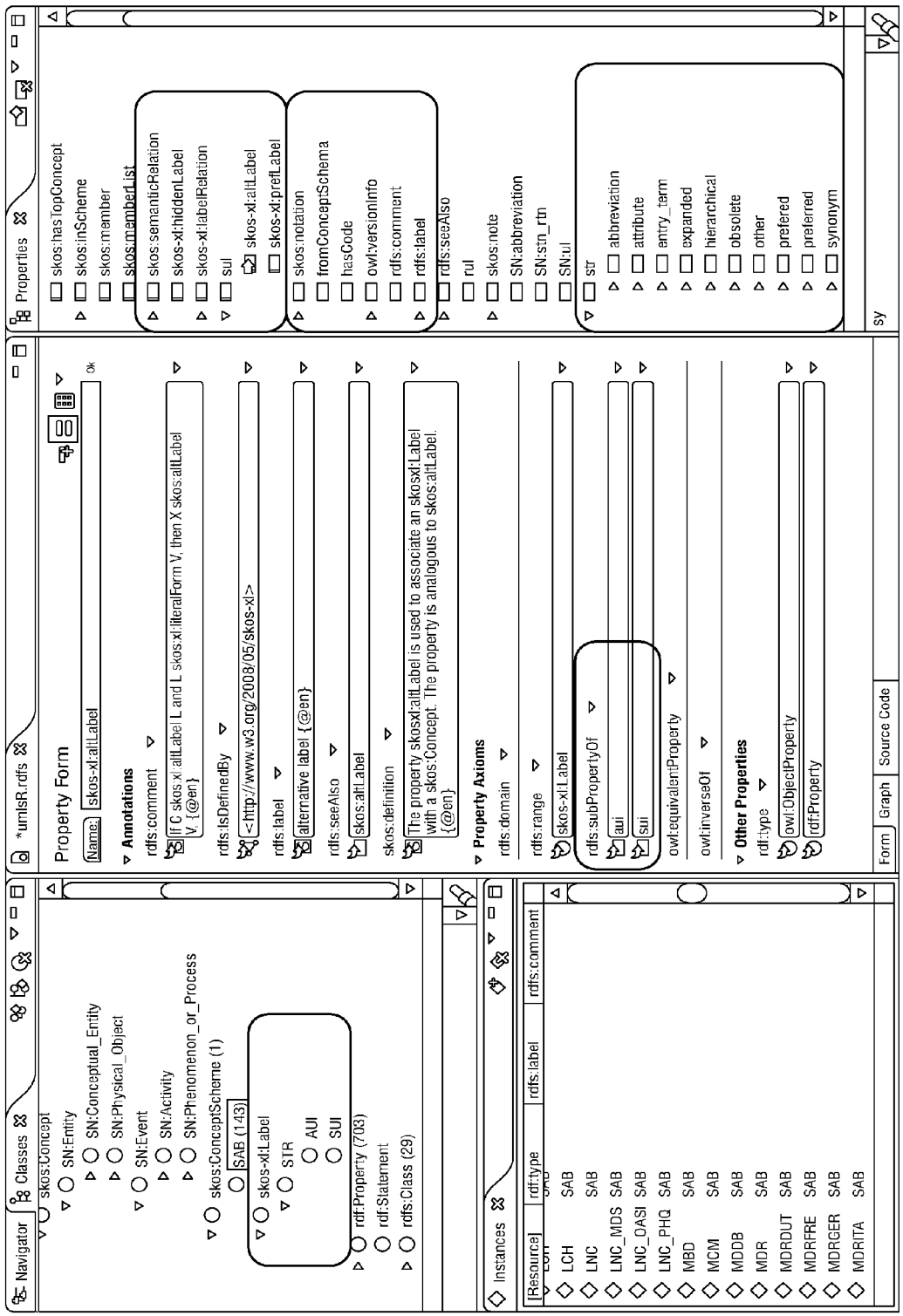
FIG. 40 depicts on embodiment of classes representing labels and terms in UMLS-SKOS ontology.

The attribute model of the ontology being created can then be set. This may be accomplished by querying the attributes table in UMLS to create one single annotation property for each distinct attribute type in UMLS and adding that distinct attribute type as subproperty of umls:attribute property. FIG. 40 depicts one embodiment of STR, AUI, SUI classes (left pane), and corresponding properties (middle and right pane). The Termtypes (subProperties of STR) and other relations are also demonstrated.

At step 3630 the Metathesarus portion of the ontology being created may be populated with CUIs. The CUIs of the ontology may be populated by, for each CUI creating a single skos:Concept and adding all information into it using the properties created and added to the ontology previously (in the Semantic Network portion of the ontology being created) and make them rdf:type of the Semantic Type classes created in the previous steps (for example, in the Semantic Network model). In one embodiment of the system, Labels are set in the ontology being created by querying the mrconso table and add all the STRs using the termTypes extracted. Compare each term with the UMLS designated preferred labels, to distinguish between the skos:prefLabel and skos:altLabels that are used to designate labels. SUIs are then added. For each term extracted an instance of the SUI class can be created using the skos-xl skos:Label class and attach to the CUI concept. That is each CUI object will have two distinct ways of representing terms, using literals (using skos:prefLable and skos:altLabel) and objects (using skos-xl:prefLable and skos-xl:altLabel). Synonymy can then be added by making all terms of a CUI mutually synonyms using the umls:synonymous and adding them to the model. The umls:synonymous is a transitive property.

Figure 41:
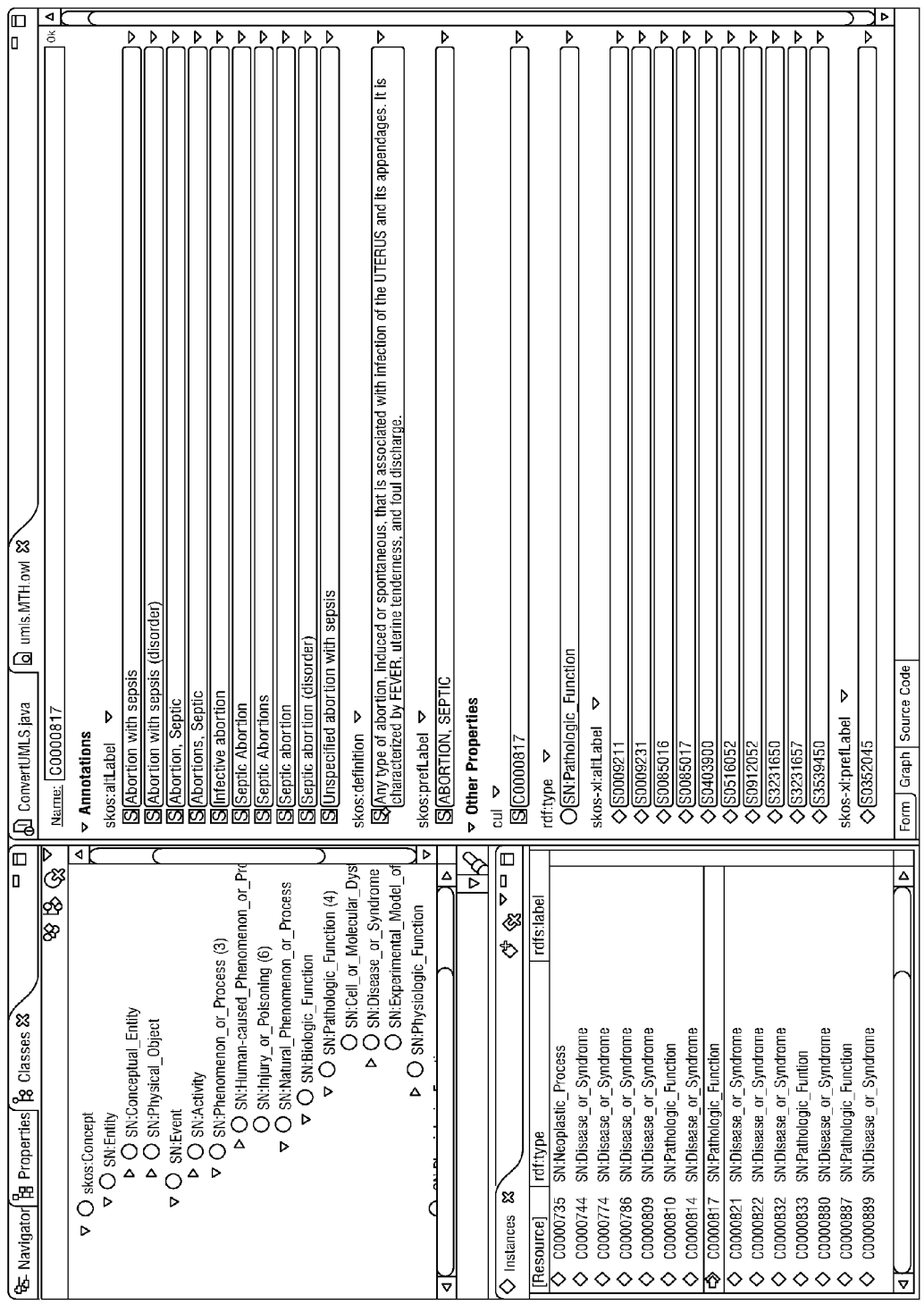
FIG. 41 depicts one embodiment of a CUI.
Figure 42:
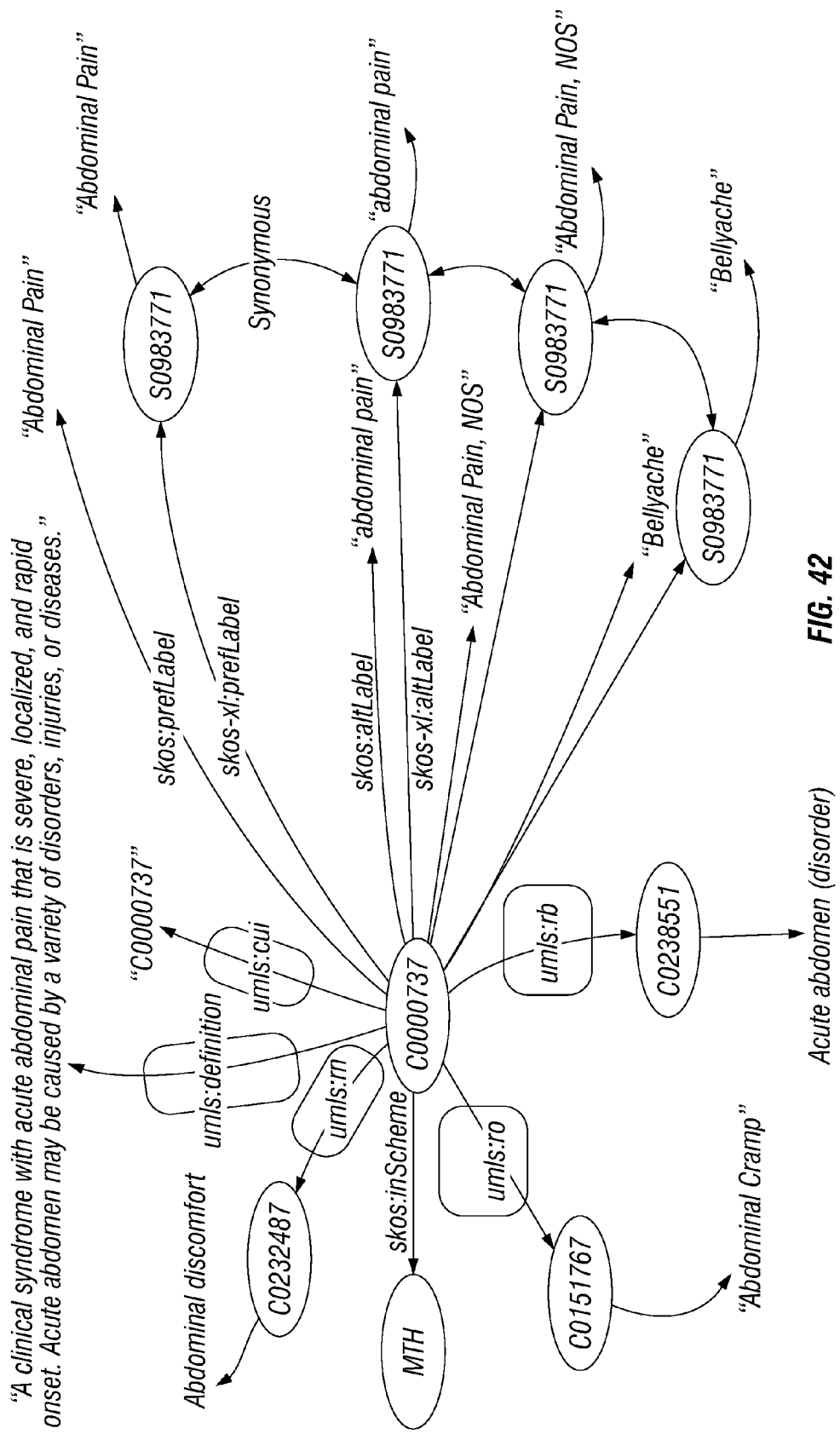
FIG. 42 depicts one embodiment of a concept and its SKOS relationships with other concepts.

Definitions can then be set by querying mrDef for all definitions of a CUI and add that to the ontology using skos:definition property. Semantic Types are set by querying mrSTY for the semantic types of a CUI and make each CUI object an rdf:type of the corresponding Semantic Type class in the ontology. Relations are set by querying the REL table for all REL and RELA relationships of a CUI with other CUIs and use object properties extracted in the previous steps to link them in the ontology being created. The MTH attributes are then set in the ontology by querying the attributes table in the UMLS and adding values of all attributes associated with a CUI using the attributes properties extracted previously. FIG. 41 depicts a representation of a single CUI and its associated properties. FIG. 42 depicts a graph representation of the concept depicted in FIG. 41.

At step 3640 source vocabularies of the UMLS-SKOS ontology may be populated and mapped to the metathesauraus portion of the ontology being created. The UMLS-MTH may be accessed. The concepts of the ontology may be set by, for each concept or term in source vocabulary (SAB), creating a distinct skos:Concept associated with the ConceptScheme representing that source vocabulary. The concept can then be associated with its definitions, terms, and relations and linked to the CUIs that it corresponds to by querying the UMLS. Unique semantic identifiers (SUIs) may then be set. Each term or concept in a terminology system has at least one form of a unique identifier. Find and use that to form a URI for the concept using the following method: UMLSNameSPACE+/+SAB Name+/+Unique Identifier. The labels for the concepts can then be set in the ontology being created by querying the mrconso table to identify terms specifically contributed by the SAB to that concept and add all the STRs using the termTypes extracted previously. Each term can be compared with the UMLS designated preferred labels to distinguish between the skos:prefLabel and skos:altLabels that are used to designate labels. For each term extracted also create an instance of AUI class using the skos-xl skos:Label class and attach to the SAB concept. That is each SAB object will have two distinct ways of representing terms, using literals (using skos:prefLable and skos:altLabel) and AUI objects (using skos-xl:prefLable and skos-xl:altLabel). Synonymy may be added by making all terms of a CUI mutually synonyms when adding them to the model using Umls:synonymous (which is transitive). Definitions can then be set for the concepts by querying mrDef for all definitions of the CUI associated with this object by adding those definitions that use the skos: definition property.

Once the concept portion of the ontology being created is set, the relations can be set in the ontology by querying the mrRel table for all REL and RELA relationships of the unique identifier associated with the SAB object (AUI, SCUI, or CODE) with other unique identifiers and use object properties extracted in the previous steps to link them in the ontology.

Figure 43:
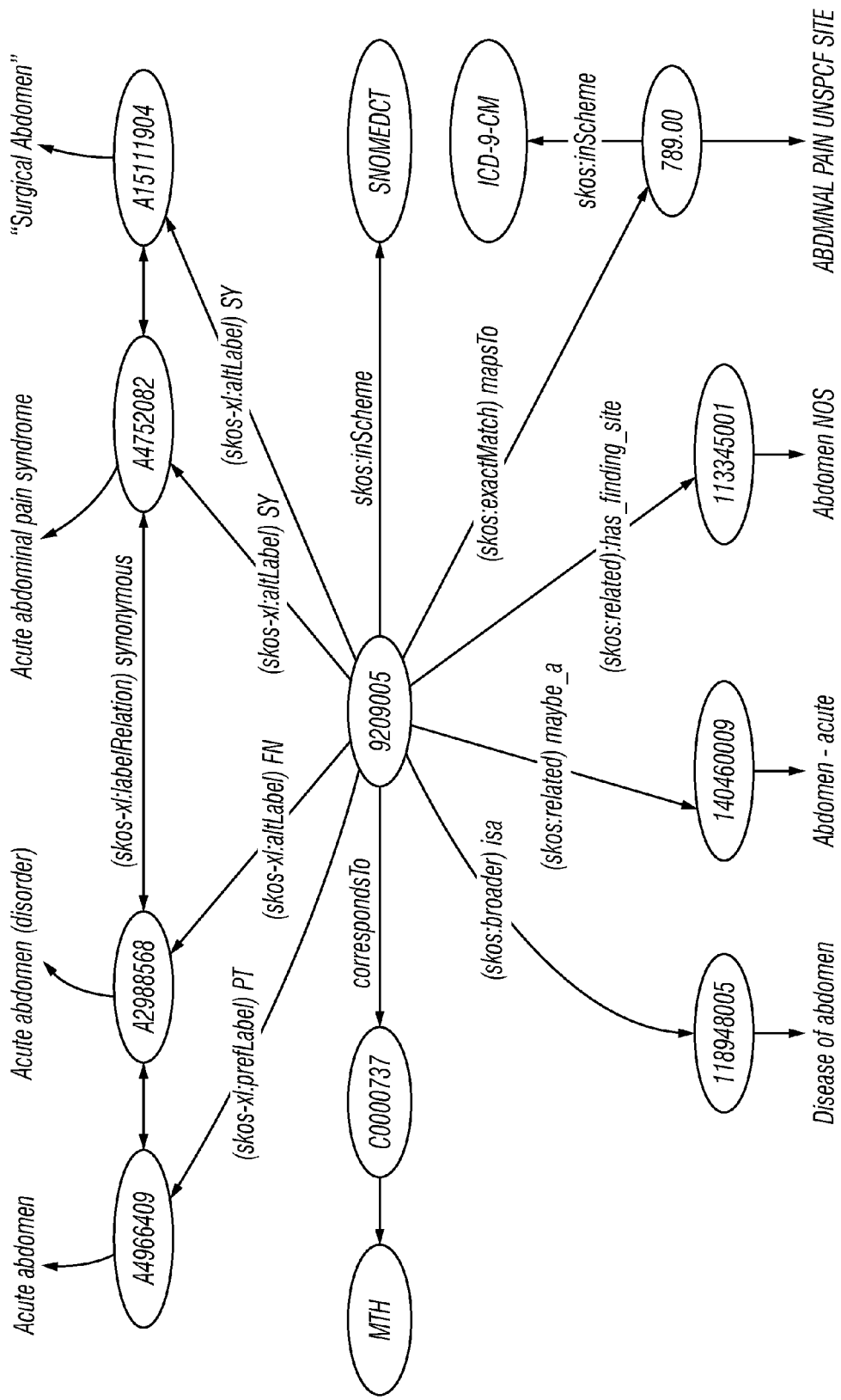
FIG. 43 depicts one embodiment of a representation of a concept from a SABs and its relations to other concepts from the same SAB or other SABs.
Figure 44:
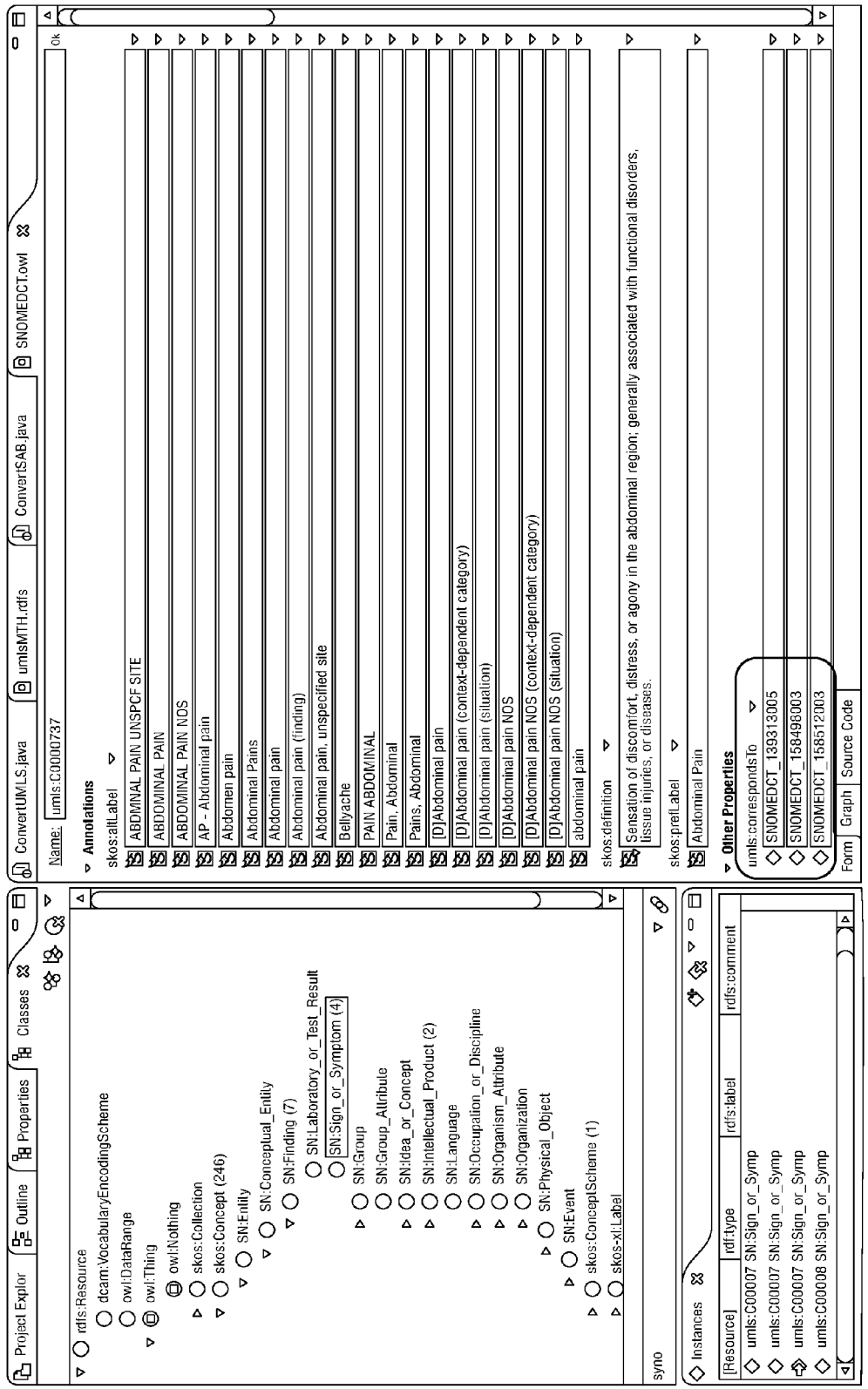
FIG. 44 depicts one embodiment of the mapping between CUI and concepts from different SABs.
Figure 45B:
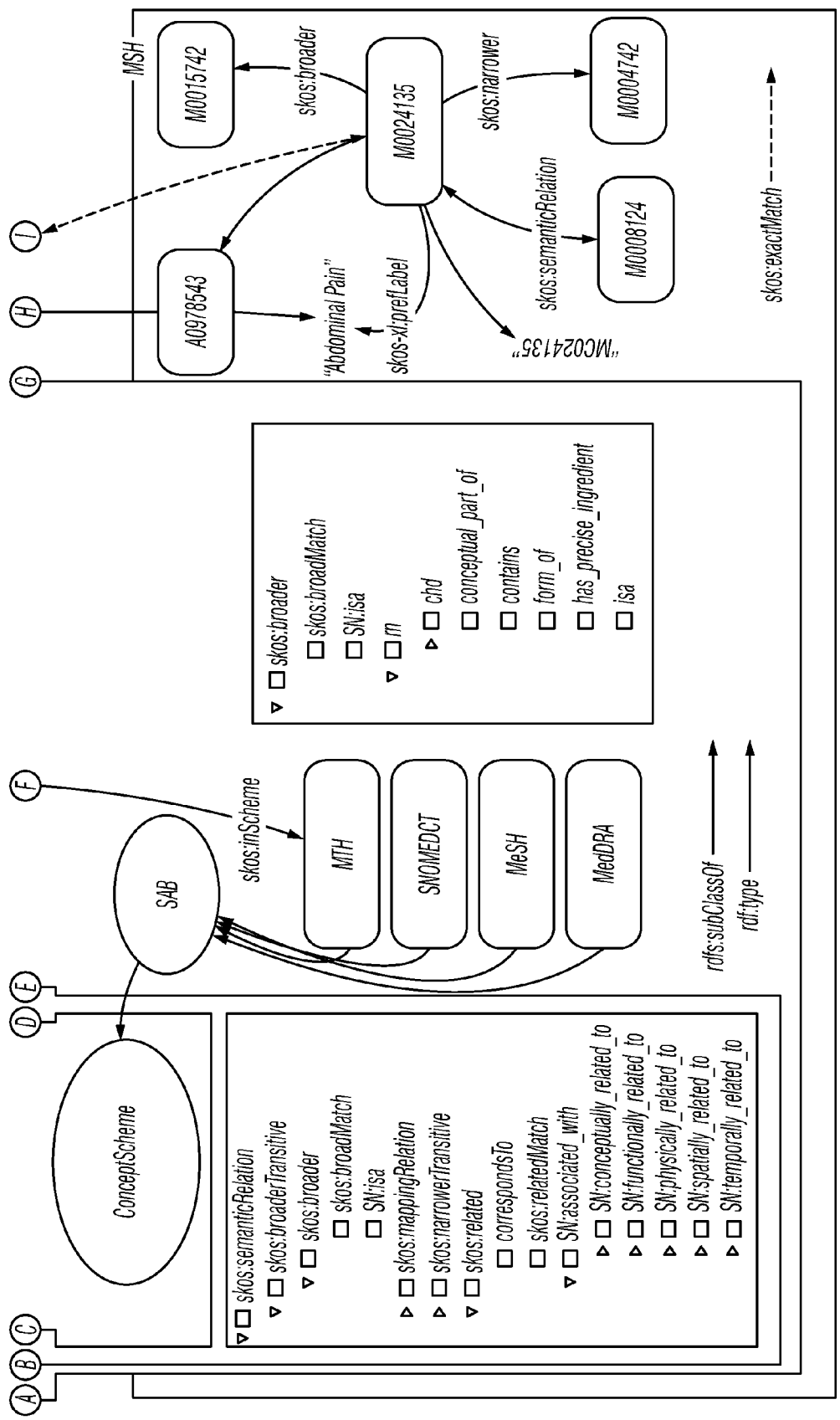
FIG. 45 depicts one embodiment of a portion of the UMLS-SKOS ontology encompassing UMLS Semantic Network, UMLS-MTH, and SABs all mapped together as a unified whole and represented as a graph.

The metathesarus attributes can then be set in the ontology being created by querying the attributes table in the UMLS and adding values of all attributes associated with a the SAB using the attribute properties extracted previously. The concepts can then be mapped to a CUI. This can be accomplished by querying mrConso for mapping between CUI and the SAB unique identifier and representing it using an instance of umls:MapSet class. FIG. 43 depicts a representation of SABs, their labels and relations with each other. FIG. 44 depicts the SABs of FIG. 43 in an ontology editor. FIG. 45 depicts a representation of a graph for a portion of a domain ontology, where the domain ontology comprises a mapped and cross correlated vocabulary system that emerges out of overlying multiple distinct graphs utilized in the above method.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for ontology driven data mining, comprising:
an informatics system coupled to a plurality of data sources, the informatics system comprising a processor and a non-transitory computer readable medium comprising instructions for:
receiving a clinical text as input from one or more of the plurality of data sources;
creating a graph representation of the input, wherein creating the graph representation of the input comprises parsing the input to create a parse graph by creating a set of evidence spaces comprising a set of related concepts within a distance of one another in the input;
obtaining a graph representation of a semantic ontology, wherein the semantic ontology comprises a set of concepts and a set of relationships;
mapping the graph representation of the input to the graph representation of the semantic ontology to create a unified graph comprising the graph representation of the input and the graph of the semantic ontology;
constructing a query based on at least one of the set of concepts or at least one of the set of relationships of the semantic ontology; and
searching the unified graph based on the query to obtain data of the input associated with the at least one concept or the at least one relationship.

2. The system of claim 1, wherein the distance is five plus or minus two.

3. The system of claim 1, wherein mapping the graph representation of the input to the graph representation of the semantic ontology to create a unified graph comprises mapping the parse graph to a domain ontology and using the mapping between the parse graph and the domain ontology to map the parse graph to the semantic ontology.

4. The system of claim 3, wherein the domain ontology comprises UMLS-SKOS.

5. A method for ontology driven data mining implemented at an informatics system coupled to a plurality of data sources, comprising:
receiving a clinical text as input from one or more of the plurality of data sources;
creating a graph representation of the input, wherein creating the graph representation of the input comprises parsing the input to create a parse graph by creating a set of evidence spaces comprising a set of related concepts within a distance of one another in the input;
obtaining a graph representation of a semantic ontology, wherein the semantic ontology comprises a set of concepts and a set of relationships;
mapping the graph representation of the input to the graph representation of the semantic ontology to create a unified graph comprising the graph representation of the input and the graph of the semantic ontology;
constructing a query based on at least one of the set of concepts or at least one of the set of relationships of the semantic ontology; and
searching the unified graph based on the query to obtain data of the input associated with the at least one concept or the at least one relationship.

6. The method of claim 5, wherein the distance is five plus or minus two.

7. The method of claim 5, wherein mapping the graph representation of the input to the graph representation of the semantic ontology to create a unified graph comprises mapping the parse graph to a domain ontology and using the mapping between the parse graph and the domain ontology to map the parse graph to the semantic ontology.

8. The method of claim 7, wherein the domain ontology comprises UMLS-SKOS.

9. A non-transitory computer readable medium, comprising instructions for:
receiving a clinical text as input from one or more of the plurality of data sources;
creating a graph representation of the input, wherein creating the graph representation of the input comprises parsing the input to create a parse graph by creating a set of evidence spaces comprising a set of related concepts within a distance of one another in the input;
obtaining a graph representation of a semantic ontology, wherein the semantic ontology comprises a set of concepts and a set of relationships;
mapping the graph representation of the input to the graph representation of the semantic ontology to create a unified graph comprising the graph representation of the input and the graph of the semantic ontology;
constructing a query based on at least one of the set of concepts or at least one of the set of relationships of the semantic ontology; and searching the unified graph based on the query to obtain data of the input associated with the at least one concept or the at least one relationship.

10. The computer readable medium of claim 9, wherein the distance is five plus or minus two.

11. The computer readable medium of claim 9, wherein mapping the graph representation of the input to the graph representation of the semantic ontology to create a unified graph comprises mapping the parse graph to a domain ontology and using the mapping between the parse graph and the domain ontology to map the parse graph to the semantic ontology.

12. The computer readable medium of claim 11, wherein the domain ontology comprises UMLS-SKOS.

13. A system for ontology driven data mining, comprising:
an informatics system coupled to a plurality of data sources, the informatics system comprising a processor and a non-transitory computer readable medium comprising instructions for:
receiving a clinical text as input from one or more of the plurality of data sources;
creating a graph representation of the input, wherein creating the graph representation of the input comprises parsing the input to create a parse graph;
obtaining a graph representation of a semantic ontology, wherein the semantic ontology comprises a set of concepts and a set of relationships;
mapping the graph representation of the input to the graph representation of the semantic ontology to create a unified graph comprising the graph representation of the input and the graph of the semantic ontology, wherein mapping the graph representation of the input to the graph representation of the ontology to create a unified graph comprises mapping the parse graph to a domain ontology and using mapping between the parse graph and the domain ontology to map the parse graph to the semantic ontology;
constructing a query based on at least one of the set of concepts or at least one of the set of relationships of the semantic ontology; and
searching the unified graph based on the query to obtain data of the input associated with the at least one concept or the at least one relationship.

14. The system of claim 13, wherein the domain ontology comprises UMLS-SKOS.

15. The system of claim 14, wherein parsing the input comprises creating a set of evidence spaces.

16. The system of claim 15, wherein each evidence space comprises a set of related concepts.

17. The system of claim 16, wherein the set of related concepts are within a distance of one another in the clinical text.

18. The system of claim 17, wherein the distance is five plus or minus two.

19. A method for ontology driven data mining implemented at an informatics system coupled to a plurality of data sources, comprising:
receiving a clinical text as input from one or more of the plurality of data sources;
creating a graph representation of the input, wherein creating the graph representation of the input comprises parsing the input to create a parse graph;
obtaining a graph representation of a semantic ontology, wherein the semantic ontology comprises a set of concepts and a set of relationships;
mapping the graph representation of the input to the graph representation of the semantic ontology to create a unified graph comprising the graph representation of the input and the graph of the semantic ontology, wherein mapping the graph representation of the input to the graph representation of the ontology to create a unified graph comprises mapping the parse graph to a domain ontology and using mapping between the parse graph and the domain ontology to map the parse graph to the semantic ontology;
constructing a query based on at least one of the set of concepts or at least one of the set of relationships of the semantic ontology; and
searching the unified graph based on the query to obtain data of the input associated with the at least one concept or the at least one relationship.

20. The method of claim 19, wherein the domain ontology comprises UMLS-SKOS.

21. The method of claim 20, wherein parsing the input comprises creating a set of evidence spaces.

22. The method of claim 21, wherein each evidence space comprises a set of related concepts.

23. The method of claim 22, wherein the set of related concepts are within a distance of one another in the clinical text.

24. The method of claim 23, wherein the distance is five plus or minus two.

25. A non-transitory computer readable medium, comprising instructions for:
receiving a clinical text as input from one or more of the plurality of data sources;
creating a graph representation of the input, wherein creating the graph representation of the input comprises parsing the input to create a parse graph;
obtaining a graph representation of a semantic ontology, wherein the semantic ontology comprises a set of concepts and a set of relationships;
mapping the graph representation of the input to the graph representation of the semantic ontology to create a unified graph comprising the graph representation of the input and the graph of the semantic ontology, wherein mapping the graph representation of the input to the graph representation of the ontology to create a unified graph comprises mapping the parse graph to a domain ontology and using mapping between the parse graph and the domain ontology to map the parse graph to the semantic ontology;
constructing a query based on at least one of the set of concepts or at least one of the set of relationships of the semantic ontology; and
searching the unified graph based on the query to obtain data of the input associated with the at least one concept or the at least one relationship.

26. The computer readable medium of claim 25, wherein the domain ontology comprises UMLS-SKOS.

27. The computer readable medium of claim 26, wherein parsing the input comprises creating a set of evidence spaces.

28. The computer readable medium of claim 27, wherein each evidence space comprises a set of related concepts.

29. The computer readable medium of claim 28, wherein the set of related concepts are within a distance of one another in the clinical text.

30. The computer readable medium of claim 29, wherein the distance is five plus or minus two.

* * * * *